US009908103B2

(12) United States Patent
Suib et al.

(10) Patent No.: US 9,908,103 B2
(45) Date of Patent: *Mar. 6, 2018

(54) MESOPOROUS METAL OXIDES AND PROCESSES FOR PREPARATION THEREOF

(71) Applicant: UNIVERSITY OF CONNECTICUT, Farmington, CT (US)

(72) Inventors: Steven L. Suib, Storrs, CT (US); Altug Suleyman Poyraz, Willington, CT (US)

(73) Assignee: University of Connecticut, Farmington, CT (US)

(*) Notice: Subject to any disclaimer, the term of this patent is extended or adjusted under 35 U.S.C. 154(b) by 340 days.

This patent is subject to a terminal disclaimer.

(21) Appl. No.: 14/037,100

(22) Filed: Sep. 25, 2013

(65) Prior Publication Data

US 2014/0296062 A1  Oct. 2, 2014

Related U.S. Application Data

(60) Provisional application No. 61/705,370, filed on Sep. 25, 2012.

(51) Int. Cl.
*B01J 23/755* (2006.01)
*C01F 17/00* (2006.01)
(Continued)

(52) U.S. Cl.
CPC .......... *B01J 23/755* (2013.01); *B01J 21/063* (2013.01); *B01J 21/08* (2013.01); *B01J 21/12* (2013.01);
(Continued)

(58) Field of Classification Search
CPC . B01J 23/755; B01J 23/34; B01J 23/06; B01J 21/063; B01J 23/75; B01J 23/10;
(Continued)

(56) References Cited

U.S. PATENT DOCUMENTS 6,162,414 A    12/2000  Pinnavaia et al.
6,413,489 B1 *  7/2002  Ying ................... B01J 13/0056
                                              423/600
(Continued)

OTHER PUBLICATIONS

Kim et al (MCM-48-like Large Mesoporous Silicas with Tailored Pore Structure: Facile Synthesis Domain in a Ternary Triblock Copolymer-Butanol-Water System, J. Am. Chem. Soc. 2005, 127, 7601-7610).*

(Continued)

*Primary Examiner* — Melvin C Mayes
*Assistant Examiner* — Michael Forrest
(74) *Attorney, Agent, or Firm* — Bryan D. Zerhusen; Locke Lord LLP

(57) ABSTRACT

A process for preparing a mesoporous metal oxide, i.e., transition metal oxide. Lanthanide metal oxide, a post-transition metal oxide and metalloid oxide. The process comprises providing an acidic mixture comprising a metal precursor, an interface modifier, a hydrotropic ion precursor, and a surfactant; and heating the acidic mixture at a temperature and for a period of time sufficient to form the mesoporous metal oxide. A mesoporous metal oxide prepared by the above process. A method of controlling nano-sized wall crystallinity and mesoporosity in mesoporous metal oxides. The method comprises providing an acidic mixture comprising a metal precursor, an interface modifier, a hydrotropic ion precursor, and a surfactant; and heating the acidic mixture at a temperature and for a period of time sufficient to control nano-sized wall crystallinity and mesoporosity in the mesoporous metal oxides. Mesoporous metal oxides and a method of tuning structural properties of mesoporous metal oxides.

28 Claims, 54 Drawing Sheets

(51) Int. Cl.

| | | |
|---|---|---|
| *C01B 37/02* | (2006.01) | |
| *C01B 35/10* | (2006.01) | |
| *C01B 33/12* | (2006.01) | |
| *C01B 13/18* | (2006.01) | |
| *B82Y 30/00* | (2011.01) | |
| *C01B 13/32* | (2006.01) | |
| *B01J 23/34* | (2006.01) | |
| *B01J 23/06* | (2006.01) | |
| *B01J 21/06* | (2006.01) | |
| *B01J 23/75* | (2006.01) | |
| *B01J 23/10* | (2006.01) | |
| *B01J 23/745* | (2006.01) | |
| *B01J 21/08* | (2006.01) | |
| *B01J 21/12* | (2006.01) | |
| *B01J 23/72* | (2006.01) | |
| *C01G 1/02* | (2006.01) | |

(52) U.S. Cl.
CPC ............... *B01J 23/06* (2013.01); *B01J 23/10* (2013.01); *B01J 23/34* (2013.01); *B01J 23/72* (2013.01); *B01J 23/745* (2013.01); *B01J 23/75* (2013.01); *B82Y 30/00* (2013.01); *C01B 13/18* (2013.01); *C01B 13/326* (2013.01); *C01B 33/124* (2013.01); *C01B 35/1027* (2013.01); *C01B 37/02* (2013.01); *C01F 17/0043* (2013.01); *C01G 1/02* (2013.01); *C01P 2002/72* (2013.01); *C01P 2004/03* (2013.01); *C01P 2004/04* (2013.01); *C01P 2004/64* (2013.01); *C01P 2006/12* (2013.01); *C01P 2006/13* (2013.01); *C01P 2006/14* (2013.01); *C01P 2006/16* (2013.01); *C01P 2006/17* (2013.01)

(58) Field of Classification Search
CPC . B01J 23/745; B01J 21/08; B01J 21/12; B01J 23/72; C01F 17/0043; B82Y 30/00; C01B 37/02; C01B 35/1027; C01B 33/124; C01B 13/18; C01B 13/326; C01G 1/02
See application file for complete search history.

(56) References Cited

U.S. PATENT DOCUMENTS

| | | | |
|---|---|---|---|
| 6,752,979 B1 | 6/2004 | Talbot et al. | |
| 2005/0123465 A1* | 6/2005 | Chane-Ching | B01J 23/10 423/349 |
| 2006/0292062 A1 | 12/2006 | Hojo et al. | |
| 2010/0196237 A1 | 8/2010 | Yin et al. | |
| 2010/0254890 A1* | 10/2010 | Yang | B01J 20/103 423/592.1 |
| 2011/0027572 A1* | 2/2011 | Wiesner | C01B 13/18 428/315.5 |

OTHER PUBLICATIONS

International Search Report dated Feb. 19, 2014 from corresponding PCT/US2013/061730, pp. 3.
International Written Opinion dated Feb. 19, 2014 from corresponding PCT/US2013/061730, pp. 8.
Antonelli et al., Synthesis and Characterization of Hexagonally Packed Mesoporous Tantalum Oxide Molecular Sieves, Chem. Mater., (1996), pp. 874-881, vol. 8, No. 4.
Luca et al., Study of the Structure and Mechanism of Formation through Self-Assembly of Mesostructured Vanadium Oxide, (1997), pp. 2731-2744., vol. 9,No. 12.
Yang et al., Block Copolymer Templating Syntheses of Mesoporous Metal Oxides with Large Ordering Lengths and Semicrystalline Framework, Chem. Mater., (1999), pp. 2813-2826, 11.
Ferdi Schüth, et al., Non-siliceous Mesostructured and Mesoporous Materials, Chem. Mater. (2001),pp. 3184-3195,vol. 13, No. 10.
Tian et al., Self-adjusted synthesis of ordered stable mesoporous minerals by acid-base pairs, nature materials, (2003), pp. 159-162, Published online: ,doi:10.1038/nmat838,vol. 2, www.nature.com/naturematerials.
G.J.D.A. Soler-Illia et al., Block copolymer-templated mesoporous oxides, Current Opinion in Colloid and Interface Science, (2003), pp. 109-126, 8.
Grosso et al., Fundamentals of Mesostructuring Through Evaporation-Induced Self-Assembly, Adv. Funct. Mater., (2004), pp. 309-322, vol. 14, No. 4.
Cassiers et al., Surfactant-Directed Synthesis of Mesoporous Titania with Nanocrystalline Anatase Walls and Remarkable Thermal Stability, J. Phys. Chem. B, (2004), pp. 3713-3721, vol. 108, No. 12.
Sinha et al., Three-Dimensional Mesoporous Chromium Oxide: A Highly Efficient Material for the Elimination of Volatile Organic Compounds Angew. Chem. Int. Ed., (2005), pp. 271-273, 44.
Ba et al., Non-aqueous Synthesis of Tin Oxide Nanocrystals and Their Assembly into Ordered Porous Mesostructures, Adv. Mater., (2005), pp. 2509-2512, 17.
Brezesinski et al., Self-Assembly and Crystallization Behavior of Mesoporous, Crystalline HfO2 Thin Films:A Model System for the Generation of Mesostructured Transition-Metal Oxides, small, (2005), pp. 889-898, 1, No. 8-9.
J. Cao et al., Controllable syntheses of hexagonal and lamellar mesostructured lanthanum oxide, Materials Letters, (2005), pp. 408-411, 59.
J. Chen et al., Morphogenesis of Highly Ordered Mixed-Valent Mesoporous Molybdenum Oxides, J. Am. Chem. Soc., (2005), pp. 14140-14141, 127.
Brezesinski et al., Crystal-to-Crystal Phase Transition in Self-Assembled Mesoporous Iron Oxide Films,Angew. Chem. Int. Ed.,(2006), pp. 781-784, 45.
Fan et al., Nanoparticle Assembly of Ordered Multicomponent Mesostructured Metal Oxides via a Versatile Sol-Gel Process, Chem. Mater., (2006), No. 26, 6391-6396, vol. 18.
Sel et al., Principles of Hierarchical Meso- and Macropore Architectures by Liquid Crystalline and Polymer Colloid Templating, Langmuir (2006), pp. 2311-2322, vol. 22, No. 5.
Armatas et al., Hexagonal Mesoporous Germanium, Science, (2006), pp. 817-820, vol. 313.
Brinker et al., Morphological control of surfactant-templated metal oxide films, Current Opinion in Colloid & Interface Science, (2006), pp. 126-132, 11.
Carreon et al., Mesoporous Nanocrystalline Mixed Metal Oxides from Heterometallic Alkoxide Precursors: Cobalt-Nickel Oxide Spinels for Propane Oxidation, Eur. J. Inorg. Chem., (2006), pp. 4983-4988.
Boettcher et al., Harnessing the Sol-Gel Process for the Assembly of Non-Silicate Mesostructured Oxide Materials, Acc. Chem. Res., (2007), 40, pp. 784-792.
Cao et al., Synthesis of Ultra-Large-Pore SBA-15 Silica with Two-Dimensional Hexagonal Structure Using Triisopropylbenzene As Micelle Expander, Chem. Mater.,(2009), pp. 1144-1153, vol. 21, No. 6.
Poyraz et al., Role of Organic and Inorganic Additives on the Assembly of CTAB-P123 and the Morphology of Mesoporous Silica Particles, J. Phys. Chem. C, (2009), pp. 18596-18607, vol. 113, No. 43.
Das et al., Self-Assembled Mesoporous Zirconia and Sulfated Zirconia Nanoparticles Synthesized by Triblock Copolymer as Template, J. Phys. Chem. C, (2009), pp. 8918-8923, 113.
Deshmane et al., Thermally Stable Nanocrystalline Mesoporous Gallium Oxide Phases, Eur. J. Inorg. Chem., (2009), pp. 3275-3281.
Arora et al., Block Copolymer Self-Assembly—Directed Single-Crystal Homo- and Heteroepitaxial Nanostructures, Science, (2010), pp. 214-219, vol. 330.
Bian, et al., A template-free, thermal decomposition method to synthesize mesoporous MgO with a nanocrystalline framework and its application in carbon dioxide adsorption† J. Mater. Chem., (2010), pp. 8705-8710, 20.

(56) References Cited

OTHER PUBLICATIONS

Brezesinski et al., Pseudocapacitive Contributions to Charge Storage in Highly Ordered Mesoporous Group V Transition Metal Oxides with Iso-Oriented Layered Nanocrystalline Domains, J. Am. Chem. Soc., (2010), pp. 6982-6990, 132.

Chen et al., Synthesis of Monodisperse Mesoporous Titania Beads with Controllable Diameter, High Surface Areas, and Variable Pore Diameters (14-23 nm), J. Am. Chem. Soc., (2010), pp. 4438-4444, 132.

C.A. Deshmane et al., Microwave-assisted synthesis of nanocrystalline mesoporous gallium oxide, Microporous and Mesoporous Materials, (2010), pp. 97-102, 130.

G.J.D.A. Soler-Illia et al., Multifunctional hybrids by combining ordered mesoporous materials and macromolecular building blocks Chem. Soc. Rev., (2011), pp. 1107-1150, 40.

Chaubal et al., Nonionic polymeric surfactant template for mesoporous NiCo2O4 formation, J Porous Mater, (2011), pp. 177-183, 18.

H. Chen et al., A novel mesostructured alumina-ceria-zirconia tri-component nanocomposite with high thermal stability and its three-way catalysis, Microporous and Mesoporous Materials, (2011), pp. 368-374, 143.

L. Chen et al., Direct synthesis and characterization of mesoporous Fe3O4 through pyrolysis of ferric nitrate-ethylene glycol gel, Journal of Alloys and Compounds, (2011), pp. L1-L5, 509.

C.A. Deshmane et al., Epoxidation of cyclooctene over mesoporous Ga, Ga—Nb, and Ga—Mo oxide catalysts, Catalysis Communications, (2011), pp. 46-51, 15.

G. Fan et al., Synthesis of high-surface-area micro/mesoporous ZnAl2O4 catalyst support and application in selective hydrogenation of o-chloronitrobenzene, Catalysis Communications, (2011), pp. 113-117, 15.

International Preliminary Report on Patentability (IPRP) dated Apr. 9, 2015 from corresponding PCT/US2013/061730, pp. 10.

\* cited by examiner

Figure 41

| Entry | T (°C) | Time (min) | Conversion % | Selectivity% | | | |
|---|---|---|---|---|---|---|---|
| | | | | 1 | 2 | 3 | 4 |
| 1 | 90 | 5 | 100 | 90 | 4 | 6 | - |
| 2 | 90 | 10 | 100 | 76 | 8 | 16 | - |
| 3 | 90 | 15 | 100 | 97 | 3 | - | - |
| 4 | 50 | 15 | 98 | 61 | 8 | 14 | 17 |
| 5 | 50 | 30 | 100 | 54 | 15 | 16 | 15 |
| 6 | RT | 15 | 87 | 24 | - | 18 | 58 |
| 7 | RT | 30 | 93 | 16 | 9 | 23 | 52 |

Figure 45

| Calcination (°C) | Catalyst | Surface Area (m²/g) | Conversion (%) | Selectivity (%) |
|---|---|---|---|---|
| 450 | UCT-16 | 150 | 100 | 100 |
| Commercial | CeO₂ | 55.3 | 11 | 100 |
| 450 (Commercial) | CeO₂ | 34.2 | 8 | 100 |

| Catalyst | T (°C) | Conversion % | Selectivity % | Yield% |
|---|---|---|---|---|
| Commercial ZrO$_2$ | 200 | 0 | 0 | 0 |
| UCT-17 (ZrO$_2$) | 200 | 10 | 100 | 10 |
| SO$_4$ [UCT-17 (UCT-44)] | 150 | 100 | 100 | 45 |
| SO$_4$ [UCT-17 (UCT-44)] | 200 | 100 | 100 | 63 |

| Catalyst | Surface Area (m²/g) | Pore Volume (cc/g) | Conversion% | Selectivity% |
|---|---|---|---|---|
| Commercial $Mn_2O_3$ | 16 | --- | 0 | 0 |
| Commercial $Mn_3O_4$ | 6 | --- | 11 | 100 |
| OMS-2 (MW) | 129* | 0.97* | 65 | 100 |
| UCT-4 ($Mn_3O_4$) | | | 53 | 100 |
| UCT-1 (Fresh) | 59 | 0.105 | 8 | 100 |
| UCT-1 (250 °C) | 200 | 0.153 | 80 | 100 |
| UCT-19-SDS (250 °C) | 178 | 0.32 | 80 | 100 (85 °C) |
| UCT-26-TMB-Fresh | 54 | 0.133 | 1 | 100 |
| UCT-26-TMB-250 | 167 | 0.226 | 100 | 100 |
| UCT-26-TMB-350 | --- | --- | 75 | 100 |

MESOPOROUS METAL OXIDES AND PROCESSES FOR PREPARATION THEREOF

RELATED APPLICATIONS

This application claims the benefit of U.S. Patent Application Ser. No. 61/705,370, filed Sep. 25, 2012, which is incorporated herein by reference. This application is related to U.S. Patent Application Ser. No. 61/705,372, filed Sep. 25, 2012, which is incorporated herein by reference.

This Invention was supported by the Department of Energy, under Grant No. DE-FG02-86ER13622. This government has certain rights in the invention.

BACKGROUND

1. Field of the Disclosure

This disclosure relates to mesoporous metal oxides and processes for making mesoporous metal oxides, in particular, the synthesis of thermally stable mesoporous metal oxides with controllable nano-sized wall crystallinity and mesoporosity. This disclosure also relates to a method of tuning structural properties of mesoporous metal oxides, and a method of controlling nano-sized wall crystallinity and mesoporosity in mesoporous metal oxides.

2. Discussion of the Background Art

Porous transition metal oxides consist of micropores (<2 nm), mesopores (2-50 nm), macropores (>50 nm) and sometimes combinations of these. Considerable interest in the control of pore sizes and pore size distributions of such materials has been a focus for quite some time. The control of particle size in particular in the nanometer regime in the synthesis of nano-size metal oxides is also currently being pursued. Nano-size materials can have markedly different properties than similar compositions that are bulk size (m and above). Control of morphologies of porous transition metal oxides such as hollow spheres, rods, helices, spirals, and many other shapes has been a major focus of researchers over at least the last 10 years.

Such control comes from specific synthetic methods such as use of templates, structure directors, surfactants, core shell, self assembly, epitaxial growth, size reduction, capping agents, sol gel, and other methods. Morphologies can be controlled by compositions including dopants. The conditions during syntheses such as use of heat, light, pH, point of zero charge, stirring, high pressure, and others are also important.

Mesoporous materials with varied pore sizes and pore size distributions can be obtained for some systems such as silicon and titanium based oxide materials. However, control of pore size distributions to make single size pores and to systematically control such pore sizes and uniformity is difficult, especially with transition metal oxide systems. Control of the structure of the material is also an issue. Many systems have both micropores and mesopores and pore interconnectivity is of interest with these materials. Enhanced mass transport for catalytic reactions might be realized by fine-tuning the porosity of such systems. Incorporation of biomolecules larger than the micropore regime also might be done using well ordered crystalline mesoporous materials.

Most studies of mesoporous transition metal oxide (MTMO) materials have focused on groups I-IV including Y, Ti, Hf, Zr, V, Nb, Ta, Cr, Mo, and W. These have low angle X-ray diffraction peaks indicative of mesostructural ordering and Type IV isotherms. These syntheses have focused on use of water or water plus a base or urea with various amine and carboxyl containing surfactants (S). There are either strong Coulombic interactions ($S^+,I^-$; $S^-I^+$; $S^+X^-I^+$; $S^-X^+I^-$) or strong ligand metal interactions (I:S<2, very thin walls), and such systems have limited thermal stability and amorphous walls, where I=inorganic species, and X is a mediator. Such syntheses are open to air and various aging times and environmental conditions can influence the porosity of these materials.

Water content is a critical parameter with the synthesis of porous transition metal oxides. Water competes with ethoxy and other alkoxy groups for coordination to the metal and also significantly affects hydrolysis and condensation rates. Since most syntheses are open to the air the water content is very difficult to control. On the other hand, water is essential for reaction. When the number of water molecules per metal atom (H) is >1 then phase separation and nonporous oxides result. When H is <1, ordered mesoporous materials are formed when the metal has empty $t_{2g}$ orbitals. These materials obtain water from the environment during synthesis. When H is <<1, strong surfactant/transition metal interactions occur with weak surfactant interactions and there is no reaction.

Thermodynamic interactions in such syntheses and factors influencing each term are given in Table 1 below. Table 1 sets forth thermodynamic parameters of surfactant (S) transition metal (M) mesopore syntheses.

TABLE 1

| $DG_m = DG_{org} + DG_1 + DG_{inter} + DG_{sol}$ [1] | | | |
|---|---|---|---|
| S-S Interaction determines mesostructure formed (Lamellar, Hexagonal, Cubic) | High Lewis acidity Unsaturated Coordination H (Hydrolysis Ratio H << 1), Condensation hindering molecules (carboxyl, amine, ethylene glycol.) | Strong S-M interaction at interface (Coulombic, Covalent bonding, Hydrogen bonding) | Unknown and unpredictable |

In Equation 1 above, $DG_m$ is the formation energy of the mesostructured material; $DG_{org}$ is the surfactant-surfactant interaction; $DG_1$ is the metal-metal interaction; $DG_{inter}$ is the surfactant-metal interaction; and $DG_{sol}$ is the solvent interaction. It would be desirable to develop a process that minimizes the last 2 terms, $DG_{inter}$ and $DG_{sol}$, in order to make well ordered MTMO materials. The absence of totally empty d orbitals restricts the strong interaction between surfactant and metal (ligand to metal charge transfer) which is generally accepted as essential for the formation of ordered materials. Filled $t_{2g}$ orbitals such as in systems containing Mn, Fe, Co, and other oxides make synthese using the above methods difficult since charge transfer reactions do not occur.

The present disclosure provides many advantages over the prior art, which shall become apparent as described below.

SUMMARY OF THE DISCLOSURE

This disclosure relates in part to a process for preparing a mesoporous metal oxide, said process comprising:

providing an acidic mixture comprising a metal precursor, an interface modifier, a hydrotropic ion precursor, and a surfactant; and heating the acidic mixture at a temperature and for a period of time sufficient to form the mesoporous metal oxide.

This disclosure also relates in part to a mesoporous metal oxide produced by a process comprising:

providing an acidic mixture comprising a metal precursor, an interface modifier, a hydrotropic ion precursor, and a surfactant; and heating the acidic mixture at a temperature and for a period of time sufficient to form the mesoporous metal oxide.

This disclosure further relates in part to a method of controlling nano-sized wall crystallinity and mesoporosity in mesoporous metal oxides, said method comprising:

providing an acidic mixture comprising a metal precursor, an interface modifier, a hydrotropic ion precursor, and a surfactant; and heating the acidic mixture at a temperature and for a period of time sufficient to control nano-sized wall crystallinity and mesoporosity in the mesoporous metal oxides.

This disclosure yet further relates in part to a mesoporous metal oxide particulate having nano-sized wall crystallinity, a particle size between about 1 and about 500 nm, a BET surface area between about 50 and about 1000 $m^2/g$, a pore volume (BJH) between about 0.05 and about 2 $cm^3/g$, a monomodal pore size (BJH desorption) distribution between about 1 and 25 nm, and optionally a wall thickness ($2d/\sqrt{3}$−PD, where d is the d-spacing and PD is the pore diameter) between about 2 and about 20 nm; wherein the mesoporous metal oxide particulate exhibits thermal stability up to a temperature of about 550° C.

This disclosure also relates in part to a method of tuning structural properties of mesoporous metal oxides, said method comprising:

providing an acidic mixture comprising a metal precursor, an interface modifier, a hydrotropic ion precursor, and a surfactant; and heating the acidic mixture at a temperature and for a period of time sufficient to form a dried powder, and heating the dried powder at a temperature and for a period of time sufficient to tune the structural properties of the mesoporous metal oxides.

Several advantages result from the processes of this disclosure. This disclosure provides a unique approach and method for the synthesis of thermally stable mesoporous metal (e.g., Mn, Fe, Co, Ni, Cu, Zn, Ti, Zr, Si, Ce, Sm and Gd) oxides with controllable mesopore size (e.g., 2 nm-13 nm) and nano-sized crystalline walls for various sorptive, conductive, structural, catalytic, magnetic and optical applications. This disclosure not only makes the synthesis of mesoporous (metal, transition metal, Lanthanide metal, post-transition metal, metalloid) oxides possible, but also allows one to precisely tune the structural properties of synthesized porous materials with simple heat treatment cycles. Moreover, the method of this disclosure is applicable to all transition metals, Lanthanide metals, post-transition metals and metalloids with modifications as appropriate in the synthesis procedure.

Further objects, features and advantages of the present disclosure will be understood by reference to the following drawings and detailed description.

BRIEF DESCRIPTION OF THE DRAWINGS

FIG. 41 sets forth the conditions and results generated from the Hantzsch reaction catalyzed by mesoporous iron oxide depicted in FIG. 40.

FIG. 45 sets forth the conditions and results generated from the hydration reaction catalyzed by mesoporous cerium oxide depicted in FIG. 44.

FIG. 48 sets forth the conditions and results generated from the conversion reaction depicted in FIG. 47.

FIG. 51 sets forth the conditions and results from the benzyl alcohol oxidation reaction catalyzed by mesoporous manganese oxide depicted in FIG. 50.

DETAILED DESCRIPTION OF THE PREFERRED EMBODIMENT

Figure 1:
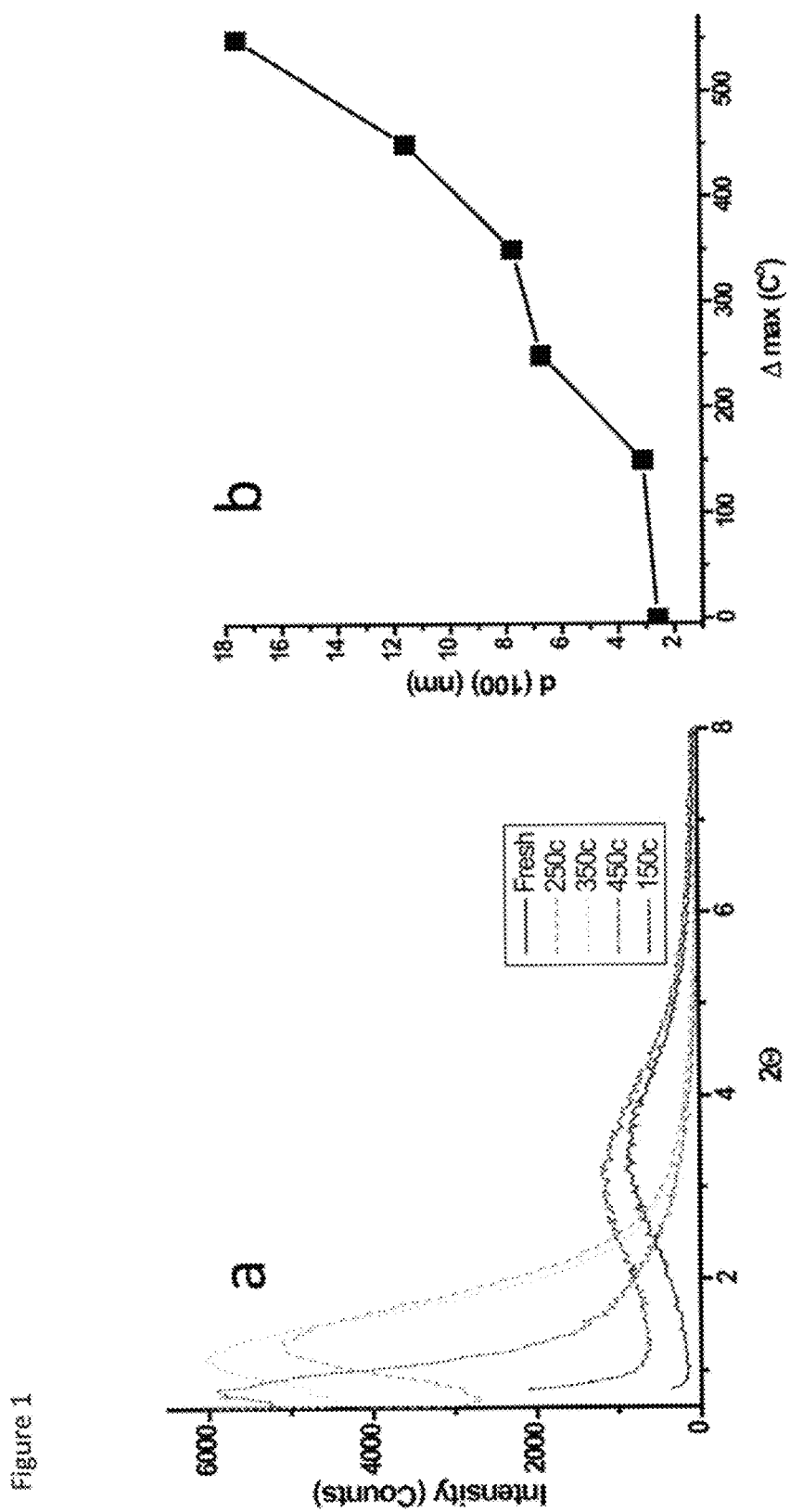
FIG. 1 depicts (a) low angle powder X-ray diffraction (PXRD) of as synthesized (fresh) and mesoporous $Mn_2O_3$ materials heated at different temperatures, and (b) a graph showing change of unit cell dimensions by heat treatment, as prepared in Examples 1 and 2.

All numerical values within the detailed description and the claims herein are modified by "about" or "approximately" the indicated value, and take into account experimental error and variations that would be expected by a person having ordinary skill in the art.

The process of the present disclosure for making mesoporous metal oxides affords a high degree of control with respect to nano-sized wall crystallinity and mesoporosity. The mesoporous metal oxides are useful in various applications including, but not limited to, catalytic, magnetic and optical applications. In particular, the mesoporous metal oxides are useful as catalysts, sensors, batteries and energy production, optical displays, environmental and sorbent applications.

This disclosure offers a new type of porous metal oxide family. The disclosure not only makes use of a wide range of metals. e.g., transition metals, Lanthanide metals, post-transition metals and metalloids, but also provides more control on the structural properties of synthesized mesoporous metal oxides.

The method of this disclosure eliminates contribution of critical thermodynamic parameters such as strength of interaction at interface, hydrolysis and condensation rates of metal precursor and water content of reaction medium, thereby yielding totally reproducible porous metal oxides. For example, solvation by water is eliminated or minimized by eliminating or minimizing the amount of water in the system. This in turn limits hydrolysis.

The present disclosure provides a simple wet-chemical process that enables the synthesis of nanometer-sized particles (50-300 nm) with tunable pore sizes in the range of 2-30 nm, preferably 2-20 nm, and more preferably 2-13 nm. This surfactant-mediated synthesis may be generalized to achieve various pore structures, including 3-D cubic 1 m-3 m, 3-D cubic Fm-3 m, 2-D hexagonal p6 m, foam-like and worm-like pores, as well as different material compositions. The synthesis can produce ultrafine particles with well-defined mesopores, regular particle morphology and excellent pore accessibility. The mesopores are adjustable in size and have high structural ordering. The process uses a surfactant that may act as a supramolecular template for formation of the periodic mesostructure.

One of the unique features of the porous materials synthesized with this method is the tunable porosity. The pore diameter can be controlled between super micropore range (e.g., about 2 nm) and mid-mesopore range (e.g., about 13 nm) without losing available pore volume. A pore size of 13 nm is quite unusual for the mesoporous materials synthesized with various surfactant systems. The pore size of the synthesized materials increases with heat treatments applied which is also a unique discovery of this disclosure. This is a contradiction of pore size by heat treatment because of further condensation of wall structure and collapse of the structure with increased heat treatment duration and temperature applied. Tunable pore size might be useful for various catalytic applications in terms of size selective reactions and enhanced ion mobility for battery applications, etc.

Another unique advantage of this method is controlling the crystal structure of the nano-sized metal oxide walls. For instance, amorphous, bixbyite, hausmannite and manganite structures can be obtained for the manganese system. That makes possible the synthesis of target crystal structure for specific applications. Different crystal structures of metals show different optic, magnetic and catalytic properties which indicate that the method described herein is highly desirable for designing unique porous materials.

Other illustrative crystal structures of the nano-sized metal oxide walls include, for example, $CeO_2$, $Mn_2O_3$, $Mn_3O_4$, $Fe_2O_3$, $Co_3O_4$, ZnO, CuO, $TiO_2$ (Anatase), $ZrO_2$, NiOOH, and the like. The method of this disclosure provides for controllable nano-sized wall crystallinity and the synthesis of target crystal structures for specific applications.

In accordance with this disclosure, well ordered crystalline mesoporous metal oxide systems can be prepared that can result in enhanced sorptive, conductive, structural, catalytic, magnetic and optical properties, in particular, enhanced catalytic activity and selectivity from better transport properties.

Figure 38:
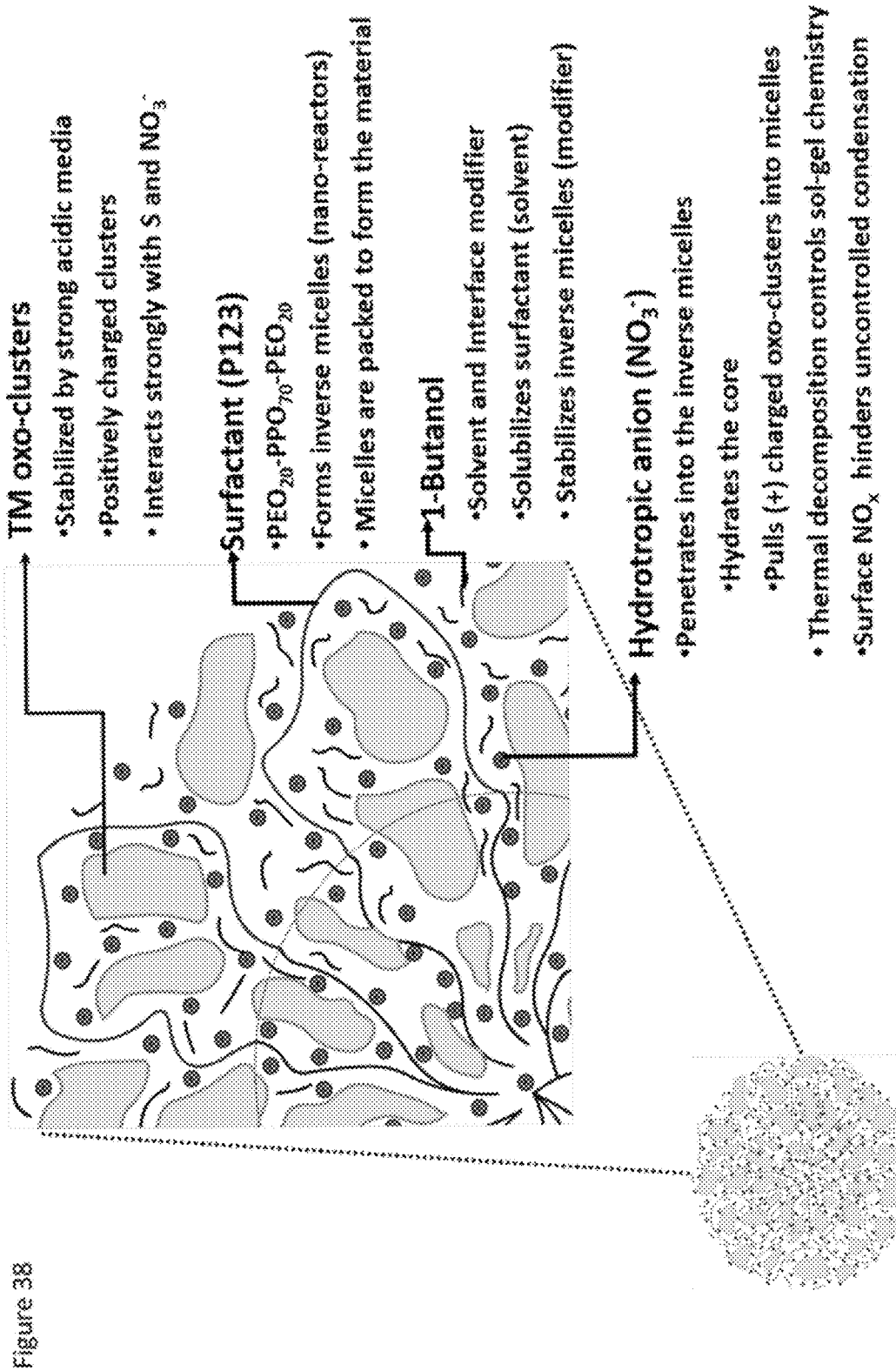
FIG. 38 depicts the sol gel micelle process for preparing well ordered metal oxide mesoporous materials with monomodal uniform pore sizes in accordance with this disclosure.

The process of this disclosure involves a sol-gel micelle based method as depicted in FIG. 38. In an embodiment, the process for preparing $Mn_2O_3$ uses $HNO_3$ at low pH to increase metal precursor solubility, stabilize lower oxidation states, and hydrate the core of the micelles. Mn oxo clusters are stabilized in the 2+ oxidation state. Stronger hydrogen bonding interactions with surfactants occur. In FIG. 38, the surfactant species is Pluronic® P123, which is also the reaction medium. Minimization of water in these syntheses limits the aggregation of metal oxide clusters and confines the entire reaction to the core. An interface modifier like butanol hinders the condensation and limits oxidation of surfactant molecules present in the micelle once the critical micelle concentration (CMC) has been reached. The hydrotropic nitrate ion increases solubility of the Pluronic® P123 surfactant, penetrates into the micelle and decreases the aggregation number (AN), pulls the positively charged manganese oxide clusters into the micelle and balances charge. Referring to Equation 1 herein above, in these syntheses, $\Delta G_{inter}$ (everything is in the micelle) and $\Delta G_{sol}$ (no solvent) are not a concern, $\Delta G_1$ is controlled (confinement in the micelle), and AG, is adjusted with $NO_3^-$ and butanol. The $NO_3^-$ ion is critical and can be monitored with Fourier Transform Infrared (FTIR) spectroscopy. On coordination of $NO_3^-$ to $Mn^{2+}$, symmetry is lowered from $D_{3h}$ to $C_{3v}$, the asymmetric stretching mode (E') splits and a stretching mode at 1060 $cm^{-1}$ appears that is also Raman active. In free nitrate, the asymmetric stretching mode of water is near 1360 $cm^{-1}$. In solid environments, nitrate ions balance positive charges and shifts to lower frequencies. This also brings a further stability to formed nano-crystals by covering the surface of these particles.

During this process, surfactant is oxidized at long reaction times and formed carboxyl groups coordinated to oxomanganese clusters and competes with nitrate to exist in the micelles, although in some systems this is not the case. All samples regardless of reaction time show thermal stability up to 250° C. During the synthesis, carboxylate bands increase while nitrate bands decrease. Spectra are normalized with respect to the Mn—O stretching band (584 $cm^{-1}$). The surfactant C—O stretching mode is between 1050 $cm^{-1}$-1200 $cm^{-1}$. The carboxyl groups are formed due to oxidation of the surfactant at long reaction times. These carboxyl groups are oxidized at 150° C. with a concomitant color change of the solution from black to brown. $NO_3^-$ ions do not fully disappear until 200° C. The carboxyl groups need to be removed to preserve the mesoporous structure. Failure to remove the carboxylate groups leads to unstable mesoporous materials. Depending on reaction conditions, different manganese oxide structures (crystalline walls) can be formed.

In accordance with this disclosure, during thermal treatment, the d-spacings increase. The unit cell expands during heat treatment. The exact position of the d(100) peak depends on the heating temperature and time. Corresponding BET surface area (100-200 $m^2/g$), pore size distributions, and pore volumes (up to 0.22 cc/g) show that mesoporous materials are produced with excellent control of pore size distributions (monomodal). These materials are stable up to 550° C. Such control of pore size distribution, enhanced pore volumes, and thermal stabilities are significant advantages afforded with metal oxide mesoporous compositions prepared in accordance with the process of this disclosure.

As used herein, "thermal stability" means no, or essentially no, degradation of structure at a designated temperature. As used herein, "monomodal" means one, or essentially one, mode as in pore size distribution. As used herein, "control of mesoporosity" means uniform, or essentially uniform, control of pore size, pore size distribution, and shape.

Figure 39:
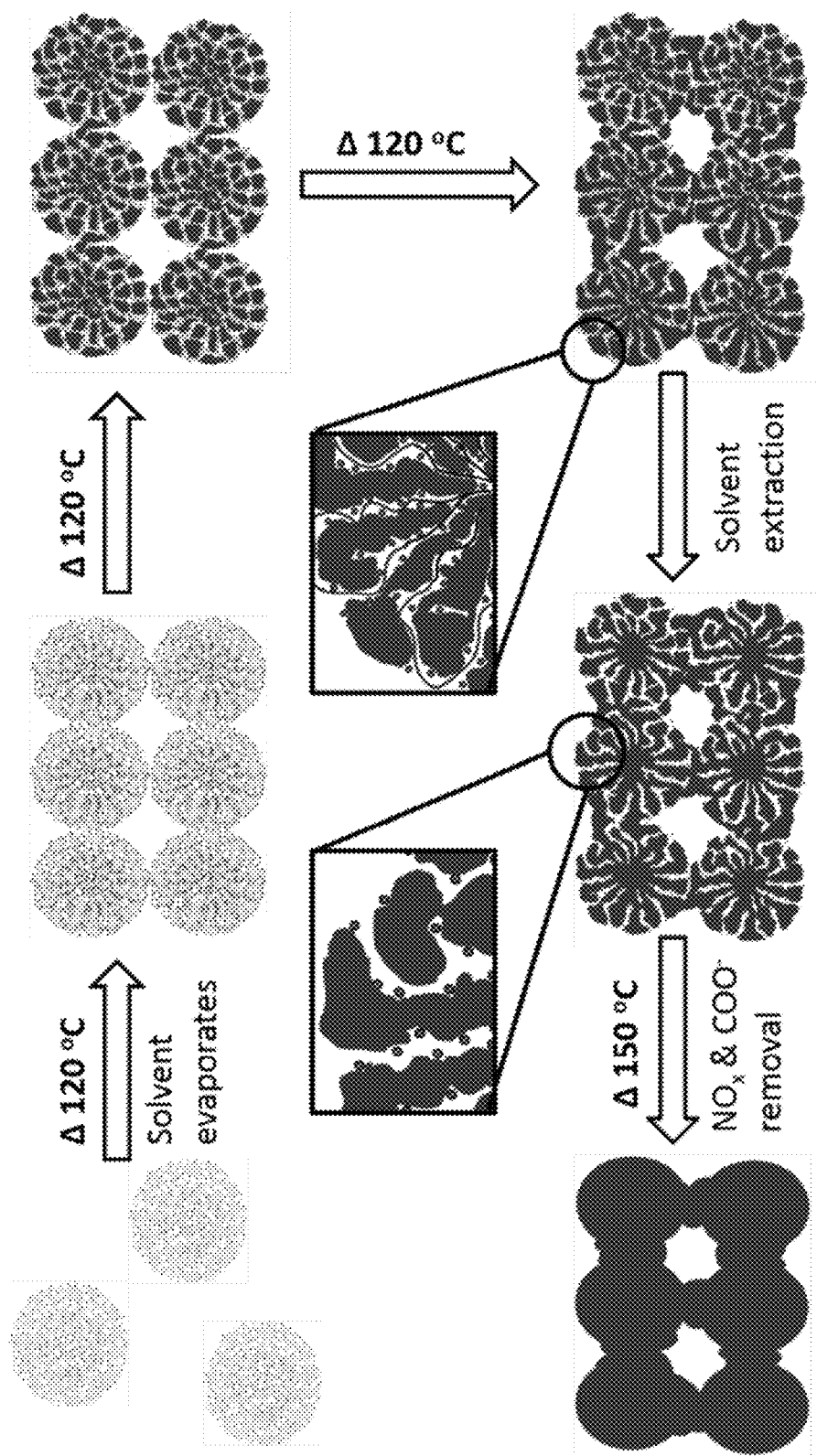
FIG. 39 depicts a proposed mechanism for the formation of highly ordered mesoporous $Mn_2O_3$ in accordance with this disclosure.

Referring to FIG. 39, a proposed mechanism of formation of ordered mesopores is shown. There is pore expansion up to 350° C. Mesopores merge to form larger ordered mesoporous materials between 350° C. and 450° C. The crystalline walls are made up of nanoparticles of manganese oxide that order as observed by X-ray diffraction (XRD), transmission electron microscopy (TEM), and electron diffraction (ED) methods.

In the process of this disclosure, the acidic mixture may comprise water, and may be an aqueous mixture. The mixture may be a solution, a dispersion or an emulsion, a micellar solution, and may be a microemulsion. The mixture may have a pH between about 0.5 and about 5, or between about 1 and about 3. The surfactant may be anionic, cationic, non-ionic, zwitterionic, or mixtures thereof. The surfactant may be a polymeric surfactant, and may be a copolymer surfactant, for example a block copolymer surfactant. The surfactant may be an alkylene oxide block copolymer surfactant, e.g. an EO/PO block copolymer surfactant. The surfactant may be miscible or immiscible with the interface modifier.

The metal precursors useful in the processes of this disclosure can be any water soluble metal salt, preferably metal salts with hydrotropic counter anions and alkoxide sources of any metal. The metal precursors also exhibit moderate alcohol solubility. The metal precursors are conventional materials known in the art and are commercially available.

Illustrative metal precursors include, for example, metal nitrates, metal alkoxides, metal halides, metal phosphates, metal acetates, and $M_xO_y$ oxides that are capable of dissolving in $HNO_3$. More particularly, metal precursors include, for example, $M(NO_3)_x \cdot yH_2O$ (M=Mn, Fe, Co, Cu, Zn, Si), tetraethyl orthosilicate (TEOS), tetramethyl orthosilicate (TMOS), titanium butoxide, zirconium n-propoxide, zirconium butoxide, $Ce(NO_3)_3 \cdot 6H_2O$, $Gd(NO_3)_3 \cdot 6H_2O$, $Sm(NO_3)_3 \cdot 6H_2O$, and the like.

Other metal precursors useful in the process of this disclosure include, for example, metal $Cl^-$, $I^-$, $SCN^-$, $SO_4^{2-}$, $F^-$ salts, and the like. Preferably, any metal and metal oxide which $HNO_3$ can dissolve can be used. Any metal salt which does not form insoluble nitrate salts can be used.

The metal precursors useful in the process of this disclosure include precursors of transition metals, Lanthanide metals, post-transition metals, metalloids, and mixtures thereof. For example, the transition metal precursors comprise Group 3-12 transition metal precursors, in particular, Sc, Y, La, Ti, Zr, Hf, V, Nb, Ta, Cr, Mo, W, Mn, Tc, Re, Fe, Ru, Os, Co, Rh, Ir, Ni, Pd, Pt, Cu, Ag, Au, Zn, Cd and Hg precursors. In an embodiment, the transition metal precursors are selected from Group 6-12 transition metal precursors including Cr, Mo, W, Mn, Tc, Re, Fe, Ru, Os, Co, Rh, Ir, Ni. Pd, Pt, Cu, Ag, Au, Zn, Cd and Hg precursors. Preferably, the Group 6-12 transition metal precursors include Mn, Fe, Co, Ni, Cu and Zn precursors. The Lanthanide metal precursors include La, Ce, Pr, Nd, Pm, Sm, Eu, Gd, Tb, Dy, Ho, Er, Tm, Yb and Lu precursors, or any mixture thereof. The post-transition metal precursors include Al, Ga, In, Tl, Sn, Pb and Bi precursors, or any mixture thereof. The metalloid precursors include B, Si, Ge, As, Sb, Te, Po and At precursors, or any mixture thereof.

The concentration of the metal precursors used in the process of this disclosure can vary over a wide range and need only be at a concentration sufficient to form the mesoporous metal oxides. The metal precursors can be present in a molar concentration ratio of from about $1 \times 10^{-2}$M to about 10M, preferably from about $1 \times 10^{-1}$M to about 5M, and more preferably from about $5 \times 10^{-1}$M to about 1M (based on a total volume of 10 milliliters).

The interface modifiers useful in the processes of this disclosure can be any aliphatic, alicyclic or aromatic hydrocarbons of between about 1 and about 20 carbon atoms, e.g., butanol. The interface modifiers are conventional materials known in the art and are commercially available. Any organic solvents that allow the surfactant to organize itself into inverse micelles are useful in the processes of this disclosure.

Illustrative interface modifiers include, for example, aliphatic, alicyclic and aromatic hydrocarbons of between about 1 and about 20 carbon atoms, including mixtures thereof. The aliphatic hydrocarbons may be branched or straight chain. The aliphatic, alicyclic and aromatic hydrocarbons include, for example, n-butanol, pentanol, hexanol, higher carbon-containing alcohols, trimethyl benzene (TMB), acetylacetonate, lauric acid, toluene, benzene, cyclohexene, any carboxylic group containing organic molecule such as glucose, terpene, terpenoid hydrocarbons, citrus terpenes, d-limonene, and the like, and mixtures thereof. The aliphatic, alicyclic and aromatic hydrocarbons may have between 1 and 20, 1 and 18, 1 and 16, 1 and 12, 1 and 10, or 1 and 8 carbon atoms.

The concentration of the interface modifiers used in the process of this disclosure can vary over a wide range and need only be at a concentration sufficient to form the mesoporous metal oxides. The interface modifiers can be present in a molar concentration ratio of from about 1 M to about 40 M, preferably from about 2 M to about 15 M, and more preferably from about 5 M to about 10 M (based on a total volume of 10 milliliters).

The concentration of the interface modifiers used in the process of this disclosure can vary over a wide range depending on the interface modifier type. More hydrotropic ions should be used in smaller amounts of interface modifiers and vice versa. This ratio can reach 5-50 M since the interface modifier is evaporated and its upper limit can be varied. Also, scaling up the reaction can be done by varying this ratio.

The hydrotropic ion precursors useful in the processes of this disclosure can be any hydrotropic anion beyond chloride in the Hoffmeister series, including mixtures thereof. The hydrotropic ion precursors are conventional materials known in the art and are commercially available.

Illustrative hydrotropic ion precursors include, for example, $HNO_3$, $NaNO_3$, $KNO_3$, metal halides (e.g., metal iodides), metal thiocyanides, and the like. Illustrative hydrotropic ions include, for example, $NO_3^-$, $SCN^-$, $Br^-$, $I^-$, an organic modifier such as ethylene glycol, and the like. A modifier can be used to modify the hydrotropic part such as F, 3,3',5,5'-tetramethylbenzidine (TMB), aromatic compounds, $Cl^-$, $SO_4^{2-}$, and the like.

The concentration of the hydrotropic ion precursors used in the process of this disclosure can vary over a wide range and need only be a concentration sufficient to form the mesoporous metal oxides. The hydrotropic ion precursors can be present in a molar concentration ratio of from about $1 \times 10^{-2}$ M to about 15 M, preferably from about $1 \times 10^{-1}$ M to about 10 M, and more preferably from about 1 M to about 5 M (based on a total volume of 10 milliliters).

One or more acids may be used in the process of this disclosure to prepare the acidic mixture. As described herein, the acidic mixture may have a pH between about 0.5 and about 5, or between about 1 and about 3. The pH of the mixture can be adjusted by the addition of an acid. The acid and the hydrotropic ion precursor can be the same or different. For example, the acid and the hydrotropic ion precursor can both be $HNO_3$. Illustrative acids useful in the process of this disclosure include, for example, $HNO_3$. If the hydrotropic ion precursor is an acid, e.g., $HNO_3$, then the addition of an acid may not be needed. High pH systems can be used with metals that show high solubility at low and high pH values.

The concentration of the acid used in the process of this disclosure can vary over a wide range and need only be at a concentration sufficient to impart to the mixture a pH between about 0.5 and about 5, or between about 1 and about 3.

The replacement of nitrate ions with a material that can gradually decrease the pH under process conditions may be useful in the process of this disclosure. Atmospheres of urea vapor or ammonia or other volatile bases may be useful in accomplishing the above.

Hydrocyanation may be used, or HF or other acids. The concepts of the use of an acid or a base and controlling pH are embodiments of this disclosure.

The surfactants useful in the processes of this disclosure can be any anionic, cationic, non-ionic, zwitterionic surfactant, or mixtures thereof. The surfactants are conventional materials known in the art and are commercially available.

Illustrative surfactants include, for example, anionic, cationic, non-ionic, zwitterionic, or mixtures thereof. The surfactant may be a polymeric surfactant, and may be a copolymer surfactant. The copolymer surfactant may be a block copolymer, or may be a random copolymer, an alternating copolymer or some other type of copolymer. The block copolymer may be a diblock, triblock or other copolymer. The block copolymer may have between 2 and 5 blocks or more than 5 blocks. The block copolymer may have an odd or an even number of blocks, and may have 2, 3, 4 or 5 blocks. The block copolymer may have hydrophilic blocks alternating with hydrophobic blocks. The terminal blocks may be hydrophobic, or may be hydrophilic, or one may be hydrophilic and one hydrophobic. The copolymer surfactant may have 2, 3, 4, 5 or more than 5 different types of blocks (i.e. different monomers). The surfactant may be an alkylene oxide block copolymer surfactant. The surfactant may be an EO/PO copolymer surfactant, e.g. an EO/PO block copolymer surfactant. Suitable surfactants include Pluronic® P65 (EO20PO30EO20), Pluronic® P85 (EO26PO40EO26), Pluronic® 25R4, Pluronic® F108 (EO129PO56EO129), Pluronic® P123 (EO20PO70EO20) and Pluronic® F127 (EO97PO69EO97). The surfactant may be miscible or immiscible, or may be partially miscible, with the interface modifier.

Other illustrative surfactants useful in the process of this disclosure include, for example, a Triton® surfactant, a Tween® surfactant, glucose, or an AB or BC polymer surfactant, wherein A is polyisoprene butylene, B is styrene, and C is selected from glucose, amine, carboxyl group-containing compound, and polyethylene glycol (PEG).

Still other illustrative surfactants include an ethoxylated Castor oil, an ethoxylated coconut fatty acid, or an amidified, ethoxylated coconut fatty acid.

An ethoxylated castor oil can include, for example, a polyoxyethylene (20) castor oil, CAS No. 61791-12-6, PEG (polyethylene glycol)-10 castor oil, PEG-20 castor oil, PEG-3 castor oil, PEG-40 castor oil, PEG-50 castor oil, PEG-60 castor oil, POE (polyoxyethylene) (10) castor oil, POE(20) castor oil; POE (20) castor oil (ether, ester); POE(3) castor oil, POE(40) castor oil, POE(50) castor oil, POE(60) castor oil, or polyoxyethylene (20) castor oil (ether, ester).

An ethoxylated coconut fatty acid can include, for example, CAS No. 39287-84-8, CAS No. 61791-29-5, CAS No. 68921-12-0, CAS No. 8051-46-5, CAS No. 8051-92-1, ethoxylated coconut fatty acid, polyethylene glycol ester of coconut fatty acid, ethoxylated coconut oil acid, polyethylene glycol monoester of coconut oil fatty acid, ethoxylated coco fatty acid. PEG-15 cocoate, PEG-5 cocoate, PEG-8 cocoate, polyethylene glycol (15) monococoate, polyethylene glycol (5) monococoate, polyethylene glycol 400 monococoate, polyethylene glycol monococonut ester, monococonate polyethylene glycol, monococonut oil fatty acid ester of polyethylene glycol, polyoxyethylene (15) monococoate, polyoxyethylene (5) monococoate, or polyoxyethylene (8) monococoate.

An amidified, ethoxylated coconut fatty acid can include, for example, CAS No. 61791-08-0, ethoxylated reaction products of coco fatty acids with ethanolamine, PEG-11 cocamide, PEG-20 cocamide, PEG-3 cocamide, PEG-5 cocamide, PEG-6 cocamide, PEG-7 cocamide, polyethylene glycol (11) coconut amide, polyethylene glycol (3) coconut amide, polyethylene glycol (5) coconut amide, polyethylene glycol (7) coconut amide, polyethylene glycol 1000 coconut amide, polyethylene glycol 300 coconut amide, polyoxyethylene (11) coconut amide, polyoxyethylene (20) coconut amide, polyoxyethylene (3) coconut amide, polyoxyethylene (5) coconut amide, polyoxyethylene (6) coconut amide, or polyoxyethylene (7) coconut amide.

The surfactant can be, for example, one or more of Alfoterra® 123-8S, Alfoterra® 145-8S, Alfoterra® L167-7S, Ethox® HCO-5, Ethox® HCO-25, Ethox® CO-40, Ethox® ML-5, Ethal® LA-4, AG-6202, AG-6206, Ethox® CO-36, Ethox® CO-81, Ethox® CO-25, Ethox® TO-16, Ethsorbox® L-20, Ethox® MO-14, S-MAZ 80K, T-MAZ 60 K 60, Tergitol® L-64, Dowfax® 8390, Alfoterra® L167-4S, Alfoterra® L123-4S, and Alfoterra® L145-4S.

The surfactant can be, for example, one or more of castor oil, cocoa oil, cocoa butter, coconut oil, soy oil, tallow oil, cotton seed oil, a naturally occurring plant oil and a plant extract. Further, the surfactant can be, for example, one or more of an alkyl polyglucoside or an alkyl polyglucoside-based surfactant, a decyl polyglucoside or an alkyl decyl-polyglucoside-based surfactant.

The concentration of the surfactant used in the process of this disclosure can vary over a wide range and need only be a concentration sufficient to form the mesoporous metal oxides. The surfactant can be present in a molar concentration ratio of from about $1 \times 10^{-5}$ M to about 1 M, preferably from about $1 \times 10^{-4}$ M to about $1 \times 10^{-1}$ M, and more preferably from about $1 \times 10^{-3}$ M to about $1 \times 10^{-2}$ M (based on a total volume of 10 milliliters).

The step of preparing the acidic mixture may comprise combining the metal precursor with an interface modifier, a hydrotropic ion precursor, and a surfactant. The mixture may be a solution, a micellar solution, a microemulsion, an emulsion, a dispersion or some other type of mixture. The ratio of metal precursor to surfactant may be between about 1:100 and about 1:2 on a w/w, v/v or w/v basis, and may be about 1:20. Before, during and/or after the combining, the acidic mixture may be agitated, e.g. shaken, stirred, swirled, sonicated or otherwise agitated. The mixture may have a pH between about 0.5 and about 5, or between about 1 and about 3.

The metal precursor, interface modifier, hydrotropic ion precursor, and surfactant may be added to the mixture in any combination or at any stage during the process of preparing the acidic mixture. The metal precursor, interface modifier, hydrotropic ion precursor, and surfactant may be added with or without agitation. Ti and Zr are exceptions. In these preparations, $HNO_3$ is first diluted in butanol.

The process may comprise the step of agitating the acidic mixture to form a solution, a dispersion or an emulsion. The emulsion may be a microemulsion. The agitating may be vigorous, moderate or mild. It may comprise shaking, stirring, sonicating, ultrasonicating, swirling or some other form of agitation. The step of reacting may comprise the step of agitating the acidic mixture or the step of agitating the acidic mixture may be a separate step conducted before the step of reacting.

In accordance with the process of this disclosure, the acidic mixture is heated at a temperature and for a period of time sufficient to form the mesoporous metal oxide. In particular, the acidic mixture is heated at a temperature and for a period of time sufficient to form a dried powder. The dried powder is first washed with an alcohol, e.g., ethanol, to remove organic components, e.g., surfactant, and then heated at a temperature and for a period of time sufficient to form the mesoporous transition metal oxide. The heating may be in air, or in some other gas, for example, oxygen, nitrogen, carbon dioxide, helium, argon or a mixture of any two or more of these.

The acidic mixture is heated sequentially in the following manner. The acidic mixture can be first heated at a temperature from about 75° C. to about 150° C., preferably from about 85° C. to about 140° C., and more preferably from about 90° C. to about 130° C., for a period from about 1 to about 12 hours, preferably from about 1 to about 10 hours, and more preferably from about 1 to about 8 hours. Thereafter, the acidic mixture can be heated at a temperature from about 40° C. to about 80° C., preferably from about 45° C. to about 75° C., and more preferably from about 50° C. to about 70° C., for a period from about 1 to about 12 hours, preferably from about 1 to about 10 hours, and more preferably from about 1 to about 8 hours, to form the dried powder. This sequential heating is carried out in a manner sufficient to remove chemisorbed and/or physisorbed $NO_3$ and any left over $NO_x$.

The dried powder is heated sequentially in the following manner. Firstly, the dried powder is heated at a temperature from about 100° C. to about 200° C., preferably from about 125° C. to about 175° C., and more preferably from about 140° C. to about 160° C., for a period from about 2 to about 20 hours, preferably from about 4 to about 18 hours, and more preferably from about 6 to about 16 hours. Secondly, the dried powder is heated at a temperature from about 200° C. to about 300° C., preferably from about 225° C. to about 275° C., and more preferably from about 240° C. to about 260° C., for a period from about 1 to about 10 hours, preferably from about 2 to about 8 hours, and more preferably from about 2 to about 6 hours. Thirdly, the dried powder is heated at a temperature from about 300° C. to about 400° C., preferably from about 325° C. to about 375° C., and more preferably from about 340° C. to about 360° C., for a period from about 1 to about 8 hours, preferably from about 1 to about 7 hours, and more preferably from about 1 to about 6 hours. Fourthly, the dried powder is heated at a temperature from about 400° C. to about 500° C., preferably from about 425° C. to about 475° C., and more preferably from about 440° C. to about 460° C., for a period from about 0.5 to about 5 hours, preferably from about 1 to about 4 hours, and more preferably from about 1 to about 3 hours. Fifthly, the dried powder is heated at a temperature from about 500° C. to about 600° C., preferably from about 525° C. to about 575° C., and more preferably from about 540° C. to about 560° C., for a period from about 0.1 to about 2 hours, preferably from about 0.25 to about 2 hours, and more preferably from about 0.5 to about 2 hours.

In an embodiment, the acidic mixture is heated sequentially as follows: at a temperature of about 100° C.-120° C. for a period of about 2-7 hours; and at a temperature of about 60° C. for a period of about 8-12 hours (e.g., overnight). In another embodiment, the dried powder is heated sequentially as follows: at a temperature of about 150° C. for a period of about 12 hours; at a temperature of about 250° C. for a period of about 4 hours; at a temperature of about 350° C. for a period of about 3 hours; at a temperature of about 450° C. for a period of about 2 hours; and at a temperature of about 550° C. for a period of about 1 hour.

The process of this disclosure can be conducted at a pressure sufficient to form the mesoporous metal oxide materials. Positive or negative pressures may be useful in the process of this disclosure. Suitable combinations of pressure, temperature and contact time may be employed in the process of this disclosure, in particular, temperature-pressure relationships that give mesoporous metal oxide materials having desired properties and/or characteristics. The pressure may range between about ambient and about 50 atmospheres, preferably between about ambient to about 40 atmospheres, and more preferably between about ambient to about 25 atmospheres. Normally the process is carried out at ambient pressure.

The process may additionally comprise washing the dried powder, e.g., nanoparticulates, for a period of time sufficient to remove organic components therefrom. The washing liquid may be water, or an aqueous liquid, or with a non-aqueous liquid, or an organic liquid (e.g., ethanol), or some combination of these. The particles may be washed once or more than once, and may be washed between 1 and about 10 times or more. Each wash may be with the same washing liquid as any other wash, or may be with a different washing liquid. The washing may comprise exposing the nanoparticulates to the washing liquid, e.g. suspending the nanoparticulates in the washing liquid, and then separating the nanoparticulates from the washing liquid, using any of the separating processes described herein. In particular, the dried powder is washed with ethanol for a period of time sufficient to remove surfactant therefrom.

The process may additionally comprise at least partially separating the nanoparticulates from a fluid (e.g., washing fluid) in which they are located (optionally suspended or dispersed). This may comprise filtering, settling, decanting, centrifuging, vacuum filtering, dialysis, membrane filtering, magnetic separation, or some other suitable process, and may comprise more than one of these.

In an embodiment, the mesoporous metal oxides can be nanoparticulates having a particle size between about 1 and about 500 nm, or between about 50 and about 300 nm, and a mean pore size between about 1 and about 50 nm, or between about 1 and about 30 nm or greater than 2 nm, or between about 2 and 13 nm. The nanoparticulates may have a 3-D cubic or 3-D foam-like mesostructure, or may have a 2-D hexagonal or wormlike mesostructure. The mesoporous nanoparticulates may comprise mesoporous transition metal oxides, Lanthanide metal oxides, post-transition metal oxides and metalloid oxides. The mesoporous metal oxides may be doped with other elements, for example titanium, aluminum or zirconium. The mesoporous nanoparticulates may be spherical or some other regular shape. There is also provided a plurality of mesoporous nanoparticulates. The mean particle size of the nanoparticulates may be between about 1 and about 500 nm. The particle size distribution may be broad or narrow. There may be less than about 50% of nanoparticulates having a particle size more than 10% different from (greater than or less than) the mean particle size.

The mesoporous metal oxides prepared by the process of this disclosure include oxides of transition metals, Lanthanide metals, post-transition metals, metalloids, and mixtures thereof. For example, the transition metal oxides comprise Group 3-12 transition metal oxides, in particular, Sc, Y, La, Ti, Zr, Hf, V, Nb, Ta, Cr, Mo, W, Mn, Tc, Re, Fe, Ru, Os, Co, Rh, Ir, Ni. Pd, Pt, Cu, Ag, Au, Zn, Cd and Hg oxides. In an embodiment, the transition metal oxides are selected from Group 6-12 transition metal oxides including Cr, Mo, W, Mn, Tc, Re, Fe, Ru, Os, Co, Rh, Ir, Ni, Pd, Pt, Cu. Ag, Au, Zn, Cd and Hg oxides. Preferably, the Group 6-12 transition metal oxides include Mn, Fe, Co, Ni, Cu and Zn oxides. The Lanthanide metal oxides include La, Ce. Pr, Nd, Pm, Sm, Eu, Gd, Tb, Dy, Ho, Er, Tm, Yb and Lu oxides, or any mixture thereof. The post-transition metal oxides include Al, Ga, In, TI, Sn, Pb and Bi oxides, or any mixture thereof. The metalloid oxides include B, Si, Ge, As, Sb, Te, Po and At oxides, or any mixture thereof.

The surface area of the mesoporous metal oxide particulates, e.g. BET surface area, maybe between about 50 and about 1000 $m^2/g$, and may be between about 60 and 500, 70 and 200 and 80 and 190, $m^2/g$, and may be about 50, 75, 100, 125, 150, 175 or 200 $m^2/g$.

The pore volume (BJH) may be between about 0.05 and about 2 $cm^3/g$, or between about 0.075 and 2, and 0.1 and 2 $cm^3/g$, and may be about 0.05, 0.1, 0.15, 0.2 or 0.25 $cm^3/g$.

The pore size (diameter), e.g., BJH desorption, may be between about 1 and 50 nm, or between about 1.5 and 50 nm, 1.5 and 20 nm, 2 and 15 nm, and 2 and 13 nm, and may be about 2.0, 2.5, 3.0, 3.5, 4.0, 4.5, 0.5.0, 5.5 and 6 nm.

The wall thickness (2d/43−PD, where d is the d-spacing and PD is the pore diameter) may be between about 2 and about 20 nm, or between about 3 and about 16 nm, 4 and 14 nm, or 5 and 12 nm, and may be about 5.0 5.5, 6.0, 6.5, 7.0, 7.5, 8.0, 8.5, 9.0, 9.5 and 10.0 nm. The formula applies to 2-dimensional hexagonal materials.

The crystal structures of the nano-sized metal oxide walls include, for example, $CeO_2$, $Mn_2O_3$, $Mn_3O_4$, $Fe_2O_3$, $Co_3O_4$, ZnO, CuO, $TiO_2$ (Anatase), $ZrO_2$, NiOOH, and the like.

The mesoporous particulates may be round or spherical, or may be oblate spherical, rod-like, aggregated, ellipsoid, ovoid, a modified oval shape, dome shaped, hemispherical; a round ended cylinder, capsule shaped, discoid, prismatic, acicular or polyhedral (either regular or irregular) such as a cube, a rectangular prism, a rectangular parallelepiped, a triangular prism, a hexagonal prism, rhomboid or a polyhedron with between 4 and 60 or more faces, or may be some other shape, for example an irregular shape.

The mesoporous metal oxides of this disclosure exhibit properties that are advantageous for specific applications. For example, the mesoporous metal oxides can exhibit thermal stability up to a temperature of about 350° C., preferably up to a temperature of about 450° C., and more preferably up to a temperature of about 550° C. Also, the mesoporous metal oxides can exhibit high pore volume after heat treatment cycles. For example, the unit cell expansion and pore-size increase do not cause a significant change at pore volume. In other words, ideally for a given material, one can change the pore size from the super micropore region (about 2 nm) to the mid mesopore region (about 20 nm) by preserving pore volume. Further, the mesoporous metal oxides can exhibit physicochemical properties after catalytic reactions under high pressure and temperature. For example, catalytic tests done on mesoporous $ZrO_2$ and $CeO_2$ under 20 bar pressure of $N_2$ or $H_2$ at 150° C. did not cause any change of physicochemical properties of the materials.

The mesoporous metal oxide nanoparticulates, or a plurality thereof, can be useful for a variety of applications including, for example, catalysis, gas adsorption, synthesis of quantum dots and magnetic nanoparticles in functional materials and bioimaging applications, and as carriers for drugs, genes and proteins for biomedical applications. In particular, the mesoporous metal oxides are useful as catalysts, sensors, batteries and energy production, optical displays, environmental and sorbent applications.

There are several advantages afforded by the method of this disclosure including, for example, control of the crystal structure of the wall during heating, the possibility of synthesis without surfactant, precise control of pore size, and the method can be extended to a variety of transition metal oxides, Lanthanide oxides, post-transition metal oxides and metalloid oxides. The Pluronic® P123 surfactant is non-ionic and low foaming. Other advantages of the process of this disclosure for the synthesis of mesoporous metal oxides are that $H^+$ is not a concern, in principle the process is applicable to all transition metals, Lanthanide metals, port-transition metals and metalloids, different types of surfactants can be used, gelation is not required, the crystal structure (i.e., for manganese oxides, Hausmannite, Pyrolusite, Bixbyite) can all be formed, thickness of walls can be controlled, fine tuning of magnetic and optical properties is possible, and pore expansion on heat treatment of the mesoporous materials occurs. Highly optically pure glass materials, light sensitive lenses and ultra violet absorbing lenses for plastic or glass materials may be made in accordance with the process of this disclosure.

In the above detailed description, the specific embodiments of this disclosure have been described in connection with its preferred embodiments. However, to the extent that the above description is specific to a particular embodiment or a particular use of this disclosure, this is intended to be illustrative only and merely provides a concise description of the exemplary embodiments. Accordingly, the disclosure is not limited to the specific embodiments described above, but rather, the disclosure includes all alternatives, modifications, and equivalents falling within the true scope of the appended claims. Various modifications and variations of this disclosure will be obvious to a worker skilled in the art and it is to be understood that such modifications and variations are to be included within the purview of this application and the spirit and scope of the claims.

All reactions in the following examples were performed using as-received starting materials without any purification.

Example 1

Synthesis of Mesoporous Transition Metal Oxides

Various transition metal oxides were synthesized by following procedure. 0.01 mol $M(NO_3)_x \cdot yH_2O$ (M=Mn, Fe, Co, Cu, Zn), 0.09-0.18 mol n-butanol (7-14 grams), 0.016-0.032 mol $HNO_3$ (1-2 grams) and 1 gram of surfactant (Pluronic® P123 or Pluronic® F127) were mixed in a 50 milliliter beaker and homogenized by stirring at room temperature. The resulting clear solution was directly put in an oven running at 100° C.-120° C. (depending on metal system studied) and kept at that temperature for 2-7 hours (variations of concentrations, temperature and duration of experiment depend on the metal system studied). Synthesized materials were washed with ethanol several times to remove organic components and dried in an oven running at 60° C. overnight.

Dry powders were heated in an oven at the following temperatures and time intervals; 150° C. (12 hours), 250° C. (4 hours), 350° C. (3 hours), 450° C. (2 hours) and finally at 550° C. (1 hour) (all heating steps applied in this order).

Example 2

Characterization of Nanocomposite Materials

The mesostructure of synthesized and heat treated materials was determined by low angle powder X-ray diffraction (PXRD). The crystal structure of materials was characterized by PXRD technique. Pore structural properties were determined by nitrogen sorption. Surface areas were determined by the BET (Brunauer-Emmett-Teller) method and pore sizes are determined from the desorption branch of the corresponding isotherm by the BJH (Barret-Joyner-Halenda) method. SEM (scanning electron microscopy) and TEM (transmission electron microscopy) were collected in order to determine particle, surface morphologies and mesopores respectively.

Figure 2:
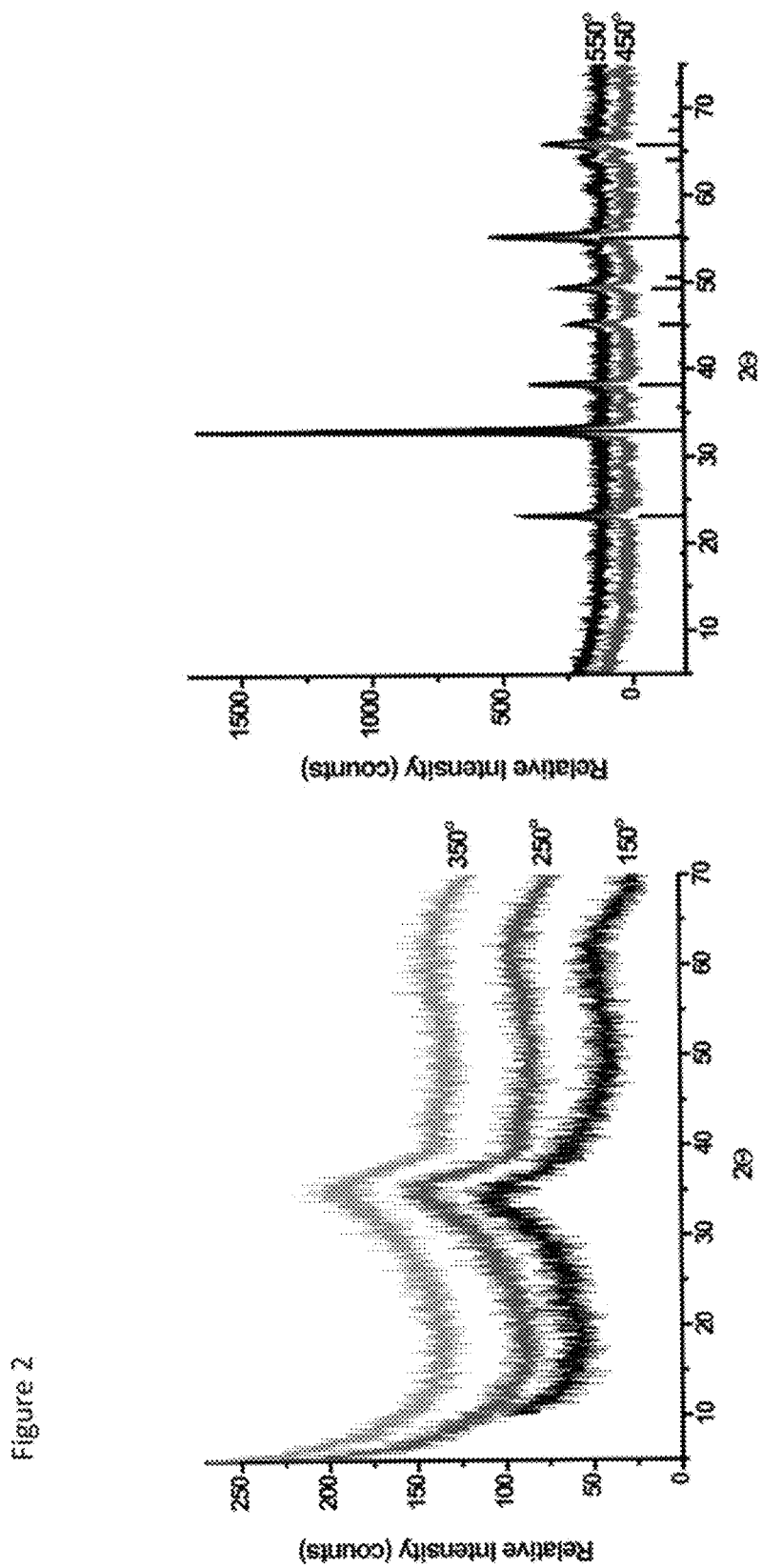
FIG. 2 depicts wide angle PXRD of mesoporous $Mn_2O_3$ samples recorded for powders at different final heat treatment temperatures, as prepared in Examples 1 and 2.
Figure 3:
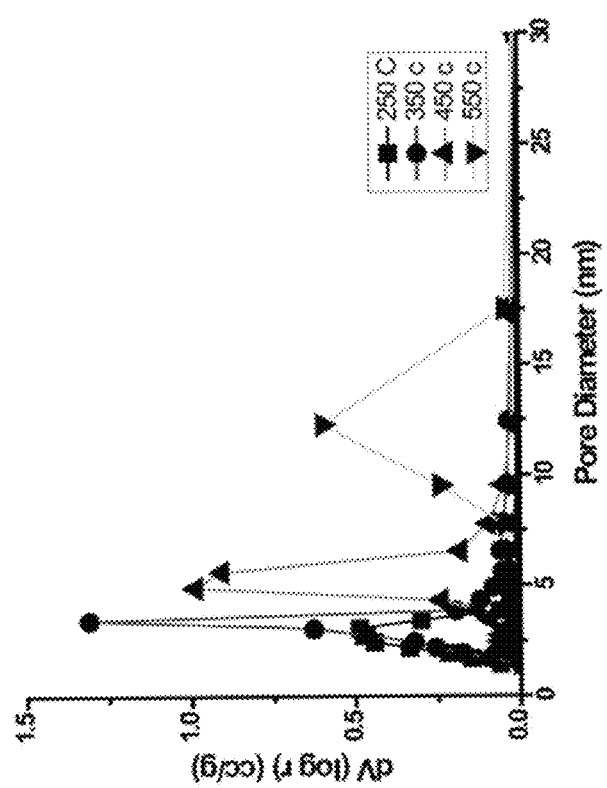
FIG. 3 depicts (a) nitrogen sorption isotherms of mesoporous $Mn_2O_3$ materials heated to different final temperatures, and (b) a BJH desorption pore size distribution graph of corresponding samples, as prepared in Examples 1 and 2.
Figure 3:
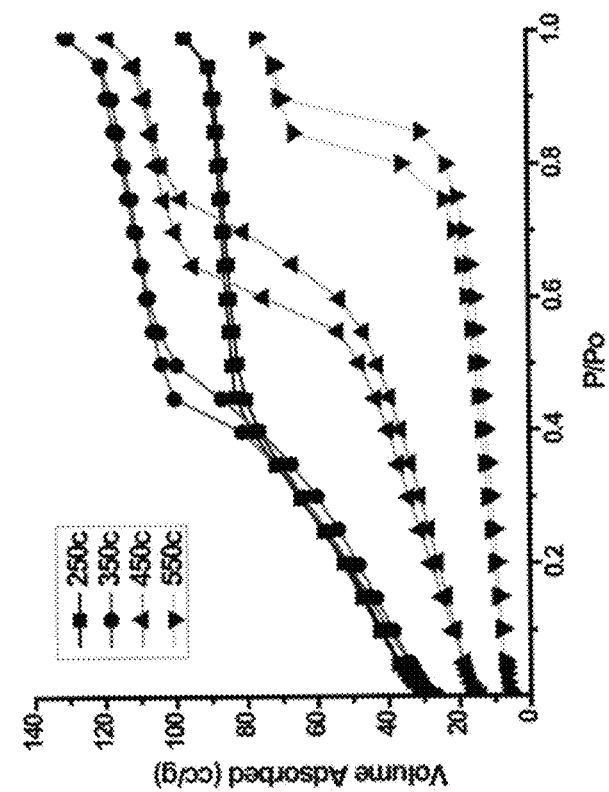
Figure 4:
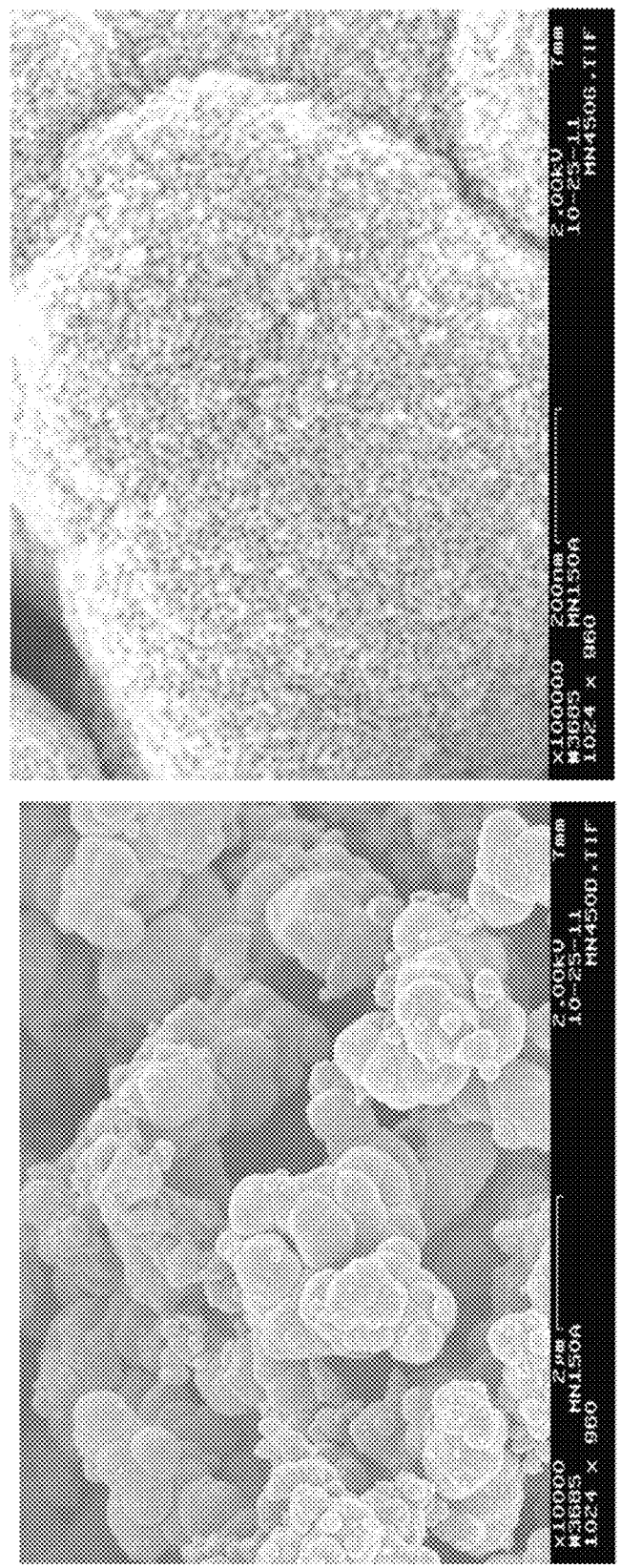
FIG. 4 depicts scanning electron microscope (SEM) images of mesoporous $Mn_2O_3$ samples with final heat treatment temperature of 450° C., as prepared in Examples 1 and 2.

FIG. 1 shows the low angle PXRD data of Mesoporous Manganese Oxide (MMO) and unit cell expansion by heat treatment. As seen from the data, diffraction lines gets sharper and shift to lower angles throughout heat treatment indicating an increase in order of mesoporous material and expansion in unit cell dimensions. FIG. 2 shows the wide angle PXRD patterns of MMO materials treated at different final temperatures. Up to 450° C. diffraction patterns show broad diffraction lines indicating that materials are not well ordered (or amorphous) or consist of nano-sized crystalline domains. However, MMO materials have well defined crystal structures above this temperature. Diffraction lines for these materials can be indexed to the $Mn_2O_3$ (Bixbyite) crystal structure. FIG. 3 shows nitrogen sorption isotherm of MMO samples with different final heat treatment temperatures and corresponding BJH desorption pore size distributions. All MMO materials have type IV isotherms regardless of the final heat treatment temperature applied. As seen from the pore size distributions, pore size expands constantly with increased temperature. As stated before pore size expansion has not been observed for either heat treated or calcined samples. FIG. 4 shows scanning electron microscope (SEM) images of MMO samples with final heat treatment temperature of 450° C.

The structural parameters of the MMO samples obtained by combining the PXRD and nitrogen sorption data are given in Table 2 below.

TABLE 2

| Δ (max) | SA (BET) | Pore Volume (BJH) | Pore Diameter (BJH des) | Wall thickness* |
|---|---|---|---|---|
| 250 C.° | 200 m²\g | 0.153 cc\g | 2.8 nm | 4.7 nm |
| 350 C.° | 191 m²\g | 0.224 cc\g | 3.7 nm | 5.2 nm |
| 450 C.° | 100 m²\g | 0.200 cc\g | 5.3 nm | 8.0 nm |
| 550 C.° | 35 m²\g | 0.125 cc\g | 12.3 nm | 7.9 nm |

Wall Thickness = $(2d/\sqrt{3} - PD$, where d is the d-spacing and PD is the pore diameter)

Example 3

Other mesoporous transition metal oxides were prepared in a manner similar to MMO in Example 1. The conditions for the preparation of these mesoporous transition metal oxides are set forth in Table 3 below. As used in Table 3, TEOS is tetraethyl orthosilicate $Si(OC_2H_5)_4$ and $Ti(OCH(CH_3)_2)_4$ is tetra-isopropoxide titanium or titanium isopropoxide.

TABLE 3

| Metal | Metal Amount (mol) | Butanol (g-mol) | HNO₃ (g-mol) | P123 (g-mol) | Reaction Temperature T ° C. | Traction time t (h) |
|---|---|---|---|---|---|---|
| Manganese Mn(NO₃)₂•4H₂O | 0.01 mol | 7 g-0.094 mol | 1 g-0.016 mol | 1 g-1.7 * 10⁻⁴ mol | 120° | 4 h |
| Iron Fe(NO₃)₃•6H₂O | 0.01 mol | 8.5 g-0.115 mol | 1.2 g-0.019 mol | 1.2 g-2.04 * 10⁻⁴ mol | 100° | 2-3 h |
| Cobalt Co(NO₃)₂•6H₂O | 0.01 mol | 8.5 g-0.115 mol | 1.2 g-0.019 mol | 1.2 g-2.04 * 10⁻⁴ mol | 120° | 4-6 h |
| Nickel Ni(NO₂)₃•6H₂O | 0.01 mol | 10 g-0.135 mol | 1.2 g-0.019 mol | 1.2 g-2.04 * 10⁻⁴ mol | 120° | 4 h |
| Copper Cu(NO₃)₂•XH₂O | 2 g-0.01 mol | 7 g-0.094 mol | 1 g-0.016 mol | 1.5 g-2.6 * 10⁻⁴ mol | 120° | 2-3 h |
| Zinc Zn(NO₃)₂•6H₂O | 0.01 mol | 7 g-0.094 mol | 1 g-0.016 mol | 1.5 g-2.6 * 10⁻⁴ mol | 120° | 5-6 h |
| Ceria Ce(NO₃)₂•6H₂O | 0.01 mol | 7 g-0.094 mol | 1 g-0.016 mol | 1.5 g-2.6 * 10⁻⁴ mol | 120° | 6 h |
| Silica TEOS | 0.0099 mol | 7 g-0.094 mol | 7 g (Butanol)l + 1 g-0.016 mol (HNO₃) | 1 g-1.7 * 10⁻⁴ mol | 120° | 4-6 h |
| Titanium Ti(OCH(CH₃)₂)₄ | 0.0094 mol | 7 g-0.094 mol | 7 g (Butanol)l + 1 g-0.016 mol (HNO₃) | 1 g-1.7 * 10⁻⁴ mol | 120° | 3-5 h |
| Aluminum Silicate Al:Si = 1:5 TEOS and Al(NO₃)₂ 9H₂O | 0.0099 mol (TEOS) 0.0018 mol (Aluminum nitrate) | 7 g-0.094 mol | 7 g (Butanol)l + 1 g-0.016 mol (HNO₃) | 1 g-1.7 * 10⁻⁴ mol | 120° | 4-6 h |

| Metal | Heating Cycles | Observations |
|---|---|---|
| Manganese Mn(NO₃)₂•4H₂O | 150° C. (12 h)-250° C. (4 h)-350° C. (3 h)-450° C. (2 h)-550° C. (1 h) | Yellow gel after 1 h. Exactly 4 h reaction |
| Iron | 150° C. (12 h)-250° C. (4 h)- | Red gel after mixing. Dark red gel after 1 h. |

TABLE 3-continued

| | | | |
|---|---|---|---|
| | Fe(NO$_3$)$_3$•6H$_2$O | 350° C. (3 h)-450° C. (2 h)-550° C. (1 h) | No longer than 3 h (after nonporous Iron Oxide) |
| | Cobalt Co(NO$_3$)$_2$•6H$_2$O | 150° C. (12 h)-250° C. (4 h)-350° C. (3 h)-450° C. (2 h)-550° C. (1 h) | Low yield, 150° C. yields magnetic Cobalt Oxide (mesostructured) |
| | Nickel Ni(NO$_2$)$_3$•6H$_2$O | 150° C. (12 h)-250° C. (4 h)-350° C. (3 h)-450° C. (2 h)-550° C. (1 h) | Low yield |
| | Copper Cu(NO$_3$)$_2$•XH$_2$O | 150° C. (12 h) | Not Thermally Stable-mesostructured but not porous |
| | Zinc Zn(NO$_3$)$_2$•6H$_2$O | 150° C. (12 h) | Not Thermally Stable-mesostructured but not porous |
| | Ceria Ce(NO$_3$)$_2$•6H$_2$O | 150° C. (12 h)-250° C. (4 h)-350° C. (3 h)-450° C. (2 h)-550° C. (1 h)-600° C. (1 h) | Yield depends on the amount of surfactant used. Crystalline solid and particle size is consistent with the crystal size. |
| | Silica TEOS | 450° C. (4 h) (1° C./min heating rate) | Yellow transparent film. Directly calcined @ 450° C. for 4 h (microporous) |
| | Titanium Ti(OCH(CH$_3$)$_2$)$_4$ | 400° C., 450° C. or 500° C. (4 h) (1° C./min heating rate) | Orange transparent film. Directly calcined @ 450° C. for 4 h |
| | Aluminum Silicate Al:Si = 1:5 TEOS and Al(NO$_3$)$_2$ 9H$_2$O | 450° C. (4 h) (1° C./min heating rate) | Microporous, slightly brownish powder |

Mesoporous transition metal oxides were prepared in accordance with the conditions set forth in Table 3. A listing of the prepared mesoporous transition metal oxides is set forth in Table 4 below including properties exhibited by these mesoporous transition metal oxides. FIGS. 5-35 depict properties exhibited by these mesoporous transition metal oxides.

TABLE 4

| Metal | Nomenclature | Max Heat Treatment T (° C.) | Surface Area (m$^2$/g) | BJH Des. Pore Diameter (nm) | Low-Angle XRD peak position (nm) | Crystal Structure |
|---|---|---|---|---|---|---|
| Manganese | UCT-1 | 150 | 255 | 2.0* | 3.1 | Amorphous |
| | | 250 | 200 | 2.8 | 6.7 | Amorphous |
| | | 350 | 191 | 3.7 | 7.7 | Amorphous |
| | UCT-2 | 450 | 100 | 5.3 | 11.5 | Mn$_2$O$_3$ |
| | | 550 | 35 | 12.3 | 17.5 | Mn$_2$O$_3$ |
| Iron | UCT-5 | 150 | 124 | 1.54* | 4.2 | Amorphous |
| | | 250 | 225 | 2.2 | 5.0 | Amorphous |
| | UCT-6 | 350 | 167 | 3.4 | 7.9 | Fe$_2$O$_3$ |
| | | 450 | 46 | 9.6 | 24.5 | Fe$_2$O$_3$ |
| Cobalt | UCT-7 | 150 | 9 | Non-porous | 9.3 | Co$_3$O$_4$ & C$_4$H$_8$ Co$_3$O$_4$•4H$_2$O |
| | UCT-8 | 250 | 129 | 5.7 | 12.2 | Co$_3$O$_4$ |
| | | 350 | 110 | 7.8 | 14.5 | Co$_3$O$_4$ |
| Nickel | UCT-9 | 150 | 20 | Non-porous | 6.6 | (H$_3$O)2NiO$_2$ & NiOOH & Ni(OH)$_2$•0.75H$_2$O |
| | UCT-10 | 250 | 195 | 5.5 | 7.4 | Ni$_{15}$O$_{16}$ |
| | | 350 | 81 | 9.7 | 9.6 | Ni$_{15}$O$_{16}$ |
| | | 450 | 60 | 9.7 | 9.8 | Ni$_{15}$O$_{16}$ |
| Copper | UCT-11 | 150 | 48 | Non-porous | 5.4 | Cu$_2$(NO$_3$)(OH)$_3$ |
| | | 250 | 22 | Non-porous | 12.1 | CuO |
| | | 350 | 11 | Non-porous | 6.1 | CuO |
| Zinc | UCT-12 | 150 | 70 | Non-porous | 6.6 | ZnC$_2$O$_4$ |
| Titanium | UCT-13 | 450 | 103 | 3.5 | 8.8 | TiO$_2$ (Anatase) |
| Silica | UCT-14 | 450 | 435 | 1.4* | 4.6 | Amorphous |
| Aluminum silicate (Al:Si = 1:5, 10, 20, 50) | UCT-15 | 450 | 385 (1:5) | 1.2* | 6.5 | Amorphous |
| | | 450 | 326 (1:10) | 1.2* | — | Amorphous |
| | | 450 | 308 (1:20) | 1.2* | — | Amorphous |
| | | 450 | 397 (1:50) | 1.2* | — | Amorphous |
| | | 550 | 325 (1:20) | 1.2* | — | Amorphous |
| | | 550 | 401 (1:50) | 1.2* | — | Amorphous |
| Ceria | UCT-16 | 150 | 98 | Non-porous | 2.9 | CeO$_2$ |
| | | 250 | 152 | 1.1* | 3.2 | CeO$_2$ |
| | | 350 | 173 | 1.1* | 3.4 | CeO$_2$ |
| | | 450 | 150 | 1.3* | 3.7 | CeO$_2$ |
| | | 550 | 127 | 1.6 | 5.1 | CeO$_2$ |
| | | 600 | 72 | 1.9 | 7.1 | CeO$_2$ |

TABLE 4-continued

| Metal | Nomenclature | Max Heat Treatment T (° C.) | Surface Area (m²/g) | BJH Des. Pore Diameter (nm) | Low-Angle XRD peak position (nm) | Crystal Structure |
|---|---|---|---|---|---|---|
| Manganese (F127) | UCT-3 | 350 | 160 | 3.5 | 9.3 | $Mn_2O_3$ |
|  |  | 450 | 68 | 4.5 | 11.3 | $Mn_2O_3$ |
| Manganese (long reaction time) | UCT-4 | 150 (24 h) | — | — | 7.7 | $Mn_3O_4$ |

*DFT pore size distribution. Cylindrical pore model nitrogen on carbon.

+ Direct calcination to final temperature with 1° C./min heating rate.

Table 4 above describes 16 new families of materials identified with acronyms UCT-#. For example, UCT-1 represents amorphous manganese oxide materials that have controllable pore sizes. One can further delineate these materials from Table 4 as UCT-1-150, UCT-1-250, and UCT-350 representing materials with the same basic amorphous structure but with different pore sizes. UCT-2 represents mesoporous crystalline $Mn_2O_3$ materials. Table 4 shows that UCT-2-450 heated to 450° C. has the $Mn_2O_3$ structure with specific pore diameter of 5.3 nm and surface area of 100 m²/g. UCT-2-550 has the same $Mn_2O_3$ structure but different surface properties. The other materials from UCT-3 through UCT-16 are summarized accordingly in Table 4.

Figure 5:
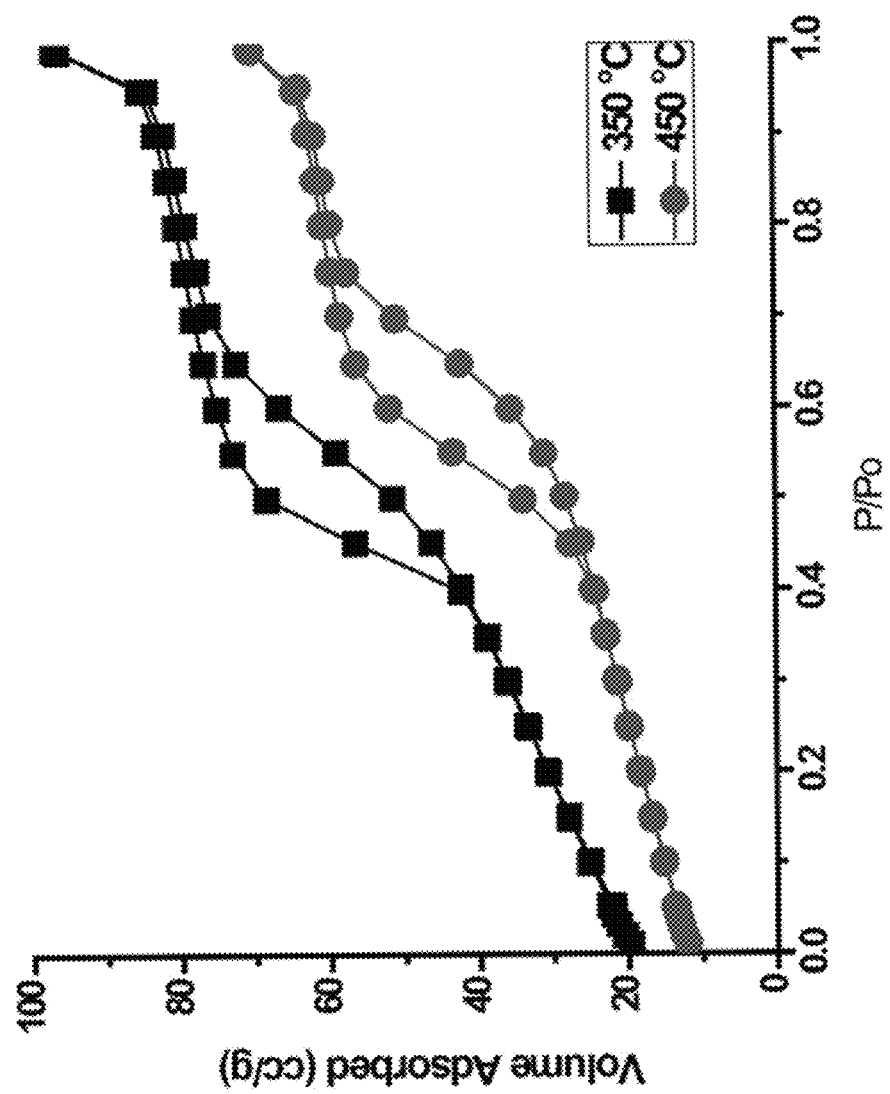
FIG. 5 depicts the nitrogen sorption isotherm of mesoporous $Mn_2O_3$ synthesized with Pluronic® F127 surfactant prepared in Example 3.
Figure 6:
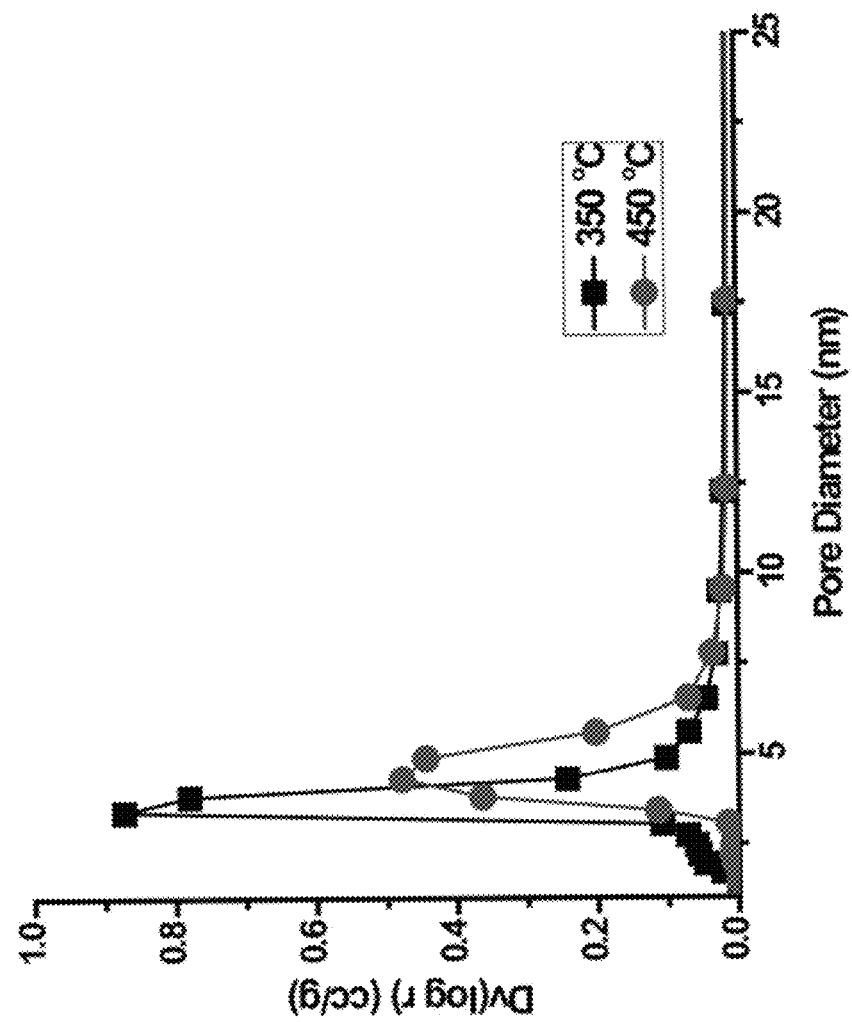
FIG. 6 depicts the Barret-Joyner-Halenda (BJH) desorption pore size distribution of mesoporous $Mn_2O_3$ synthesized with Pluronic® F127 surfactant prepared in Example 3.
Figure 7:
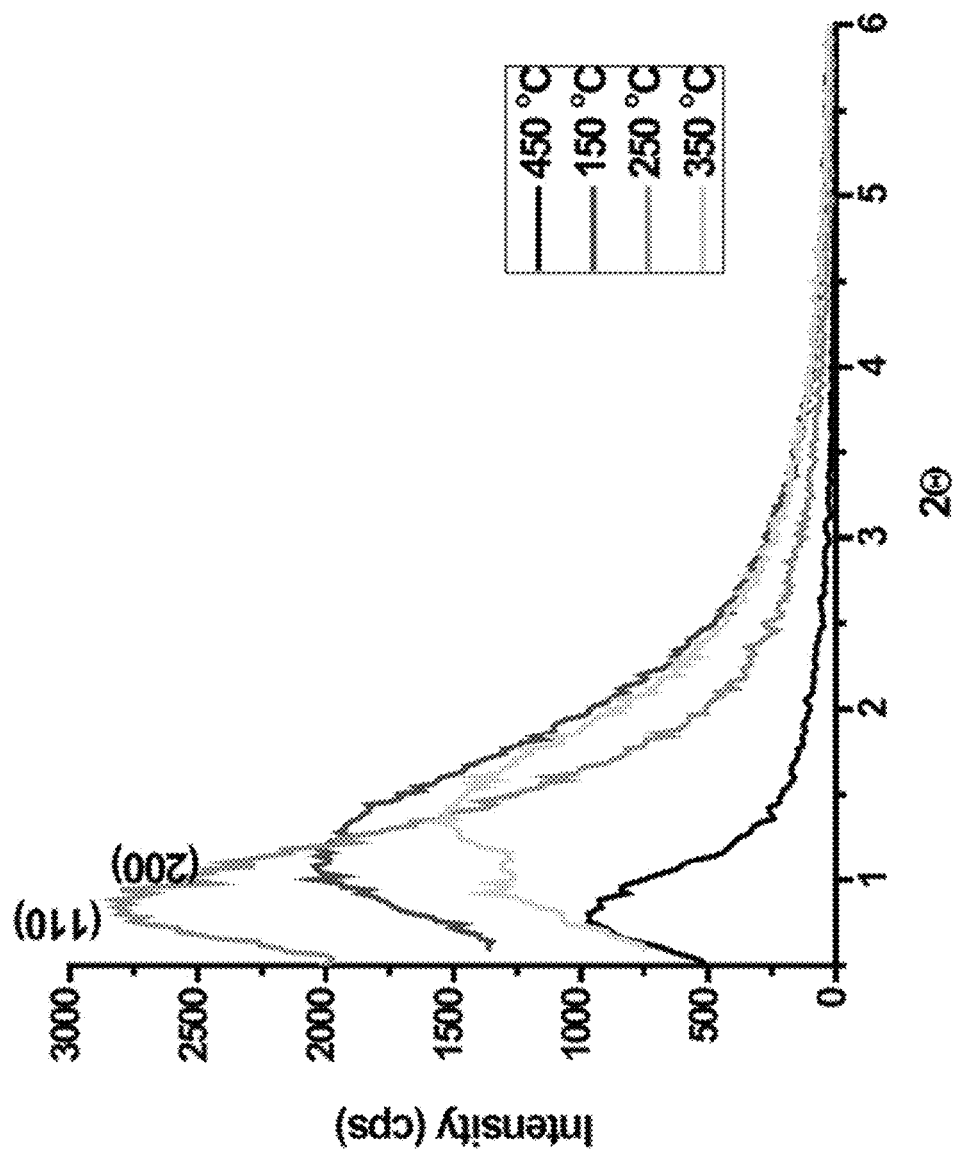
FIG. 7 depicts the low angle powder X-ray diffraction (PXRD) pattern of mesoporous $Mn_2O_3$ synthesized with Pluronic® F127 surfactant prepared in Example 3.
Figure 8:
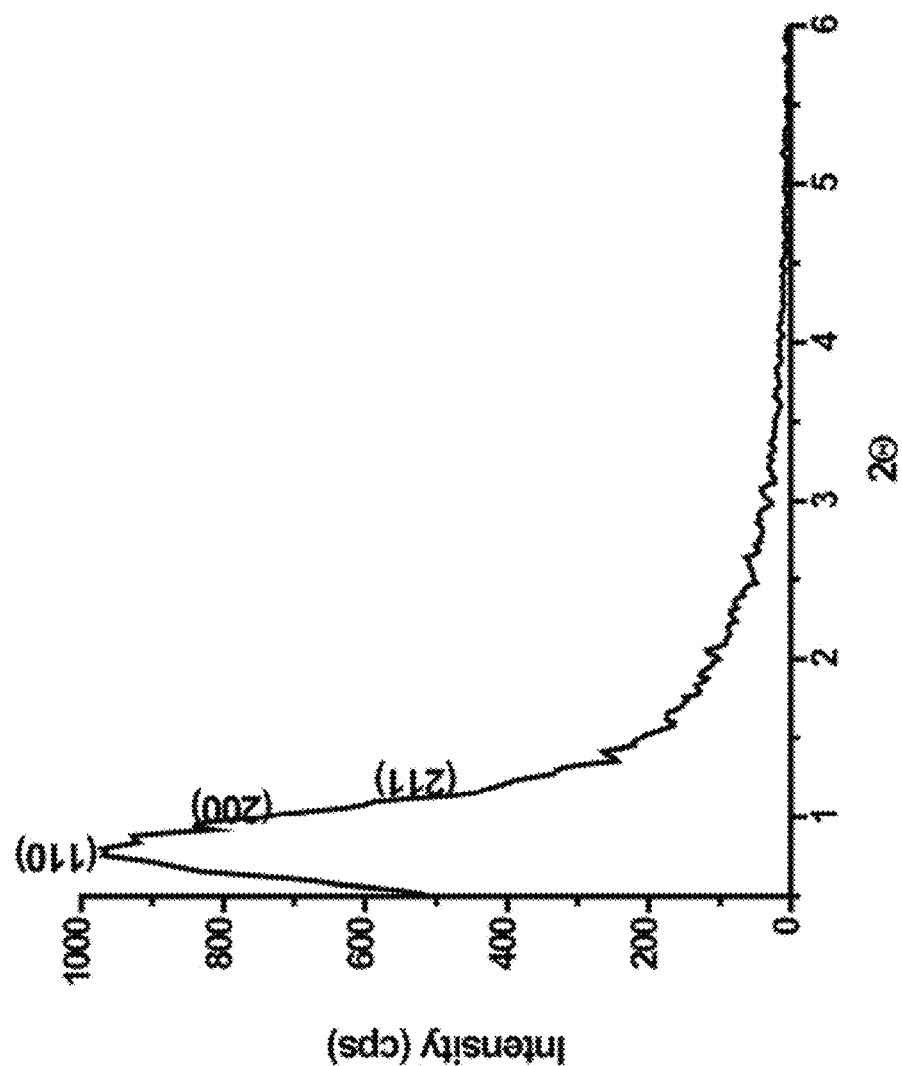
FIG. 8 depicts the low angle powder X-ray diffraction (PXRD) pattern of mesoporous $Mn_2O_3$ synthesized with Pluronic® F127 surfactant prepared in Example 3 (a=162).
Figure 9:
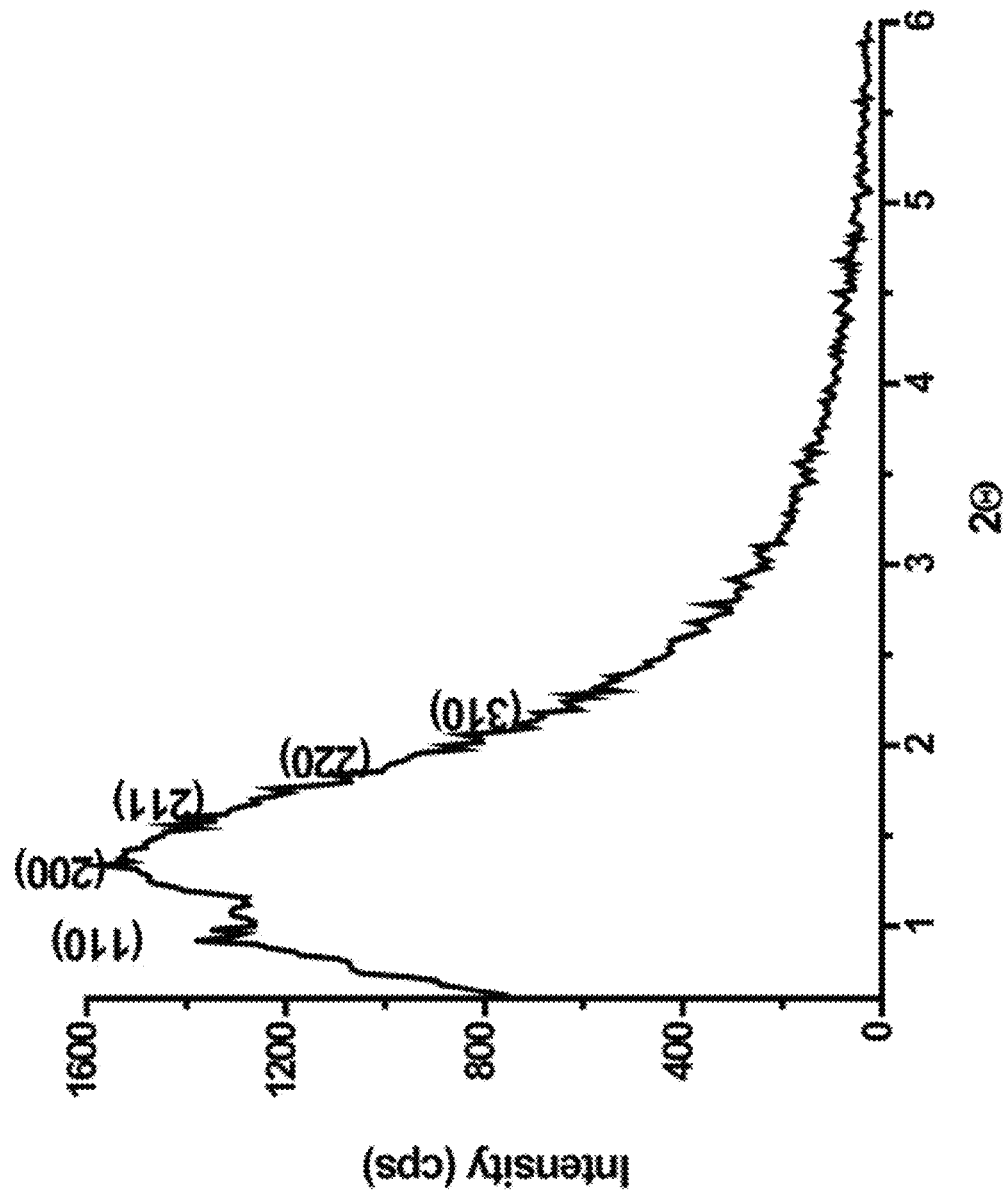
FIG. 9 depicts the low angle powder X-ray diffraction (PXRD) pattern of mesoporous $Mn_2O_3$ synthesized with Pluronic® F127 surfactant prepared in Example 3 (a=130).
Figure 10:
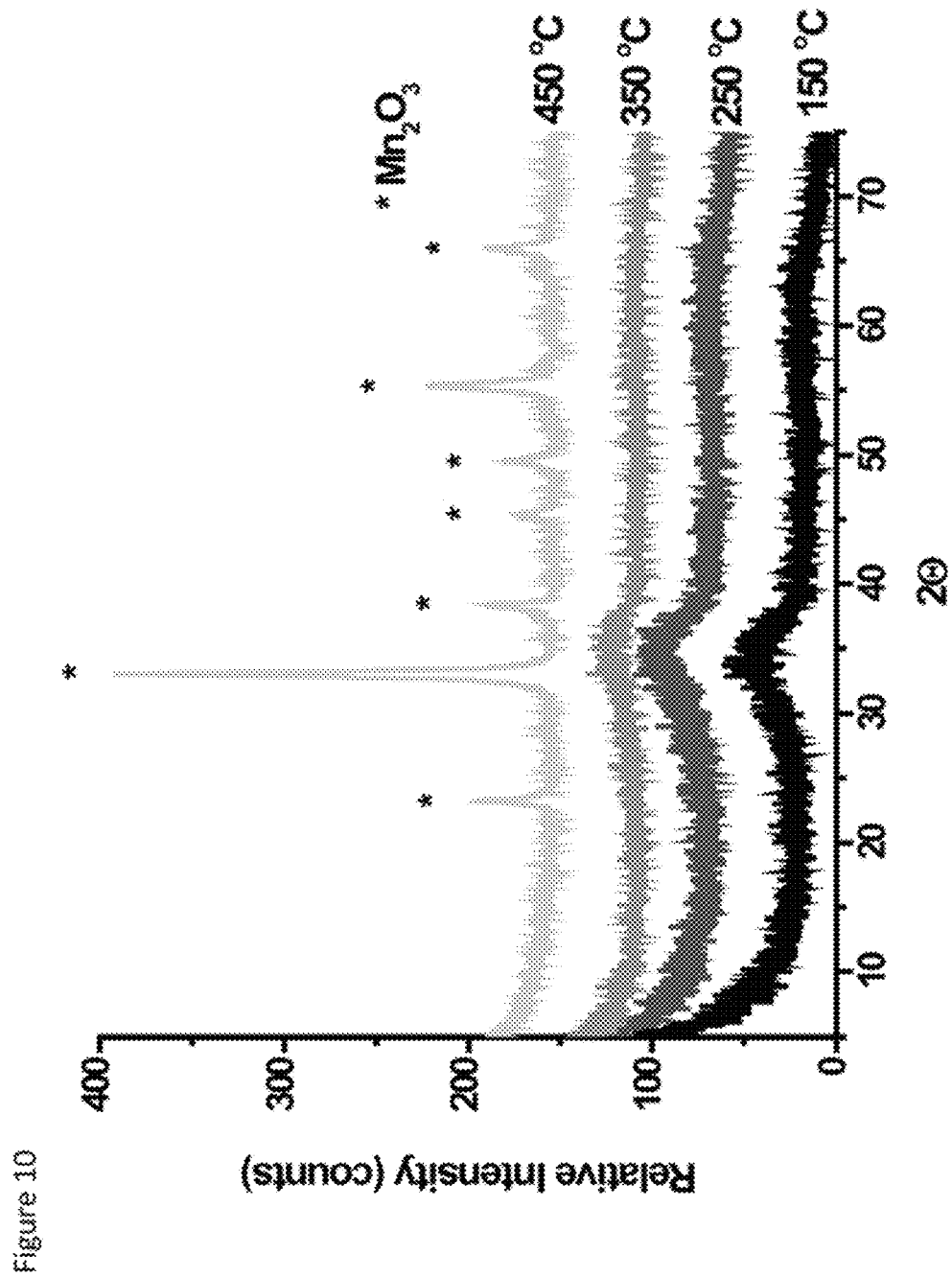
FIG. 10 depicts the powder X-ray diffraction (PXRD) pattern of mesoporous $Mn_2O_3$ synthesized with Pluronic® F127 surfactant prepared in Example 3.
Figure 11:
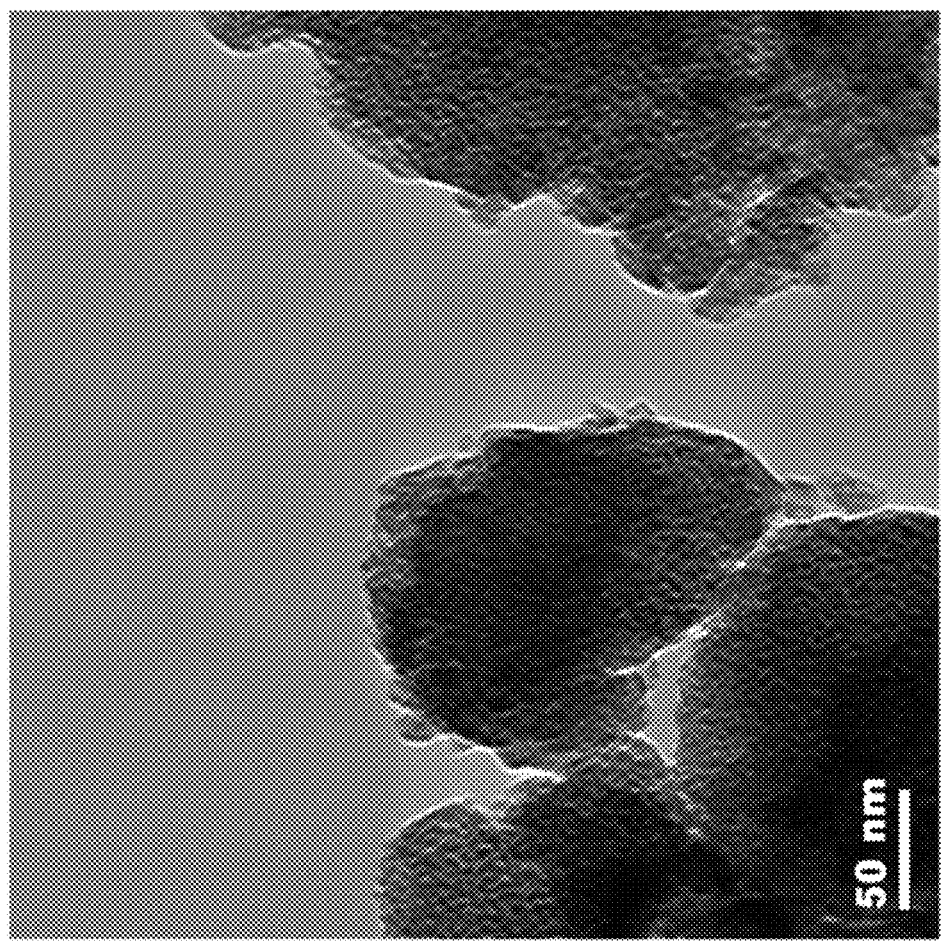
FIG. 11 depicts a high resolution transmission electron microscope (TEM) image of mesoporous $MnO_3$ synthesized with Pluronic® F127 surfactant prepared in Example 3.
Figure 12:
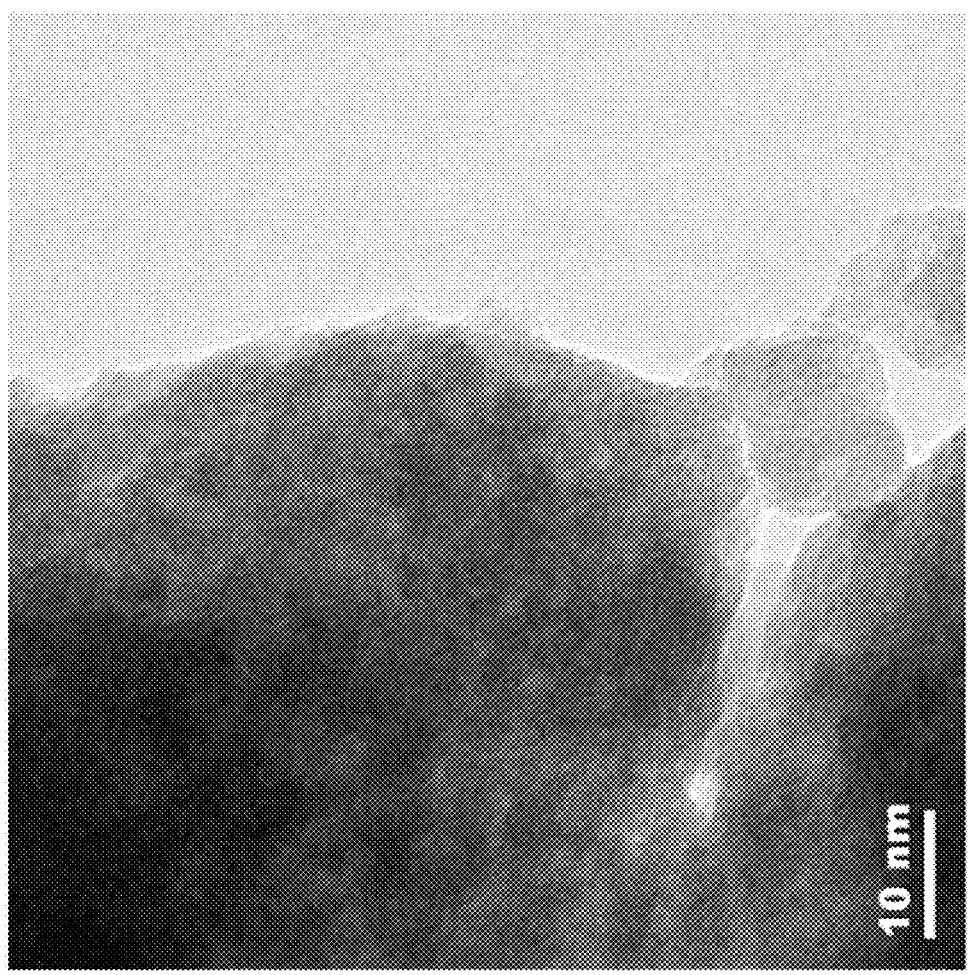
FIG. 12 depicts a high resolution transmission electron microscope (TEM) image of mesoporous $Mn_2O_3$ synthesized with Pluronic® F127 surfactant prepared in Example 3.
Figure 13:
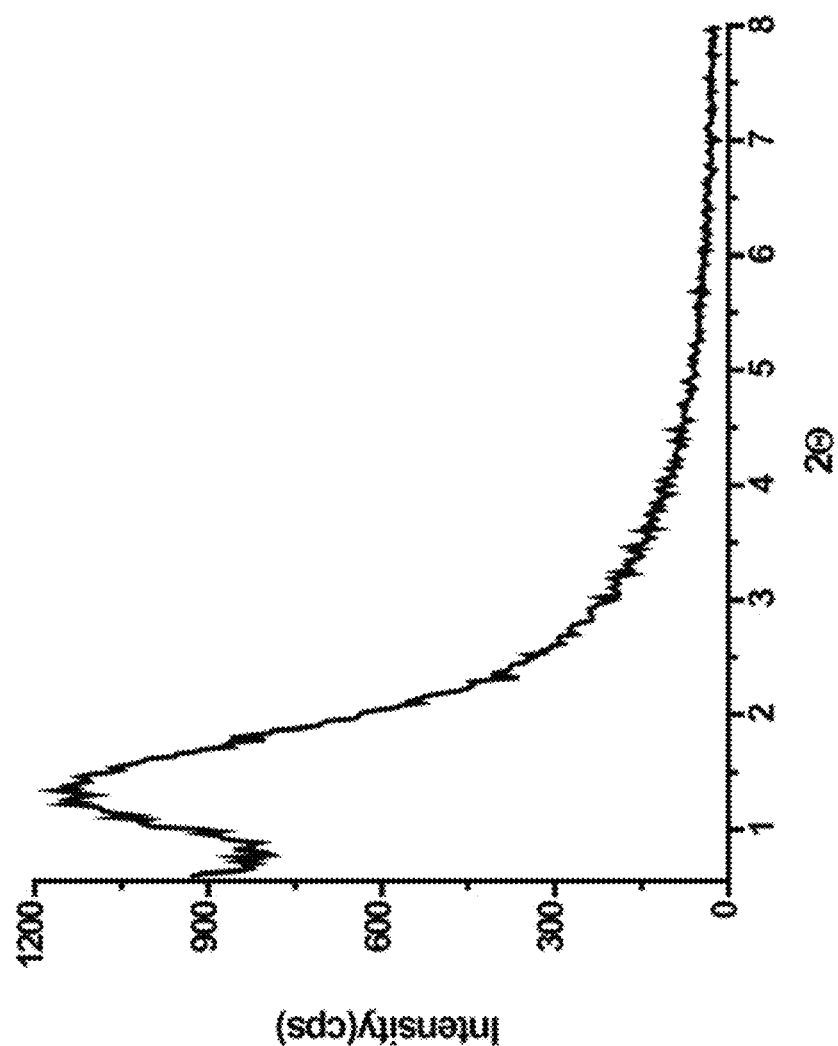
FIG. 13 depicts the low angle powder X-ray diffraction (PXRD) pattern of mesoporous $ZnC_2O_4$ synthesized with Pluronic® P123 surfactant prepared in Example 3 (surface area=70 $m^2/g$).
Figure 14:
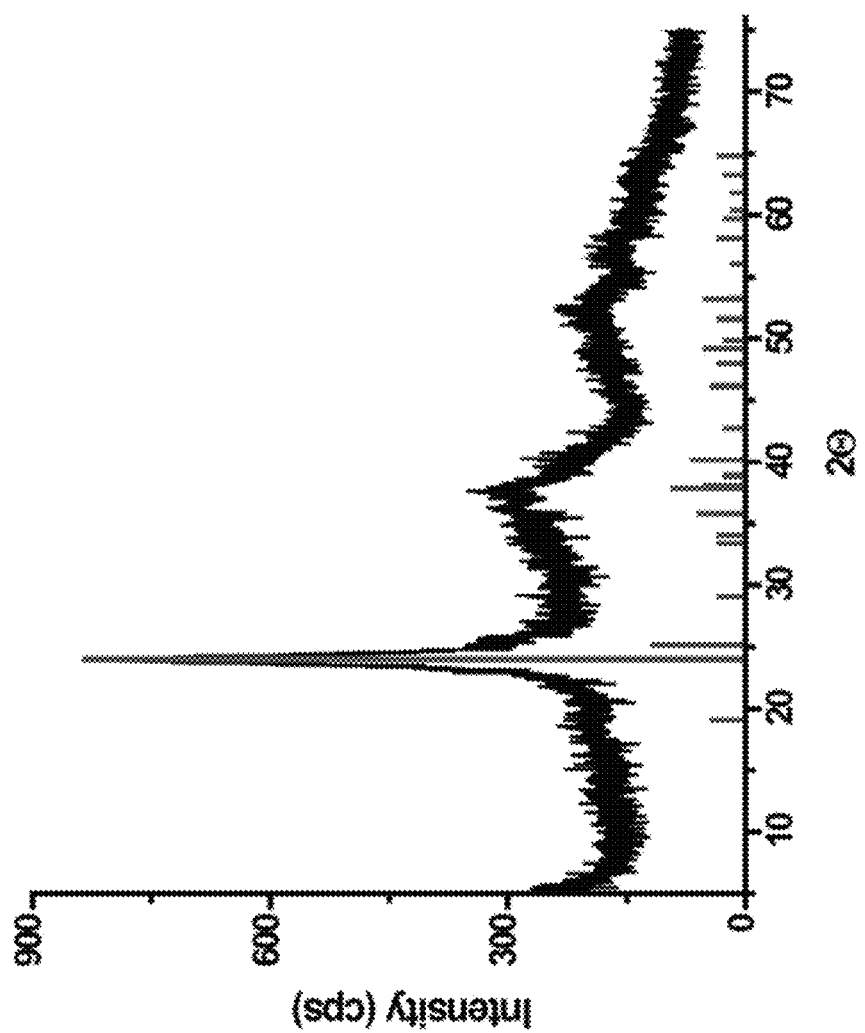
FIG. 14 depicts the powder X-ray diffraction (PXRD) pattern of mesoporous $ZnC_2O_4$ synthesized with Pluronic® P123 surfactant prepared in Example 3 (surface area=70 $m^2/g$).
Figure 15:
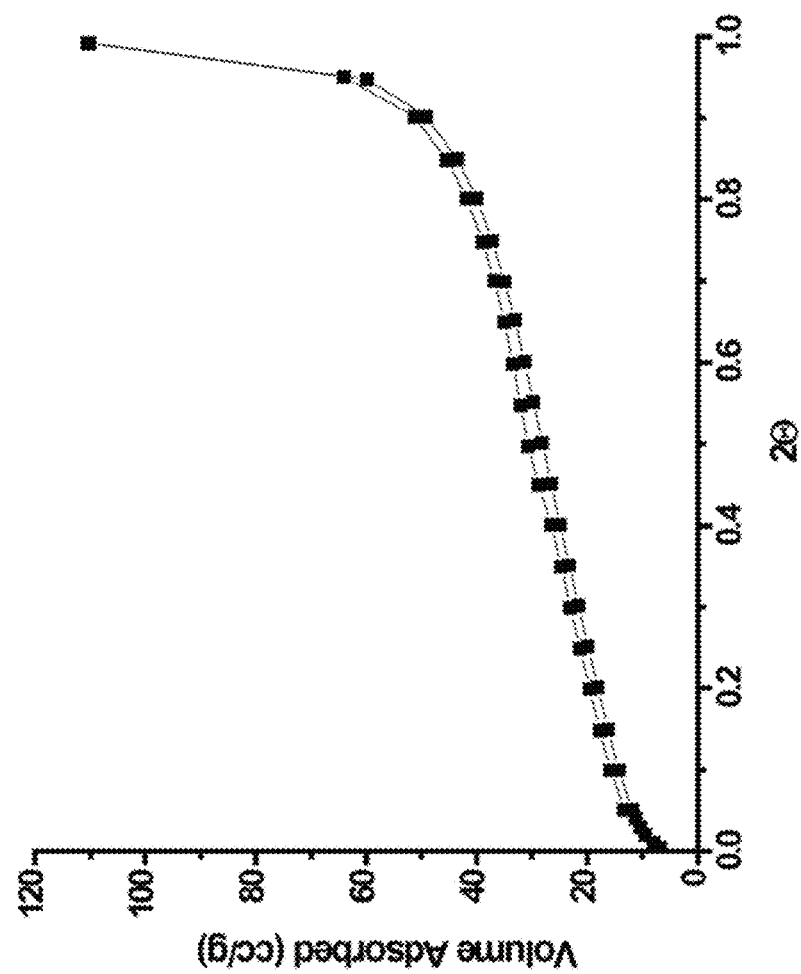
FIG. 15 depicts the nitrogen sorption isotherm of mesoporous $ZnC_2O_4$ synthesized with Pluronic® P123 surfactant prepared in Example 3 (surface area=70 $m^2/g$).

Referring to FIGS. 5 and 6, a comparison of structural parameters of mesoporous $Mn_2O_3$ synthesized with two different Pluronic® surfactants is set forth in Table 5 below.

TABLE 5

|  | Δ (max) | SA (BET) | Pore Volume (BJH) | Pore Diameter (BJH des) | Wall thickness* |
|---|---|---|---|---|---|
| F127 | 350 C.° | 160 m²/g | 0.160 cc/g | 3.5 nm | 7.8 nm |
|  | 450 C.° | 68 m²/g | 0.116 cc/g | 4.5 nm | 9.5 nm |
| P123 | 350 C.° | 191 m²/g | 0.224 cc/g | 3.7 nm | 5.2 nm |
|  | 450 C.° | 100 m²/g | 0.200 cc/g | 5.3 nm | 8.0 nm |

Figure 16:
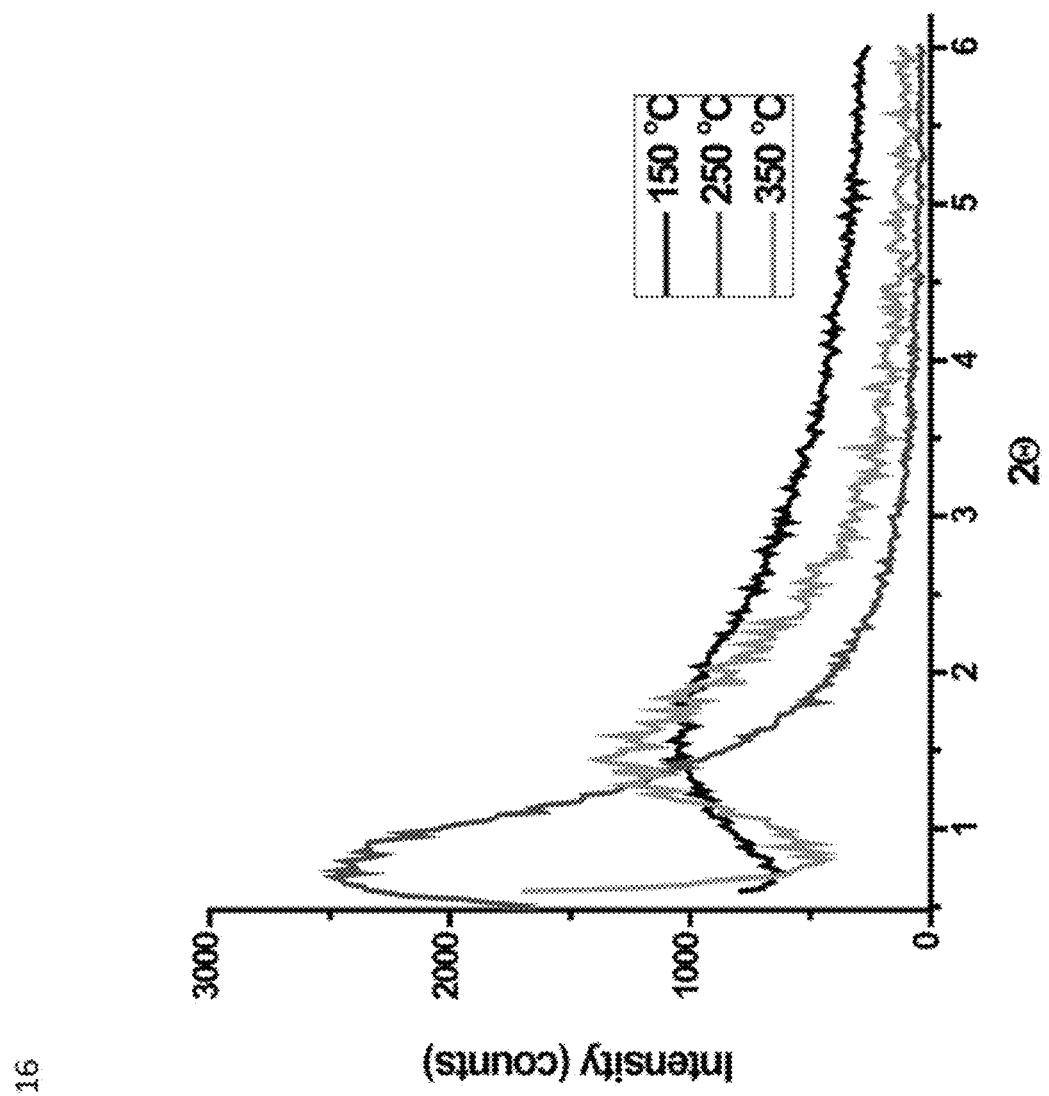
FIG. 16 depicts the low angle powder X-ray diffraction (PXRD) pattern of mesoporous CuO synthesized with Pluronic® P123 surfactant prepared in Example 3. The mesoporous CuO has a surface area (BET) of 47.5 $m^2/g$ at 150° C. and 21.8 $m^2/g$ at 250° C. The CuO is mesostructured but not porous. The pores are likely blocked.
Figure 17:
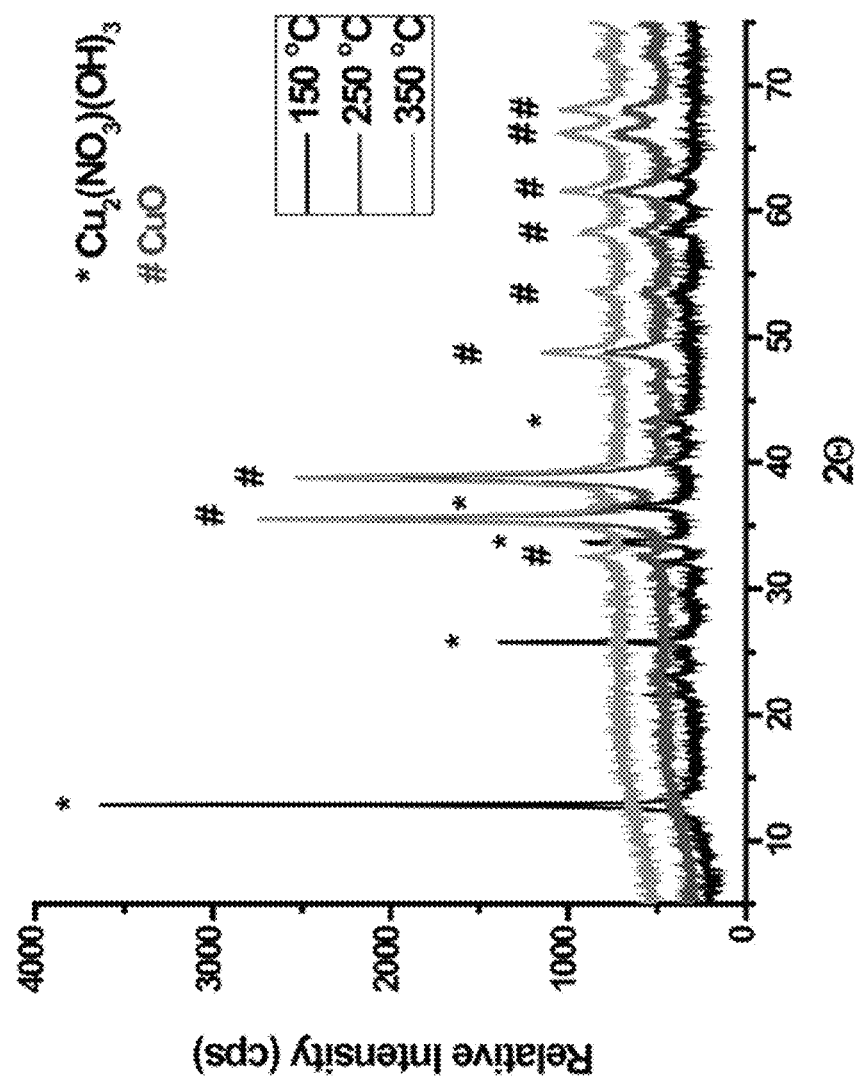
FIG. 17 depicts the powder X-ray diffraction (PXRD) pattern of mesoporous CuO synthesized with Pluronic® P123 surfactant prepared in Example 3. The mesoporous CuO has a surface area (BET) of 47.5 $m^2/g$ at 150° C. and 21.8 $m^2/g$ at 250° C. The CuO is mesostructured but not porous. The pores are likely blocked.
Figure 18:
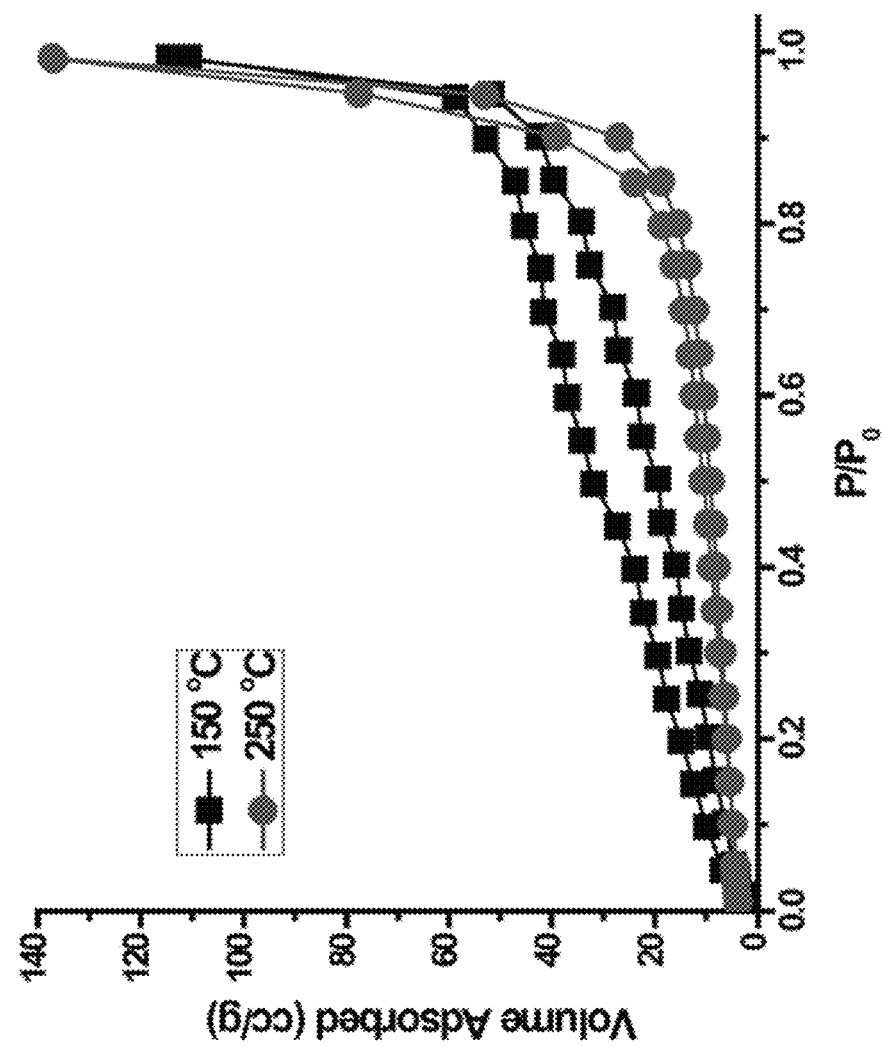
FIG. 18 depicts the nitrogen sorption isotherm of mesoporous CuO synthesized with Pluronic® P123 surfactant prepared in Example 3. The mesoporous CuO has a surface area (BET) of 47.5 m²/g at 150° C. and 21.8 m²/g at 250° C. The CuO is mesostructured but not porous. The pores are likely blocked.
Figure 19:
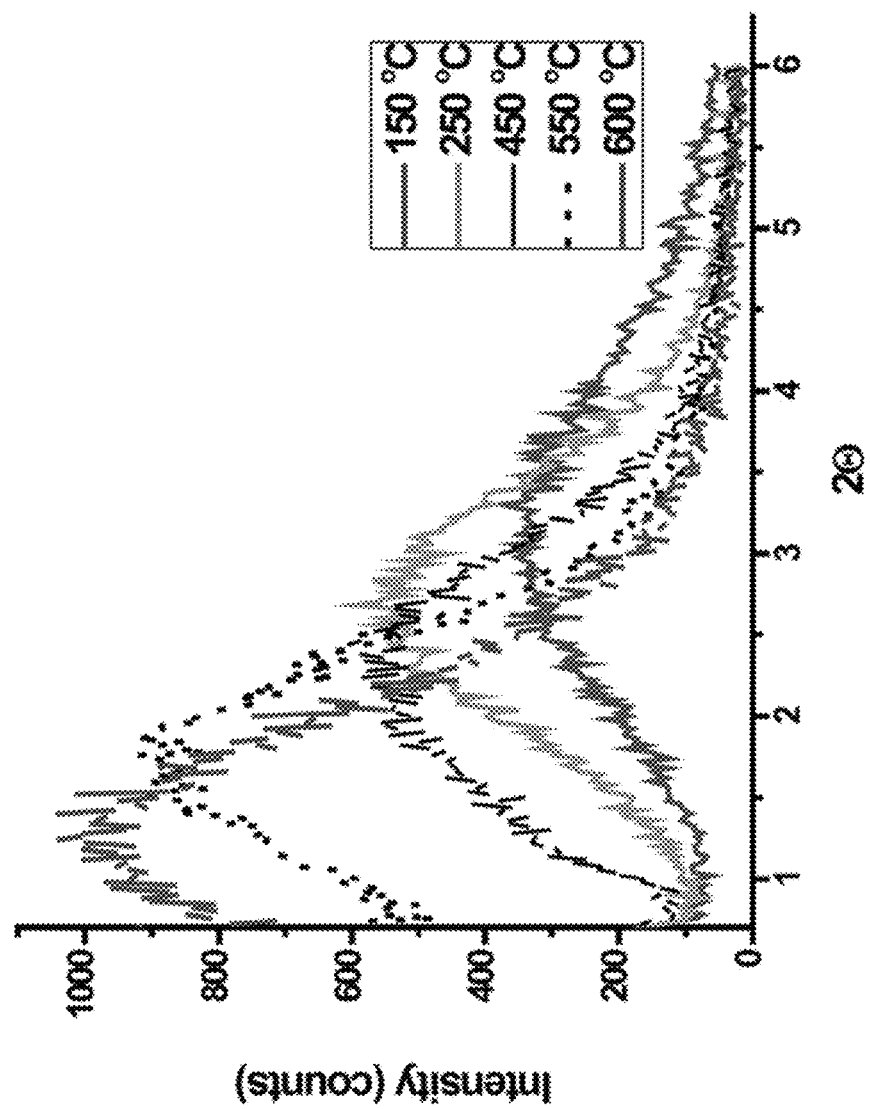
FIG. 19 depicts the low angle powder X-ray diffraction (PXRD) pattern of mesoporous $CeO_2$ synthesized with Pluronic® P123 surfactant prepared in Example 3.
Figure 20:
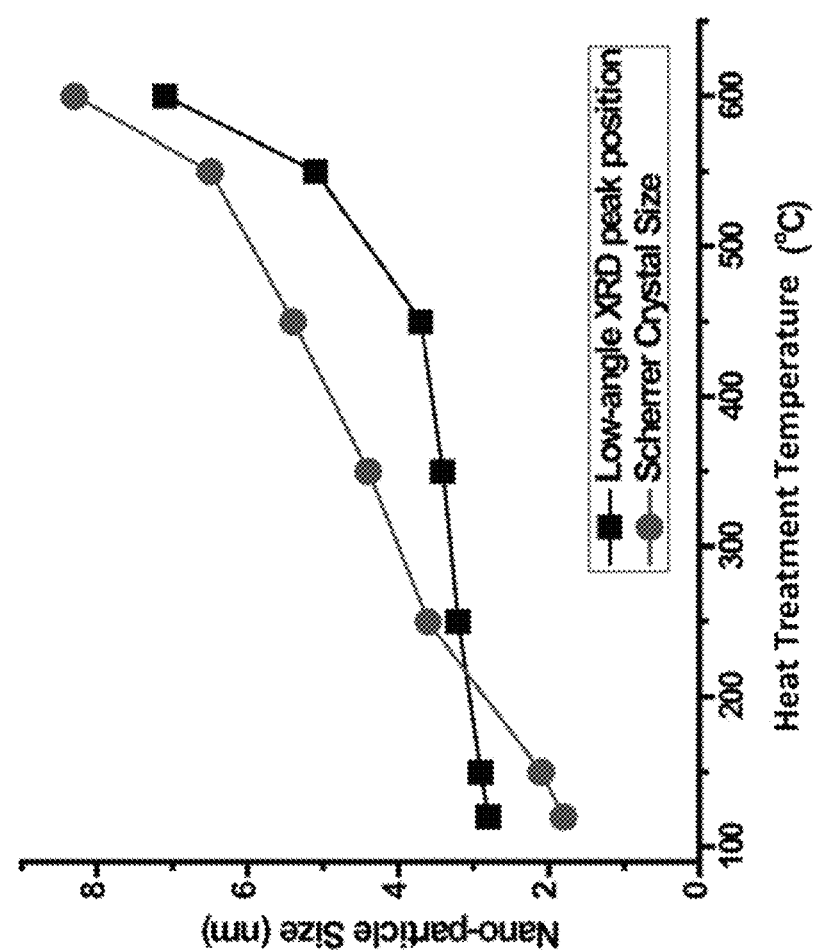
FIG. 20 depicts the nano-particle size of mesoporous $CeO_2$ synthesized with Pluronic® P123 surfactant versus heat treatment prepared in Example 3. The particle size was calculated by the Scherrer equation and the low angle powder X-ray signal position.
Figure 21:
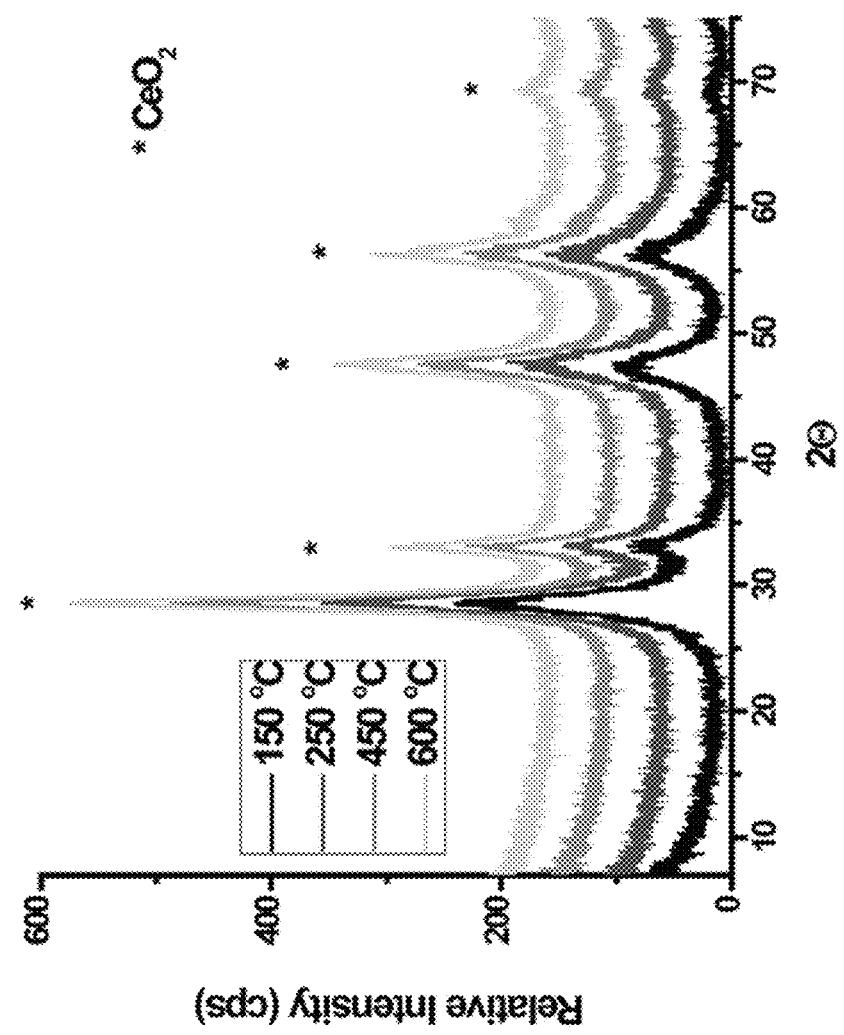
FIG. 21 depicts the powder X-ray diffraction (PXRD) pattern of mesoporous $CeO_2$ synthesized with Pluronic® P123 surfactant prepared in Example 3.

Referring to FIGS. 16-18, a comparison of surface area (BET) of mesoporous CuO at different temperatures is set forth in Table 6 below.

TABLE 6

| Δ (max) | SA (BET) |
|---|---|
| 150 C.° | 47.5 m²\g |
| 250 C.° | 21.8 m²\g |

Figure 22:
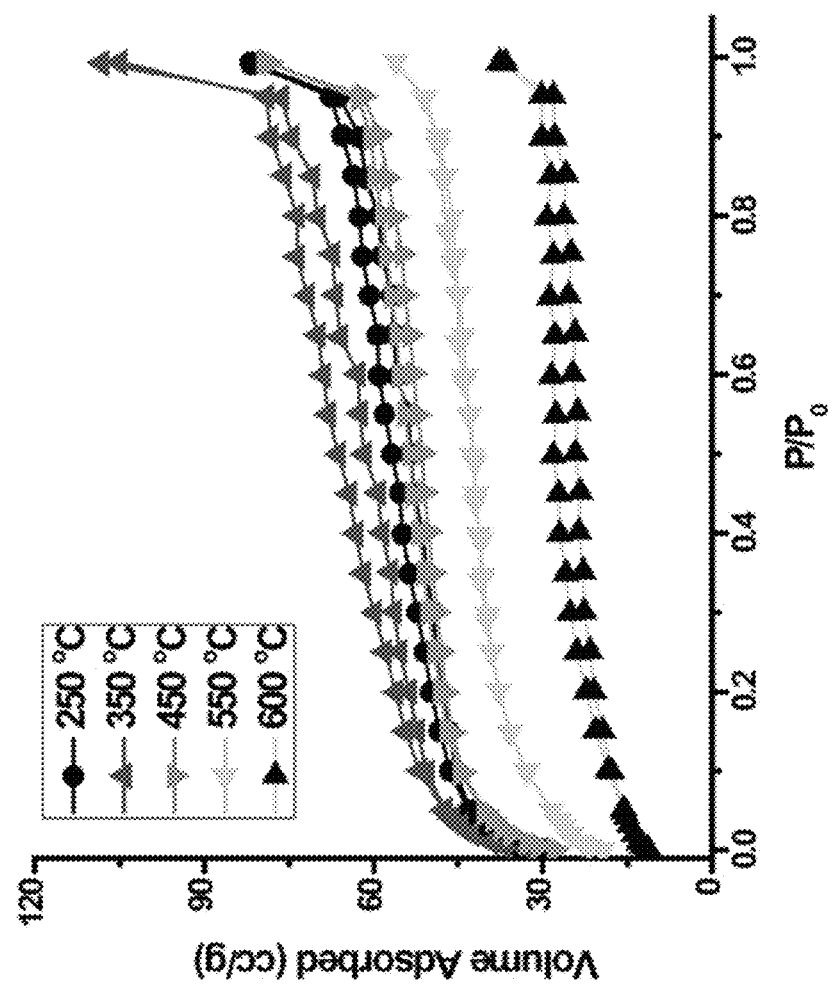
FIG. 22 depicts the nitrogen sorption isotherm of mesoporous $CeO_2$ synthesized with Pluronic® P123 surfactant prepared in Example 3. The mesoporous $CeO_2$ has a surface area (BET) of 97.5 m²/g at 150° C., 152.3 m²/g at 250° C., 173.4 m²/g at 350° C., 149.9 m²/g at 450° C., 127.3 m²/g at 550° C., and 71.6 m²/g at 600° C.
Figure 23:
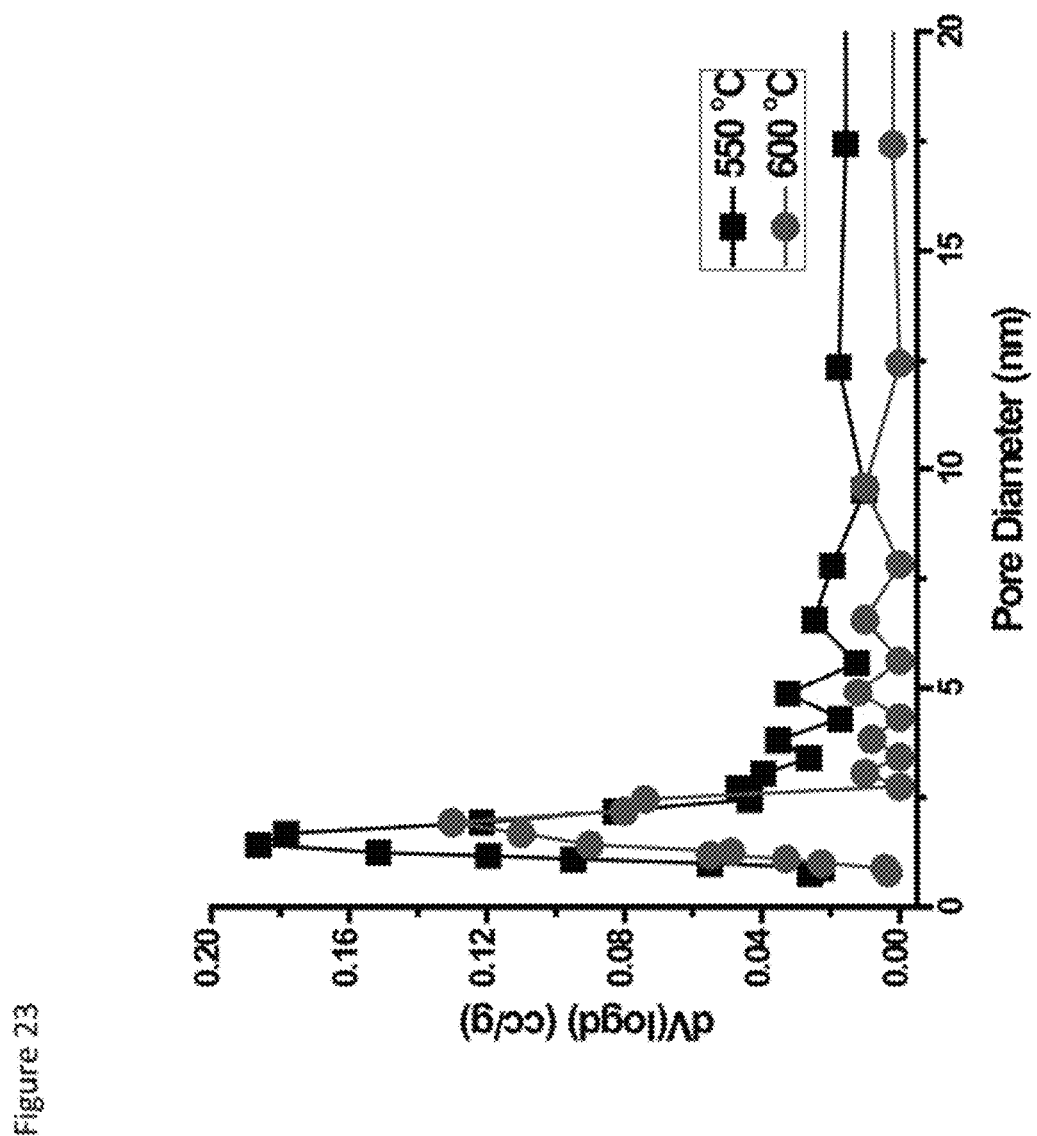
FIG. 23 depicts the Barret-Joyner-Halenda (BJH) desorption pore size distribution of mesoporous $CeO_2$ synthesized with Pluronic® P123 surfactant prepared in Example 3. The mesoporous $CeO_2$ has a surface area (BET) of 97.5 m²/g at 150° C., 152.3 m²/g at 250° C., 173.4 m²/g at 350° C., 149.9 m²/g at 450° C., 127.3 m²/g at 550° C., and 71.6 m²/g at 600° C.
Figure 24:
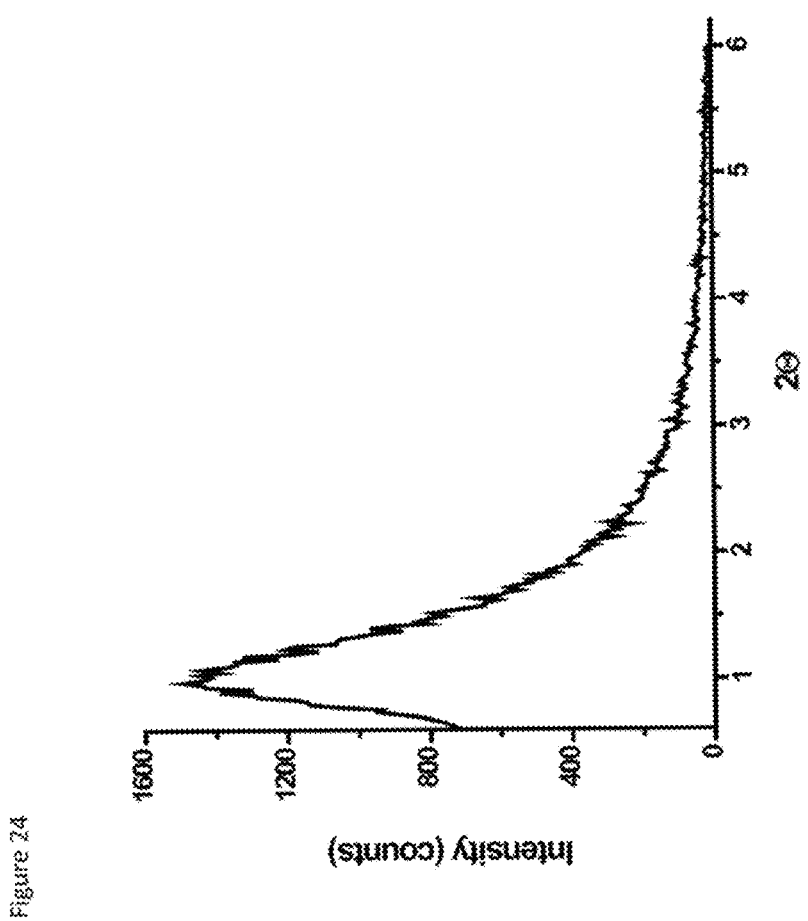
FIG. 24 depicts the low angle powder X-ray diffraction (PXRD) pattern of mesoporous $TiO_2$ synthesized with Pluronic® P123 surfactant prepared in Example 3.
Figure 25:
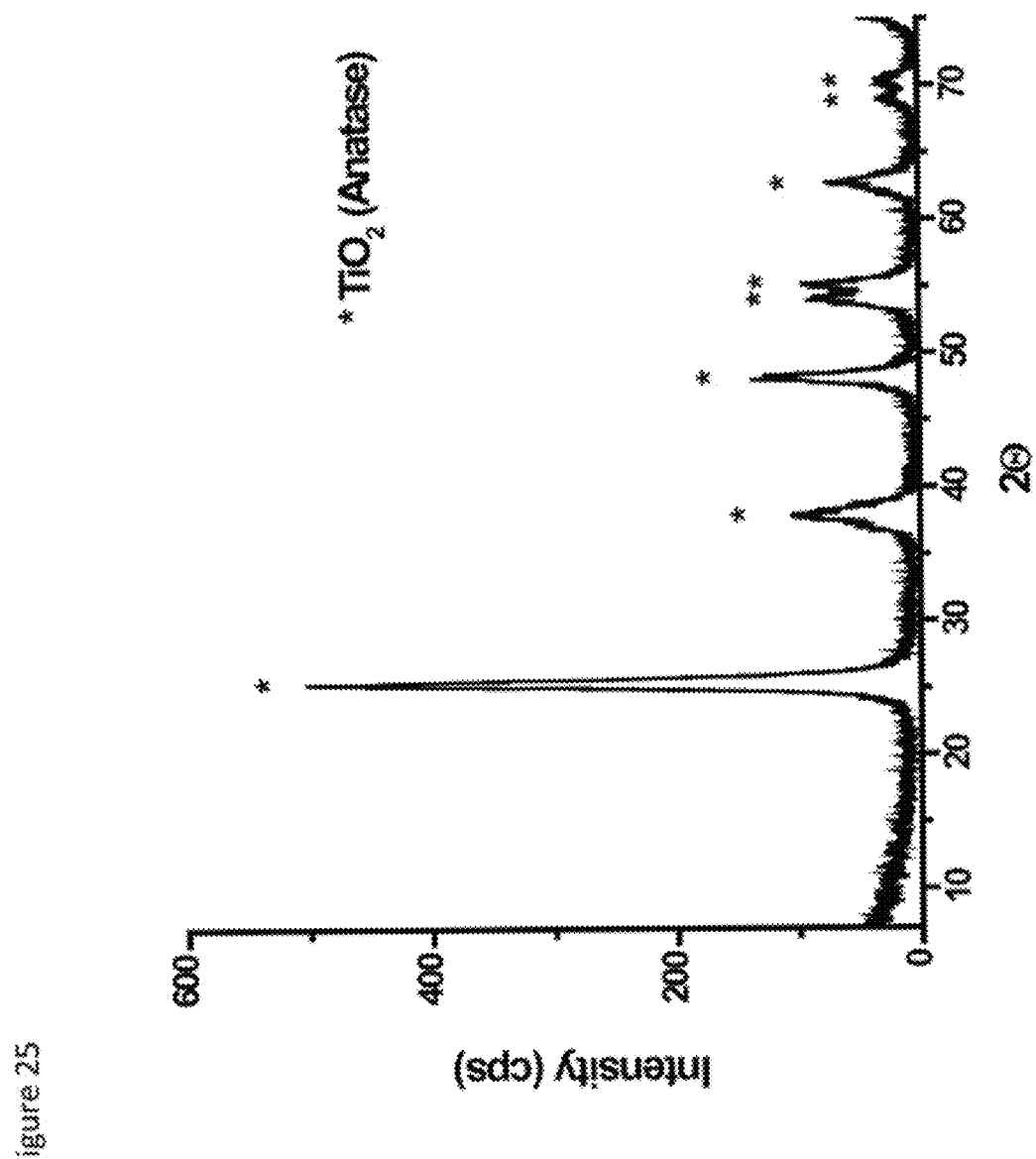
FIG. 25 depicts the powder X-ray diffraction (PXRD) pattern of mesoporous $TiO_2$ synthesized with Pluronic® P123 surfactant prepared in Example 3.
Figure 26:
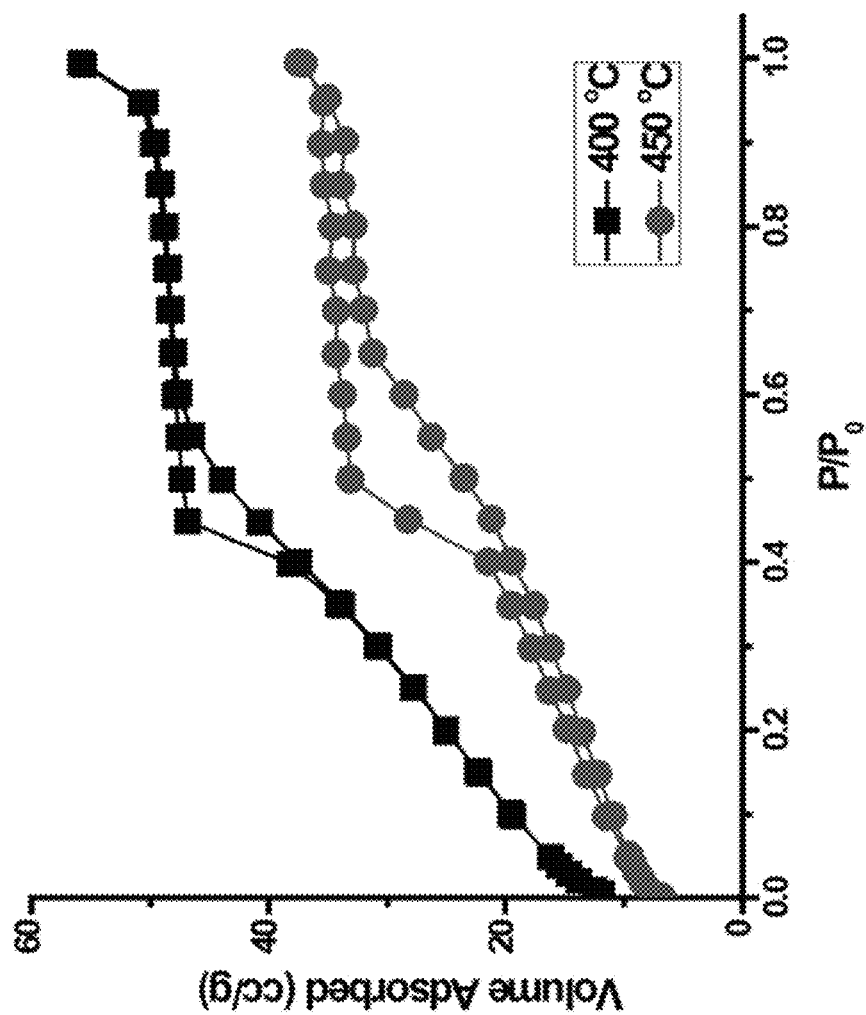
FIG. 26 depicts the nitrogen sorption isotherm of mesoporous $TiO_2$ synthesized with Pluronic® P123 surfactant prepared in Example 3.
Figure 27:
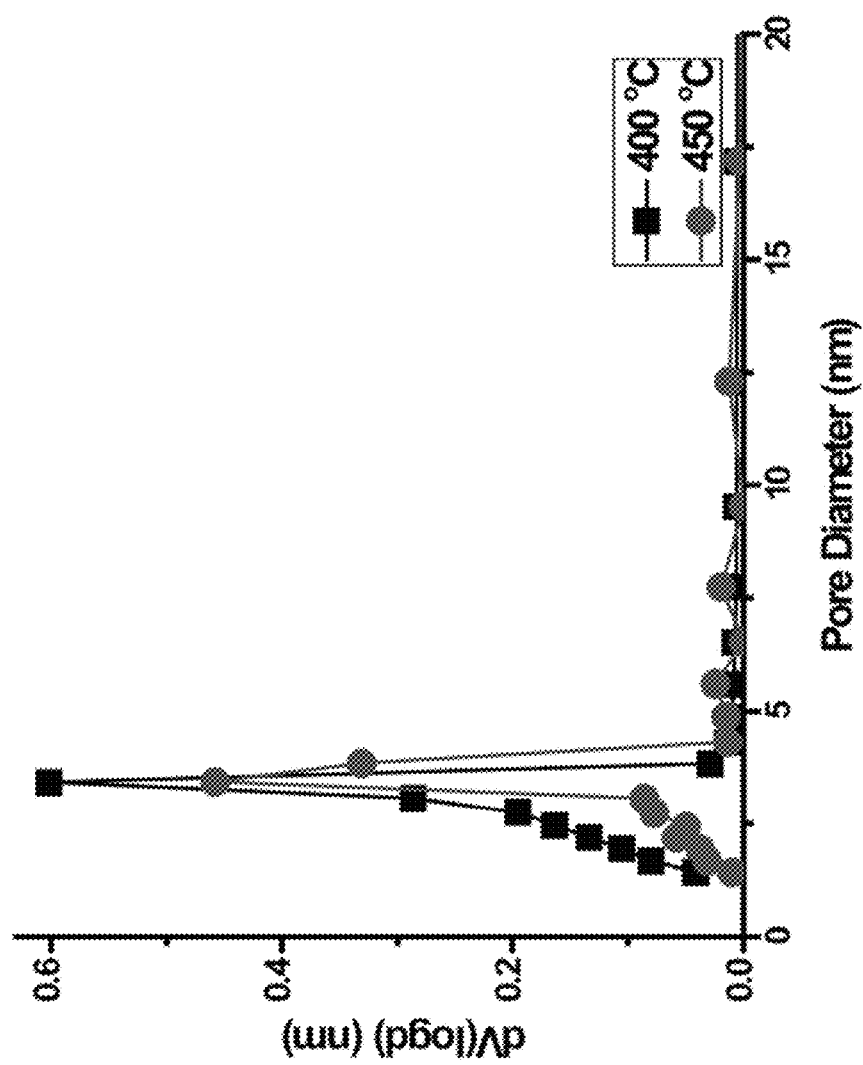
FIG. 27 depicts the Barret-Joyner-Halenda (BJH) desorption pore size distribution of mesoporous $TiO_2$ synthesized with Pluronic® P123 surfactant prepared in Example 3.
Figure 28:
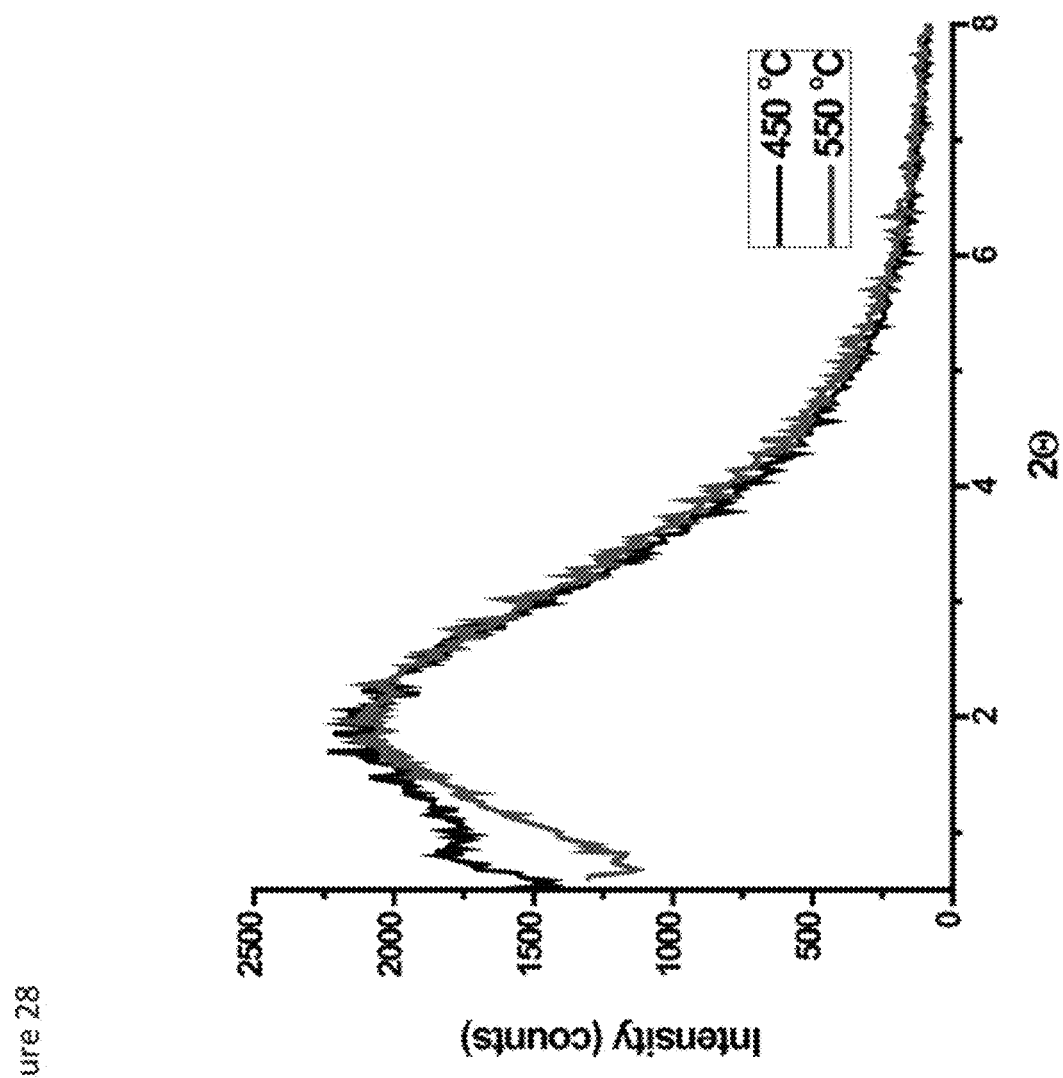
FIG. 28 depicts the low angle powder X-ray diffraction (PXRD) pattern of mesoporous $SiO_2$ synthesized with Pluronic® P123 surfactant prepared in Example 3.
Figure 29:
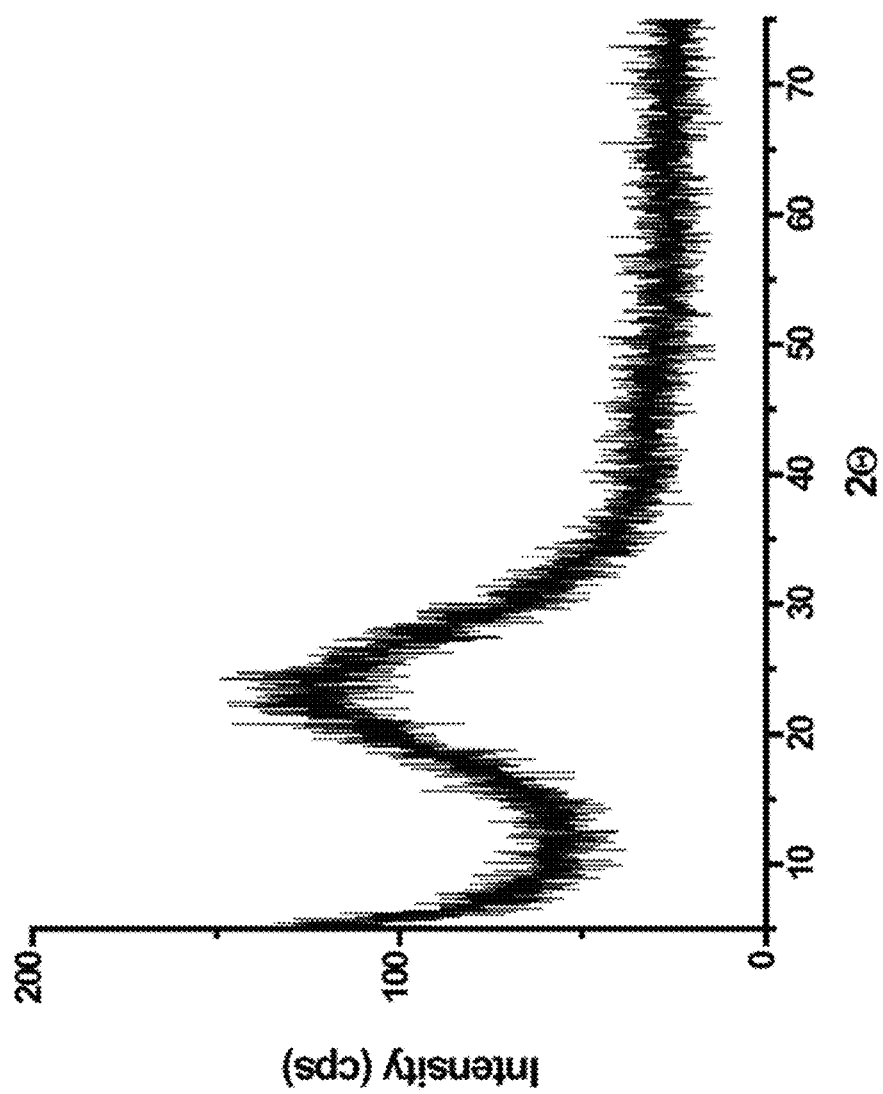
FIG. 29 depicts the powder X-ray diffraction (PXRD) pattern of mesoporous $SiO_2$ synthesized with Pluronic® P123 surfactant prepared in Example 3.
Figure 30:
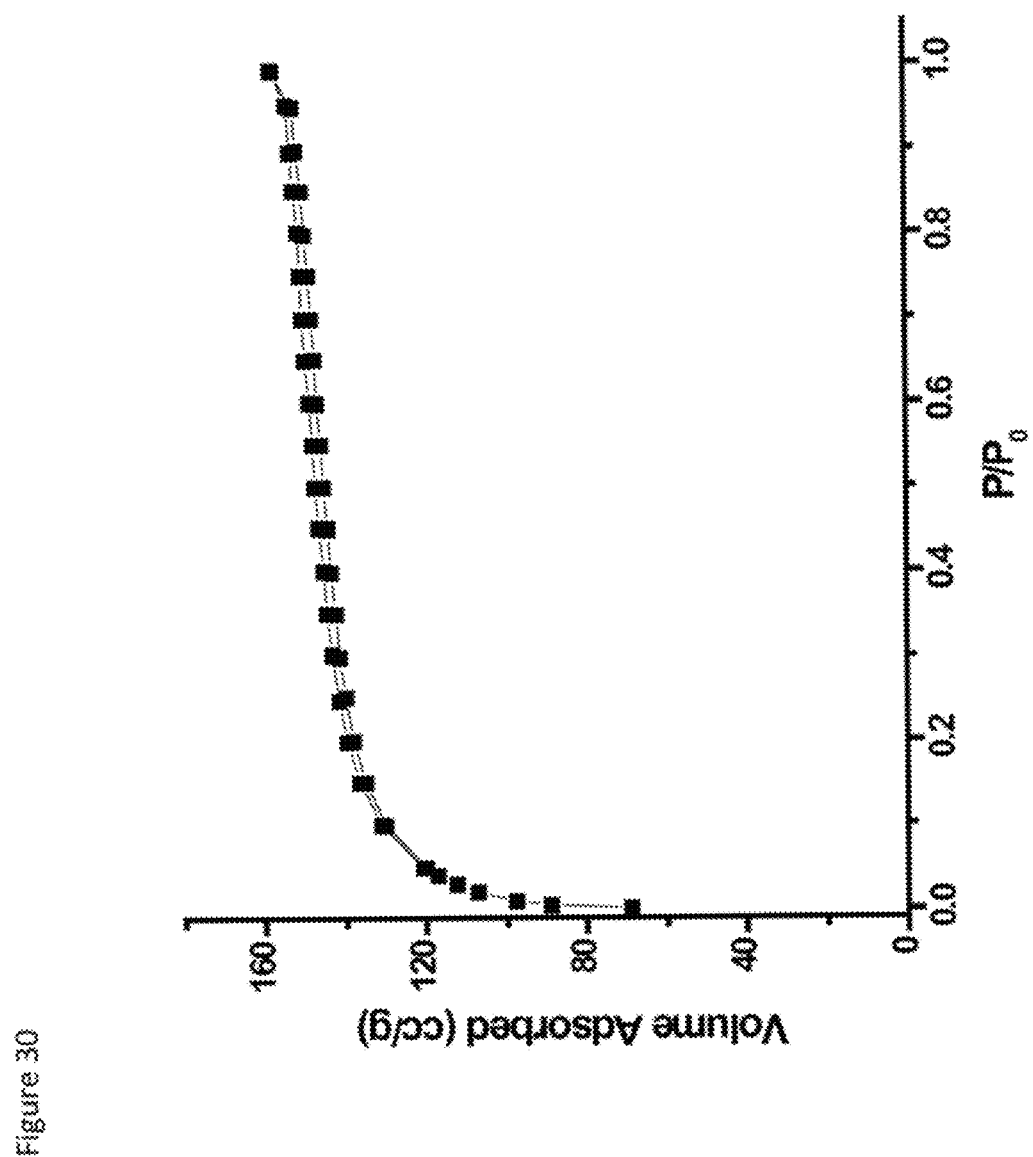
FIG. 30 depicts the nitrogen sorption isotherm of mesoporous $SiO_2$ synthesized with Pluronic® P123 surfactant prepared in Example 3. The mesoporous $SiO_2$ had a surface area of 434.9 m²/g.
Figure 31:
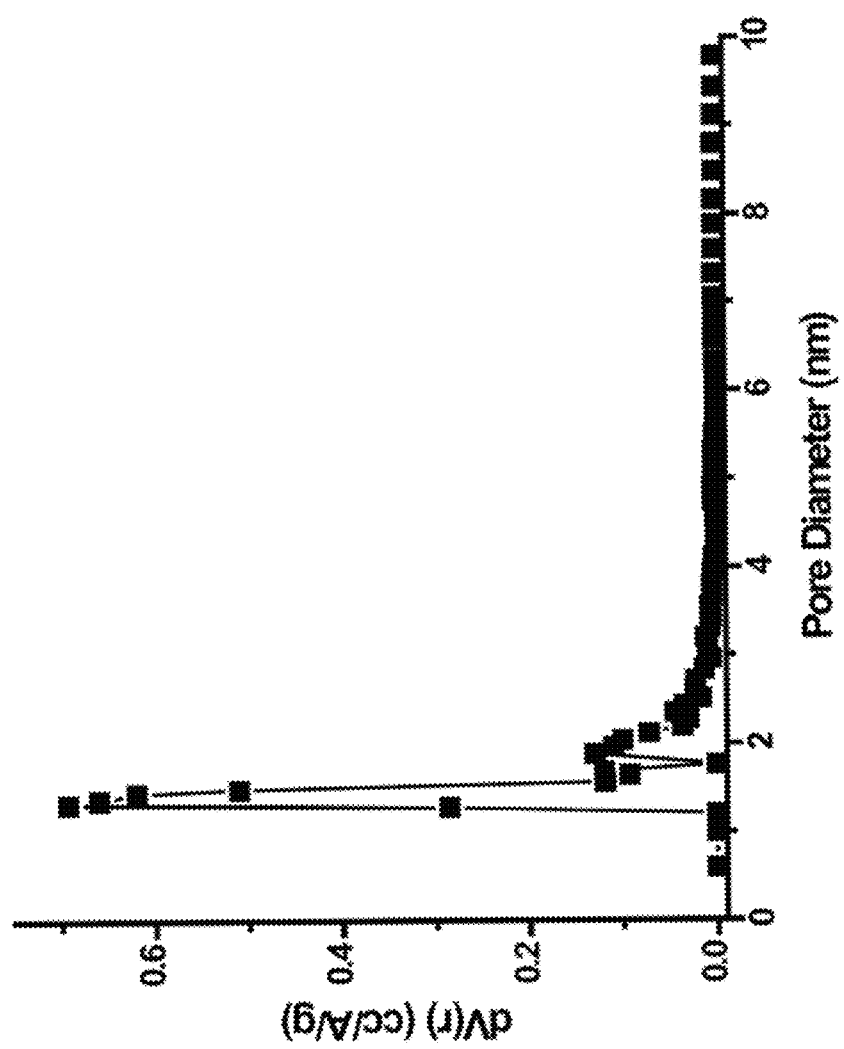
FIG. 31 depicts the density functional theory (DFT) pore size distribution of mesoporous $SiO_2$ synthesized with Pluronic® P123 surfactant prepared in Example 3.
Figure 32:
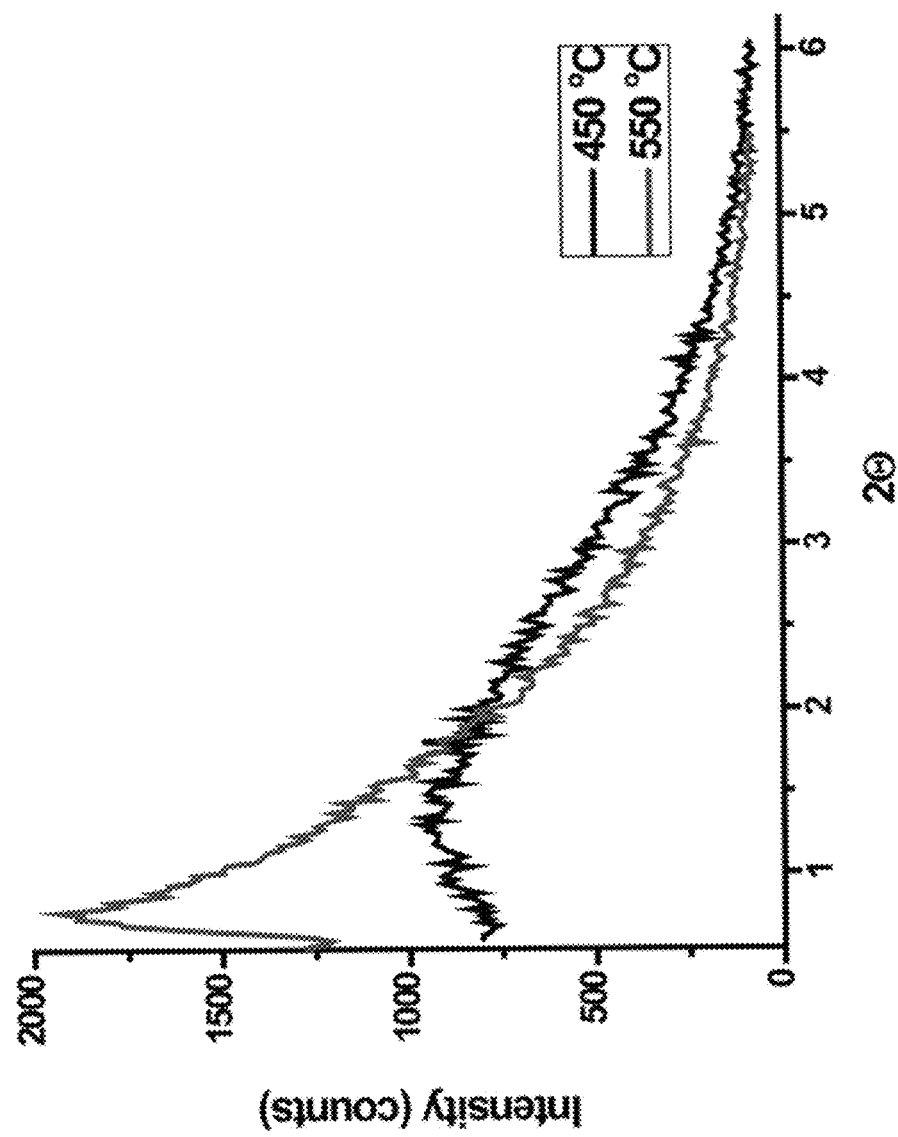
FIG. 32 depicts the low angle powder X-ray diffraction (PXRD) pattern of microporous aluminosilicate (Al:Si=1:5) synthesized with Pluronic® P123 surfactant prepared in Example 3.
Figure 33:
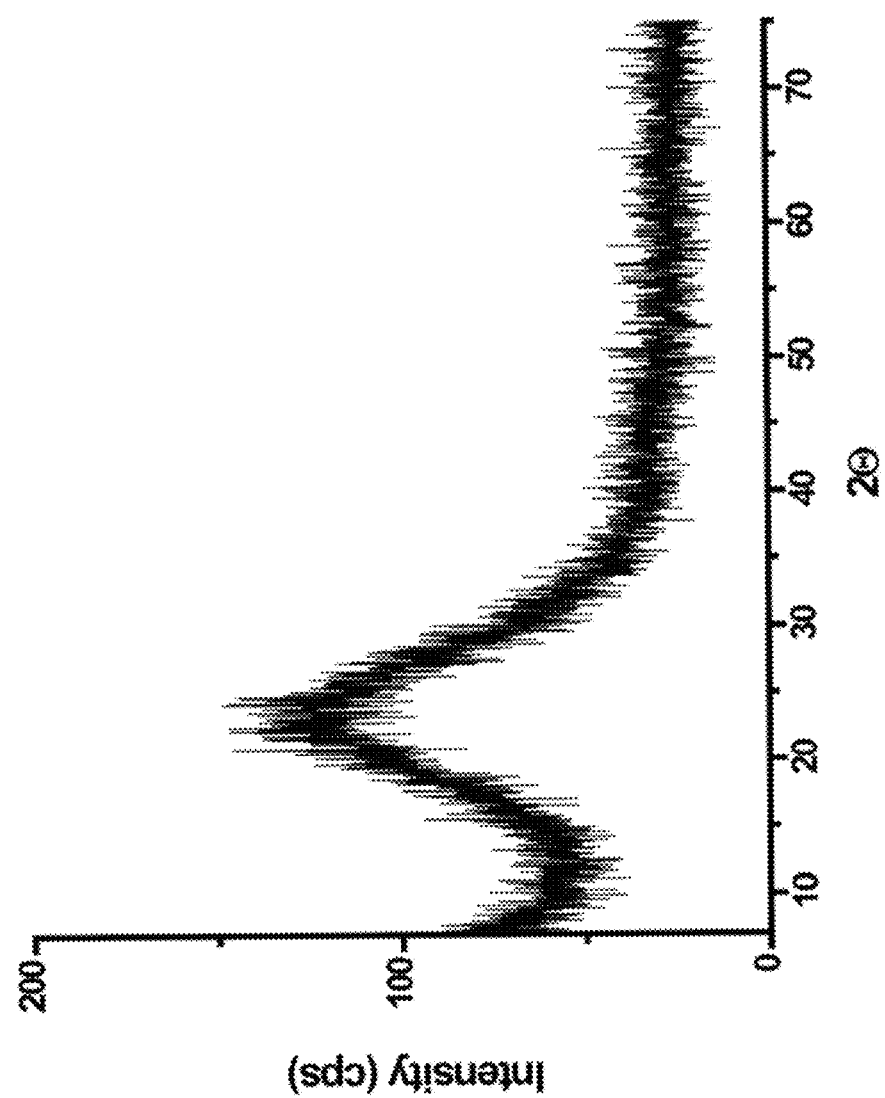
FIG. 33 depicts the powder X-ray diffraction (PXRD) pattern of microporous aluminosilicate (Al:Si=1:5) synthesized with Pluronic® P123 surfactant prepared in Example 3.
Figure 34:
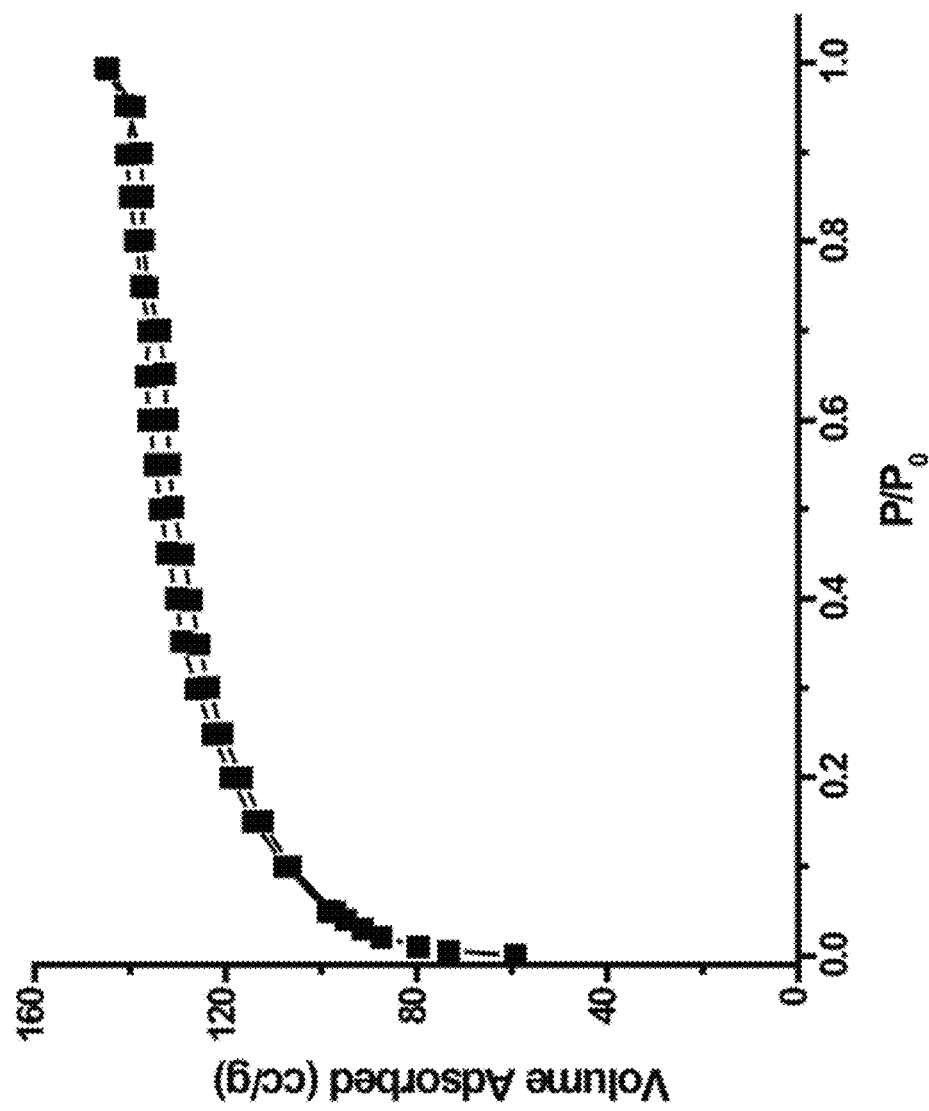
FIG. 34 depicts the nitrogen sorption isotherm of microporous aluminosilicate synthesized with Pluronic® P123 surfactant prepared in Example 3. The microporous aluminosilicate had a surface area of 384.9 m²/g.
Figure 35:
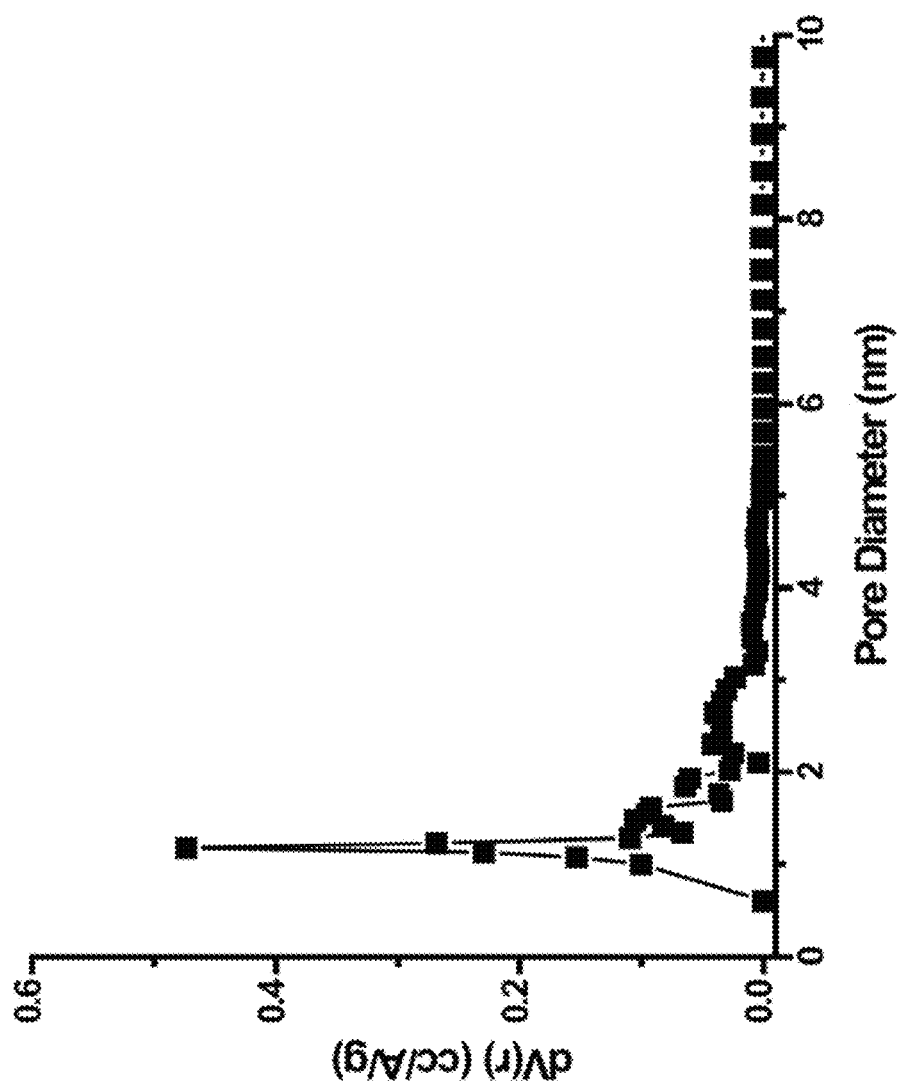
FIG. 35 depicts the density functional theory (DFT) pore size distribution of microporous aluminosilicate synthesized with Pluronic® P123 surfactant prepared in Example 3.
Figure 36:
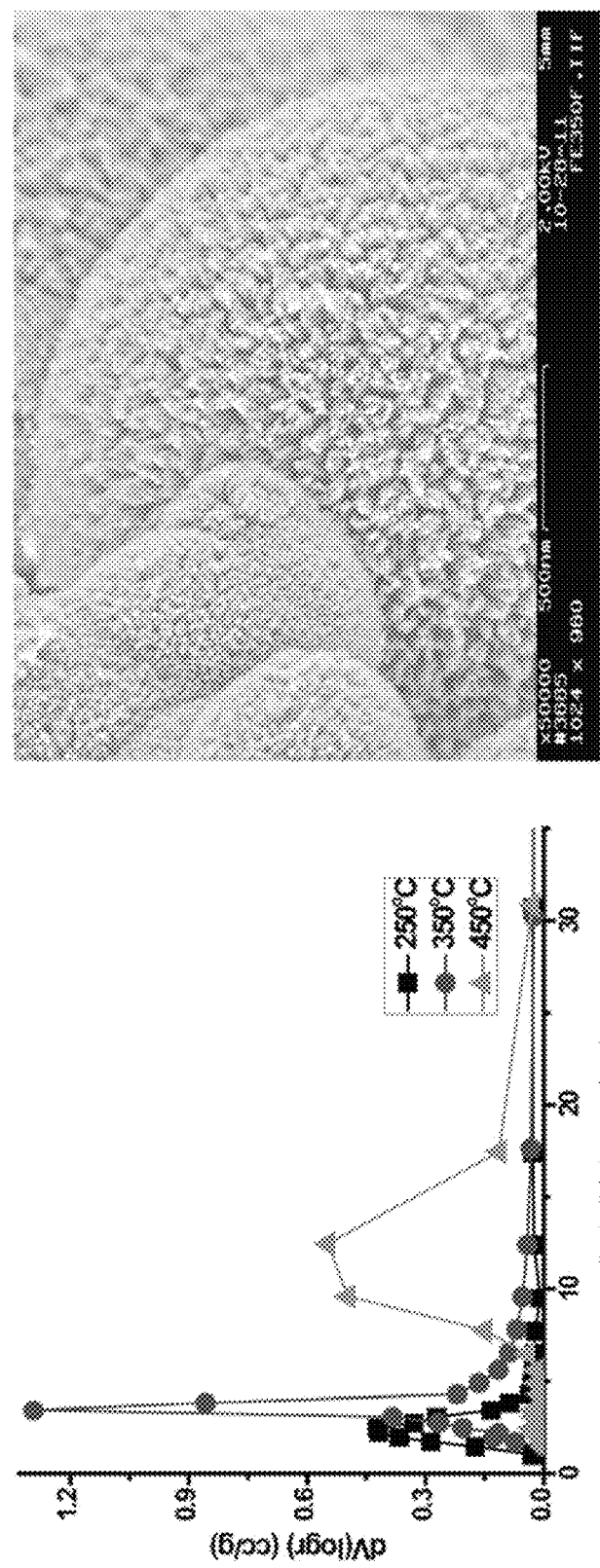
FIG. 36 depicts pore size distribution data (left) and field emission scanning electron microscopy (FESEM) micrograph (right) for mesoporous $Fe_2O_3$ prepared in Example 3.
Figure 37:
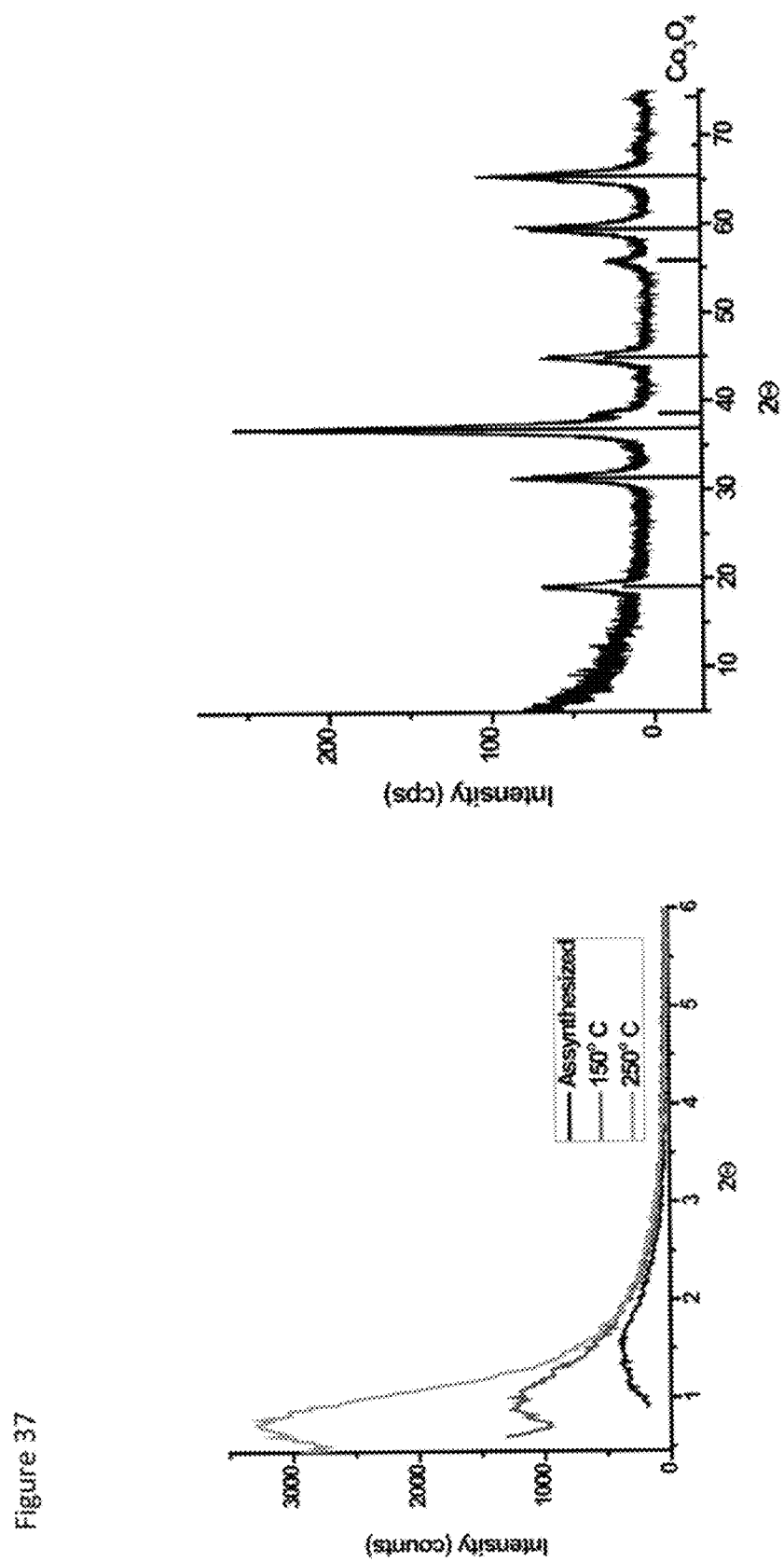
FIG. 37 depicts low angle (left) and high angle (right) x-ray diffraction (XRD) data for mesoporous $Co_3O_4$ prepared in Example 3.

Referring to FIGS. 22 and 23, a comparison of surface area (BET) of mesoporous $CeO_2$ at different temperatures is set forth in Table 7 below.

TABLE 7

| Δ (max) | SA (BET) |
|---|---|
| 150 C.° | 97.5 m²\g |
| 250 C.° | 152.3 m²\g |
| 350 C.° | 173.4 m²\g |
| 450 C.° | 149.9 m²\g |
| 550 C.° | 127.3 m²\g |
| 600 C.° | 71.6 m²\g |

Figure 40:
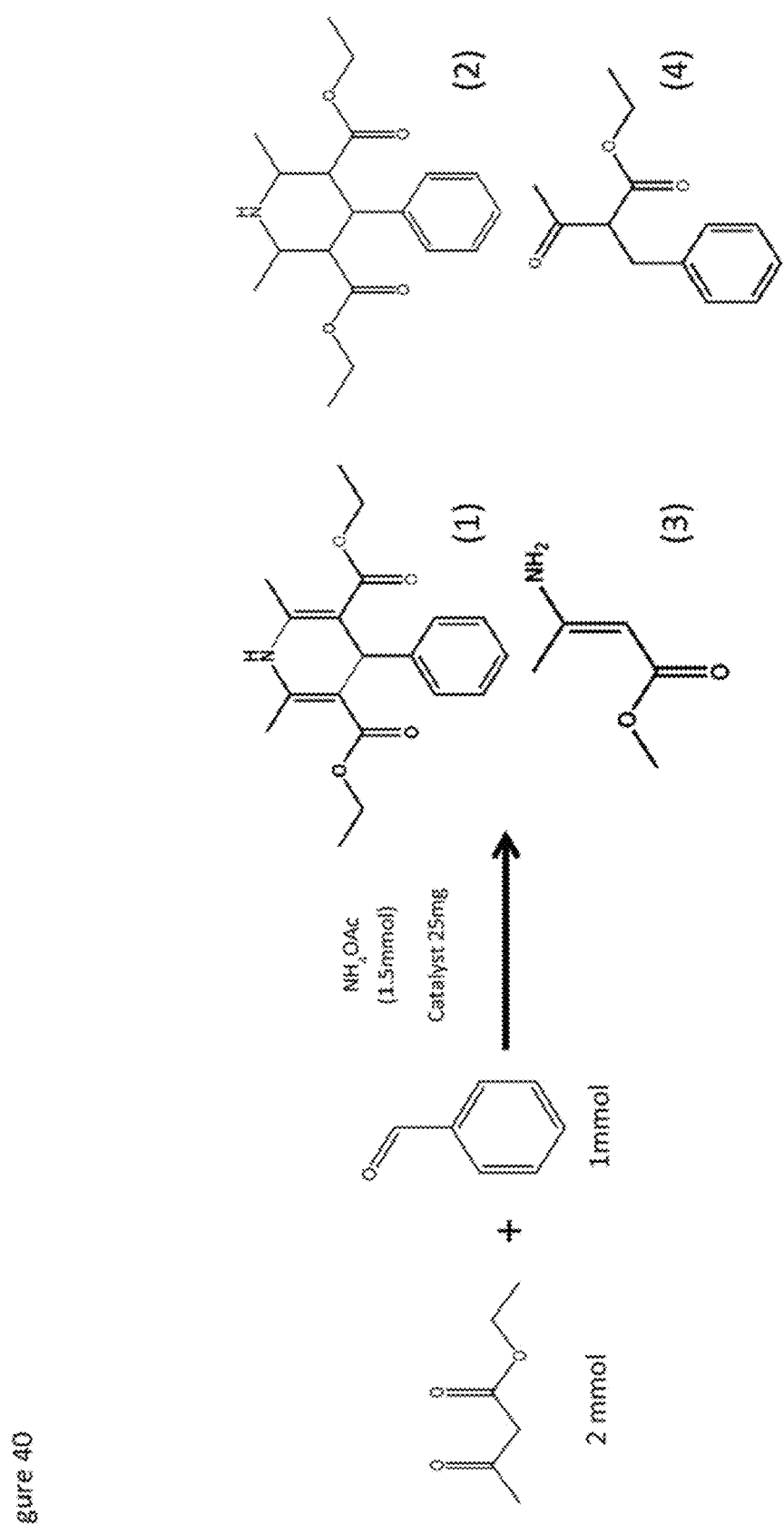
FIG. 40 depicts a Hantzsch reaction catalyzed by mesoporous iron oxide.

FIG. 40 depicts a Hantzsch reaction catalyzed by mesoporous iron oxide. The Hantzsch reaction was conducted in accordance with the conditions set forth in FIG. 41. Conversions and selectivities are set forth in FIG. 41. Compound 1 is a pharmaceutical compound.

Figure 42:
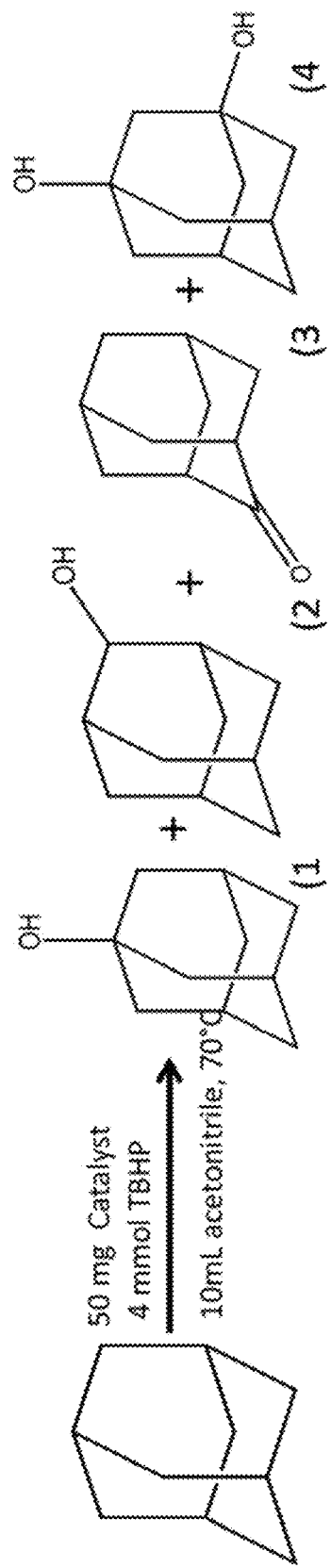
FIG. 42 depicts an adamantane oxidation reaction catalyzed by mesoporous manganese oxide.
Figure 43:
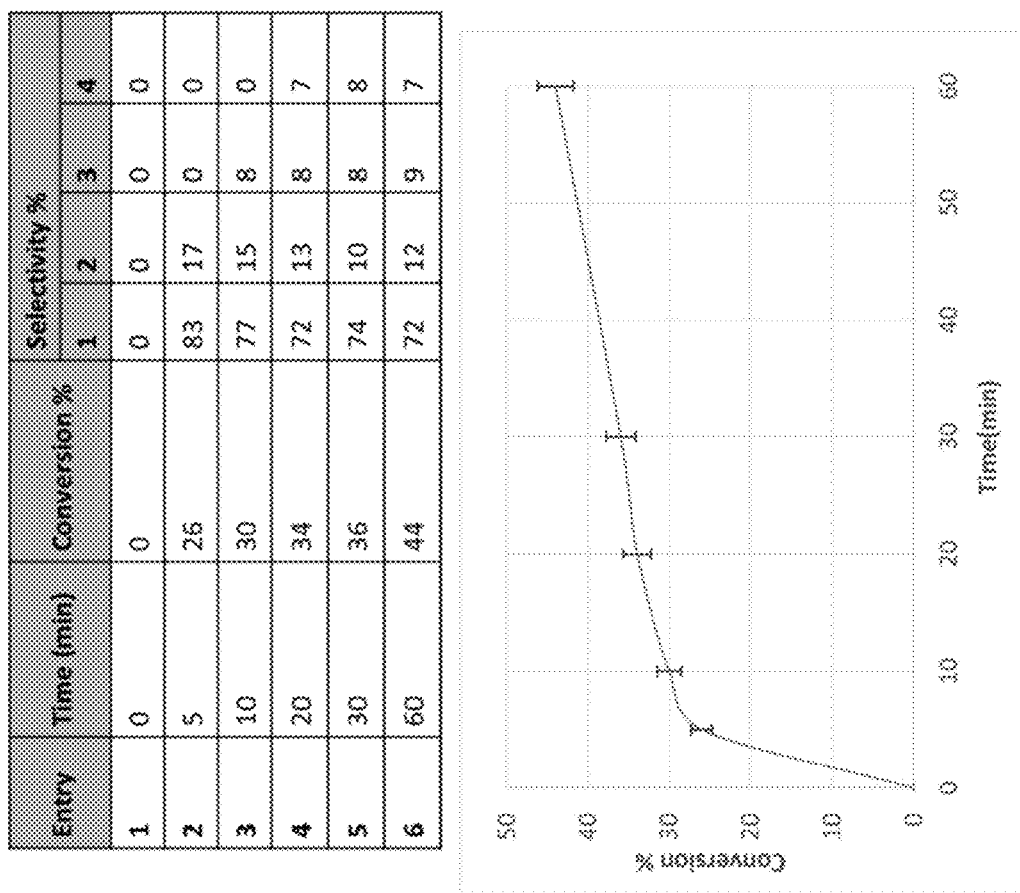
FIG. 43 sets forth the conditions and results generated from the adamantane oxidation reaction catalyzed by mesoporous manganese oxide depicted in FIG. 42.

FIG. 42 depicts an adamantane oxidation reaction catalyzed by mesoporous manganese oxide. The adamantane oxidation reaction was conducted in accordance with the conditions set forth in FIG. 43. Conversions and selectivities are set forth in FIG. 43.

Figure 44:
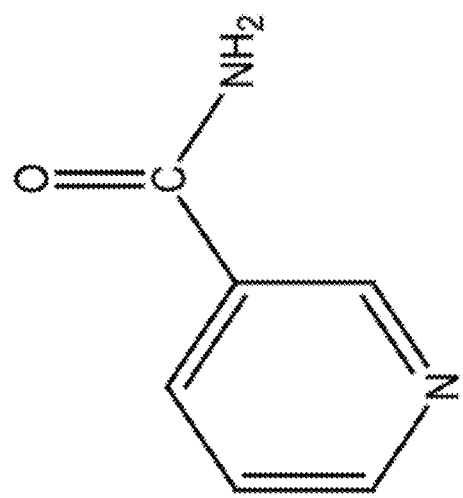
FIG. 44 depicts a hydration reaction catalyzed by mesoporous cerium oxide.
Figure 44:
Figure 44:
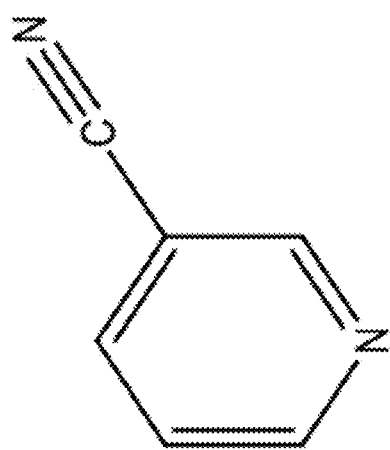

FIG. 44 depicts a hydration reaction catalyzed by mesoporous cerium oxide. The hydration reaction was conducted in accordance with the conditions set forth in FIG. 45. Conversions and selectivities are set forth in FIG. 45.

Figure 46:
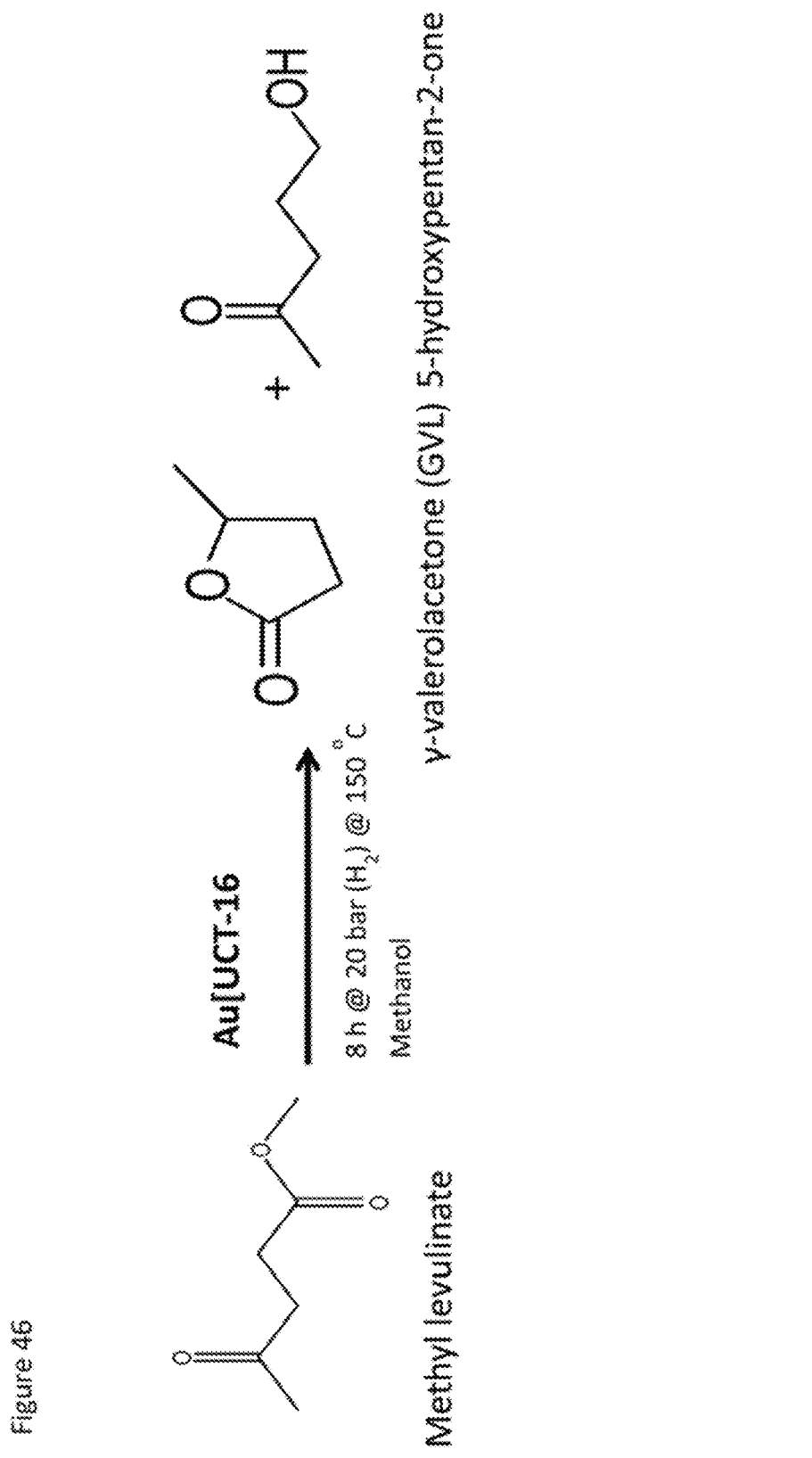
FIG. 46 depicts a hydrogenation reaction of methyl levulinate catalyzed by mesoporous cerium oxide supported nano-noble metals.

FIG. 46 depicts a hydrogenation reaction of methyl levulinate catalyzed by mesoporous cerium oxide supported nano-noble metal. The noble metal loading was about 2%. The conversion was 100%. The selectivity to γ-valerolactone (GVL) was 52% and the selectivity to 5-hydroxypentan-2-one was 42%. The noble metal was added by deposition to the mesoporous material. Enhanced activity was observed in this biomass conversion reaction.

Figure 47:
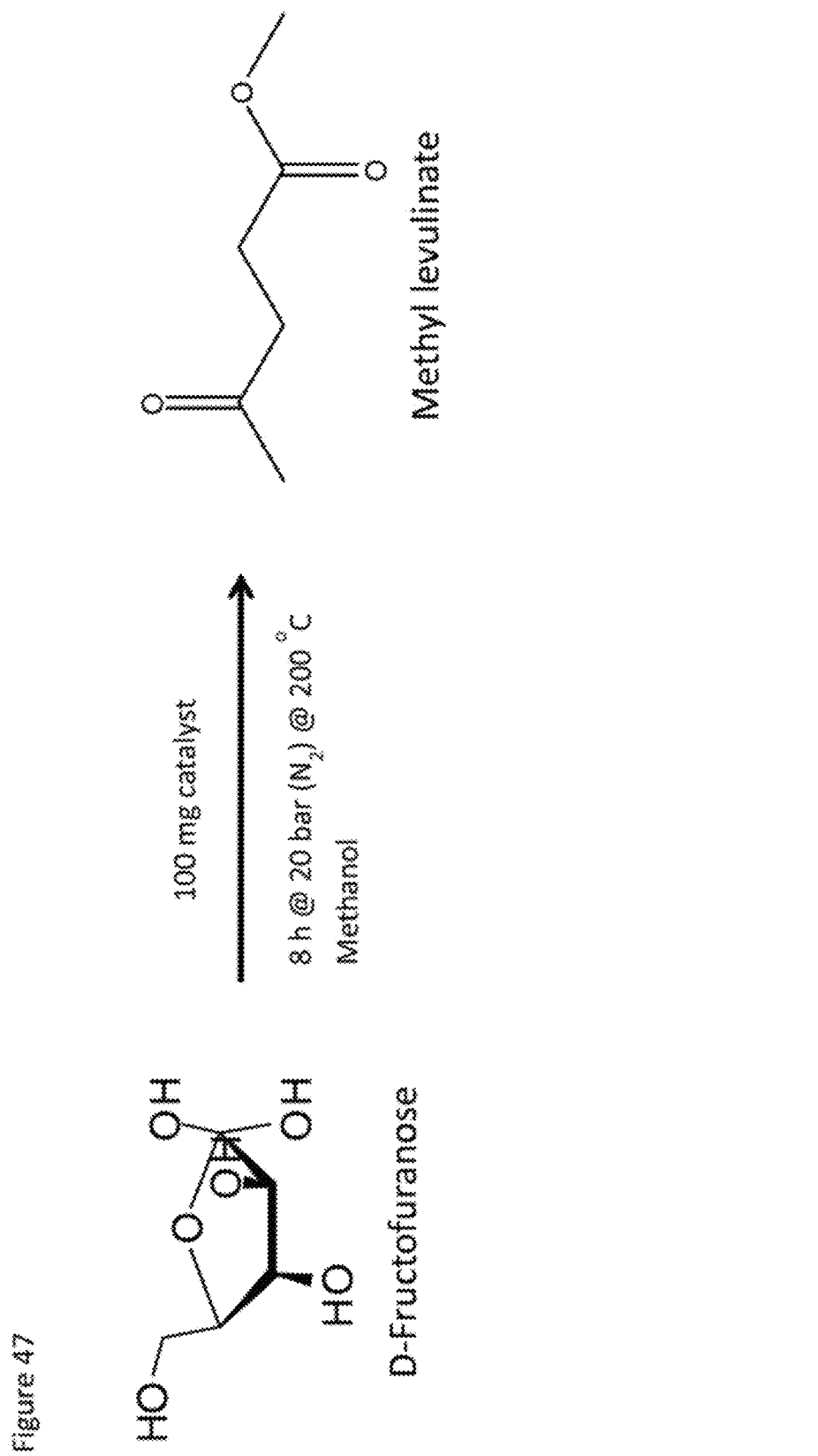
FIG. 47 depicts the conversion of a sugar (i.e., D-fructofuranose) to methyl levulinate.

FIG. 47 depicts the conversion of a sugar (i.e., D-fructofuranose) to methyl levulinate. The conversion was conducted in accordance with the conditions set forth in FIG. 48. The particular catalyst, temperature, conversions, selectivities and yields are set forth in FIG. 48. The mesoporous catalysts maintained high activity with no leaching of metal or sulfate into solution.

Figure 49:
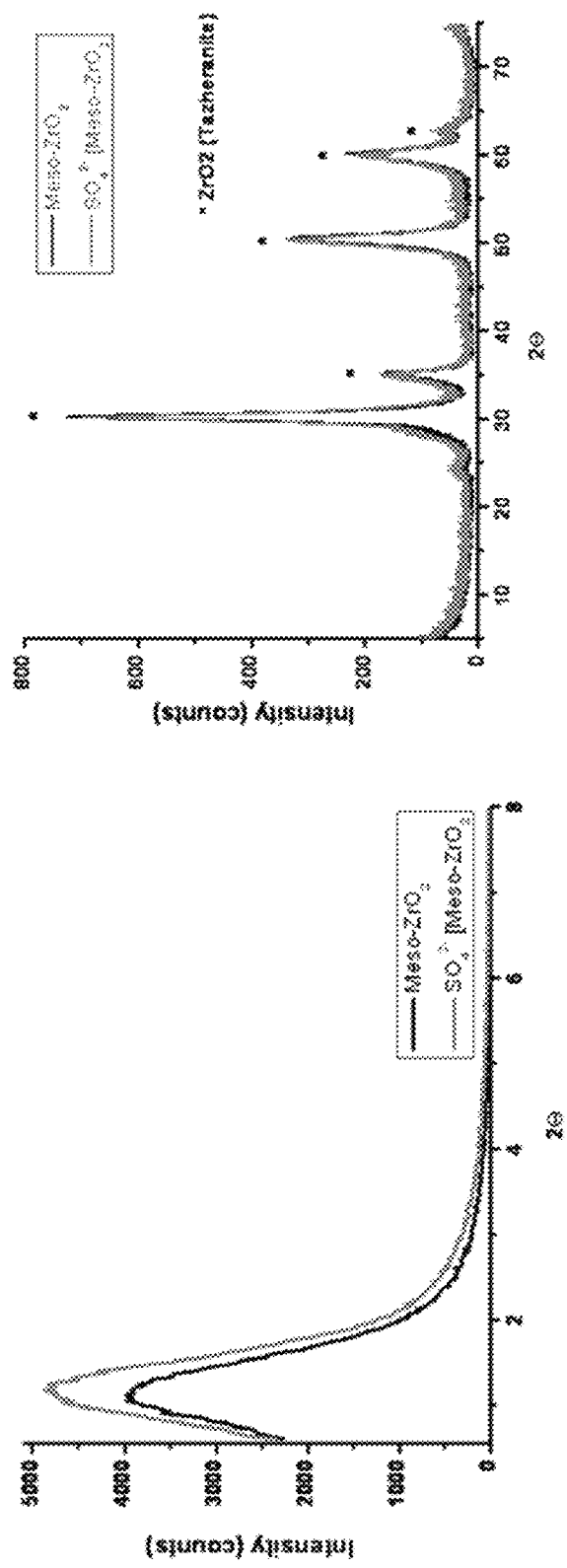
FIG. 49 depicts data showing properties of mesoporous zirconium oxide in comparison with sulfated mesoporous zirconium oxide.
Figure 49:
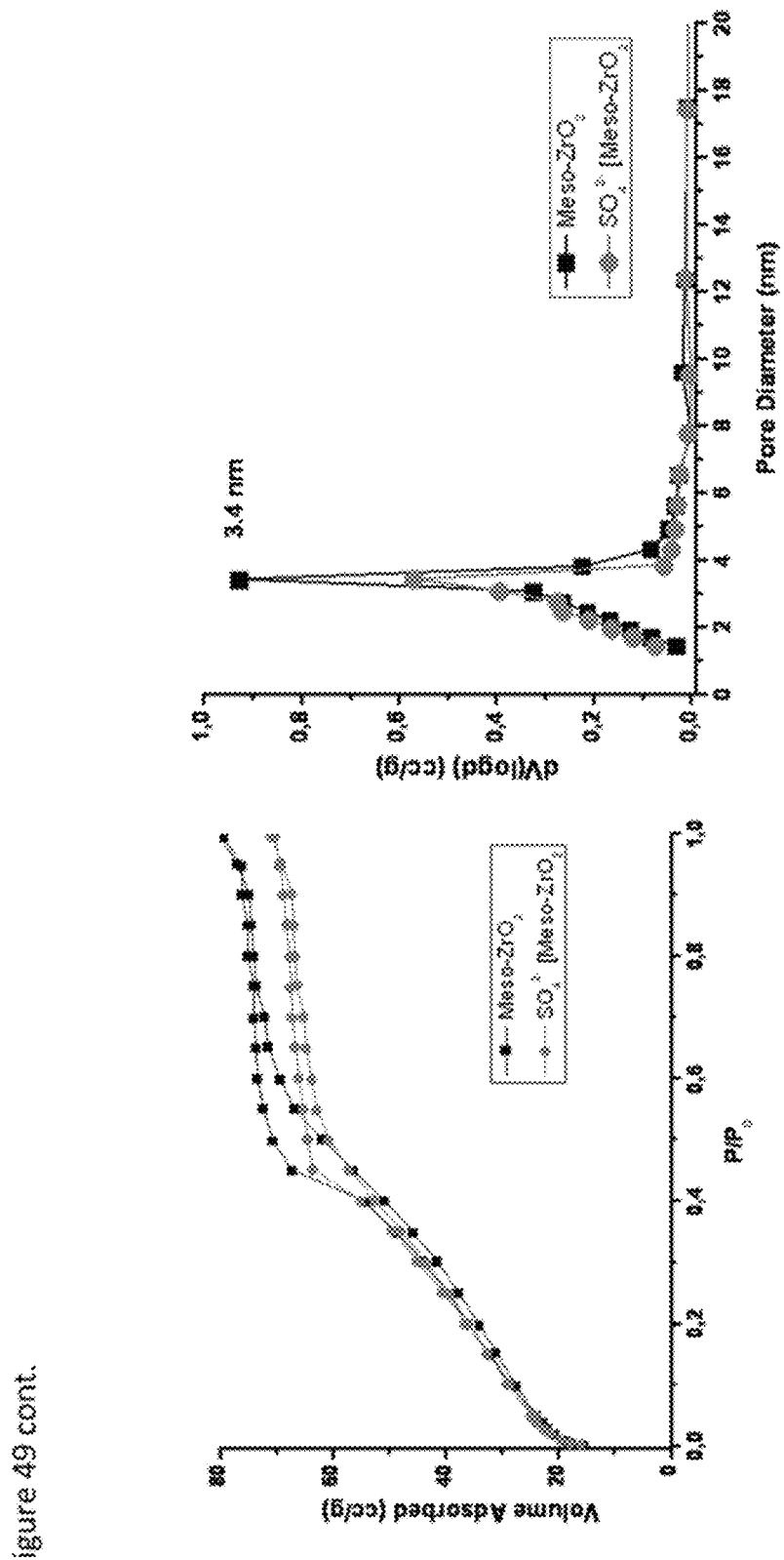

FIG. 49 depicts data showing properties of mesoporous zirconium oxide in comparison with sulfated mesoporous zirconium oxide. The sulfated mesoporous zirconium oxide leads to a stable material. Sulfating often enhances acidity.

Figure 50:
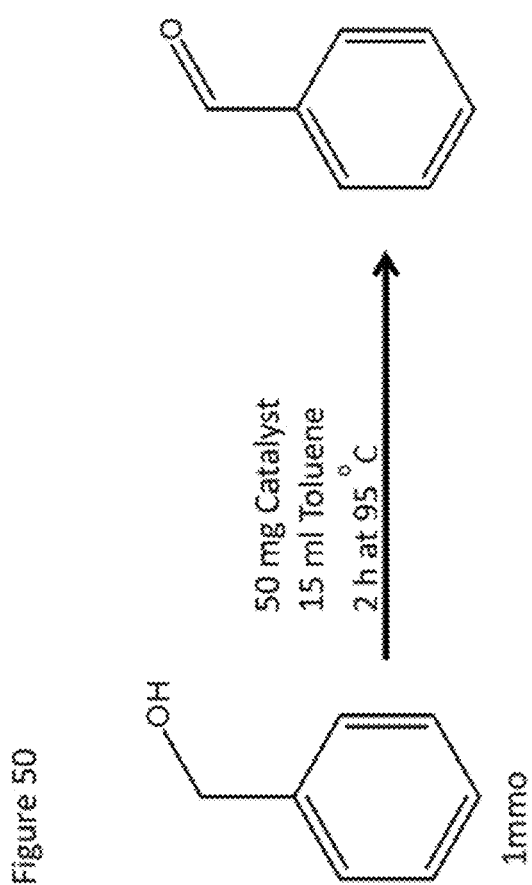
FIG. 50 depicts a benzyl alcohol oxidation reaction catalyzed by mesoporous manganese oxide.

FIG. 50 depicts a benzyl alcohol oxidation reaction catalyzed by mesoporous manganese oxide. The benzyl alcohol oxidation reaction was conducted in accordance with the conditions set forth in FIG. 51. Conversions and selectivities are set forth in FIG. 51.

Figure 52:
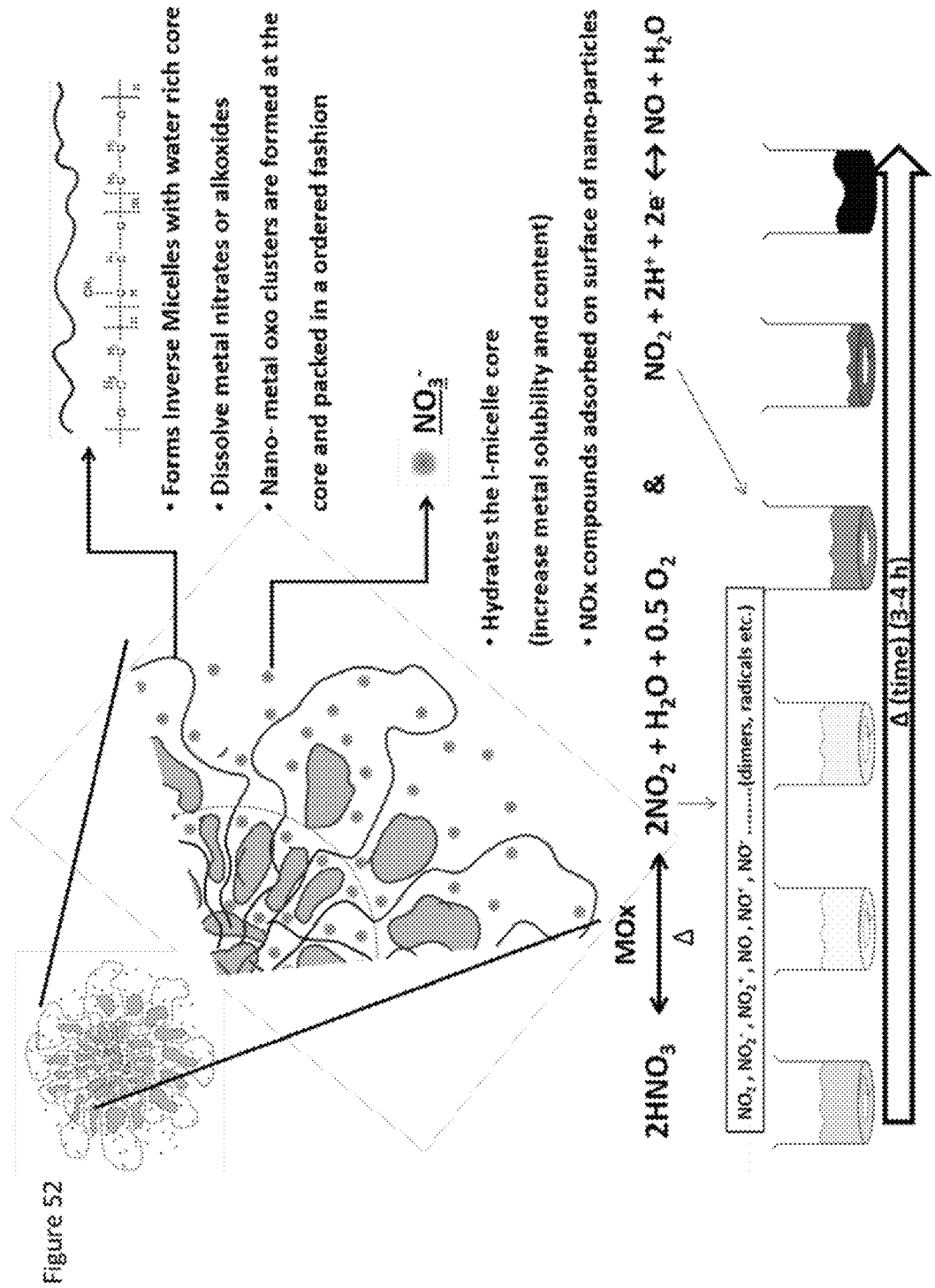
FIG. 52 depicts what is believed to be the mechanism for $HNO_3$ activity.
Figure 53:
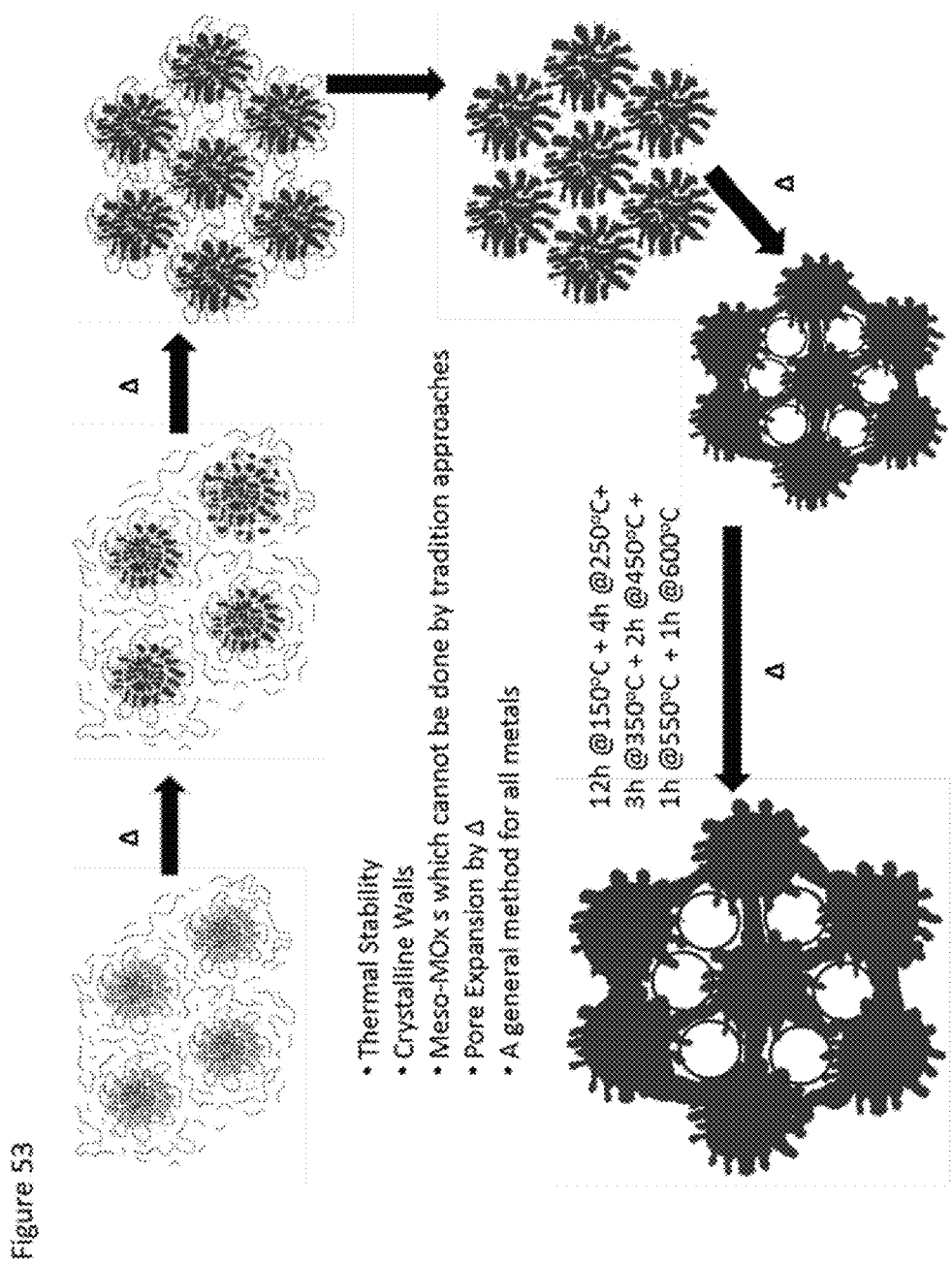
FIG. 53 depicts a proposed mechanism for the formation of highly ordered mesoporous metal oxide in accordance with this disclosure

FIG. 52 depicts what is believed to be the mechanism for $HNO_3$ activity. FIG. 53 depicts a proposed mechanism for the formation of highly ordered mesoporous metal oxide in accordance with this disclosure.

All patents and patent applications, test procedures (such as ASTM methods, UL methods, and the like), and other documents cited herein are fully incorporated by reference to the extent such disclosure is not inconsistent with this disclosure and for all jurisdictions in which such incorporation is permitted.

When numerical lower limits and numerical upper limits are listed herein, ranges from any lower limit to any upper limit are contemplated. While the illustrative embodiments of the disclosure have been described with particularity, it will be understood that various other modifications will be apparent to and can be readily made by those skilled in the art without departing from the spirit and scope of the disclosure. Accordingly, it is not intended that the scope of the claims appended hereto be limited to the examples and descriptions set forth herein but rather that the claims be construed as encompassing all the features of patentable novelty which reside in the present disclosure, including all features which would be treated as equivalents thereof by those skilled in the art to which the disclosure pertains.

The present disclosure has been described above with reference to numerous embodiments and specific examples. Many variations will suggest themselves to those skilled in this art in light of the above detailed description. All such obvious variations are within the full intended scope of the appended claims. Also, the subject matter of the appended dependent claims is within the full intended scope of all appended independent claims.

What is claimed is:

1. A process for preparing a mesoporous metal oxide said process comprising:
providing an acidic inverse micellar mixture comprising a metal precursor, an interface modifier, a hydrotropic ion precursor, and a surfactant, wherein water is eliminated or minimized to prevent aggregation of metal oxide clusters; and
heating the acidic mixture at a temperature and for a period of time sufficient to form nano-sized wall crystallinity and mesoporosity in the mesoporous metal oxide,
wherein the mesoporous metal oxide has nano-sized wall crystallinity.

2. The process of claim 1, wherein the heating step comprises:
heating the acidic mixture at a temperature and for a period of time sufficient to form a dried powder; and
heating the dried powder at a temperature and for a period of time sufficient to form nano-sized wall crystallinity and mesoporosity in the mesoporous metal oxide.

3. The process of claim 2, wherein the acidic mixture is heated sequentially as follows: at a temperature from about 75° C. to about 150° C. for a period from about 1 to about 12 hours; and at a temperature from about 40° C. to about 80° C. for a period from about 1 to about 12 hours.

4. The process of claim 2, wherein the dried powder is heated sequentially as follows: at a temperature from about 100° C. to about 200° C. for a period from about 2 to about 20 hours; at a temperature from about 200° C. to about 300° C. for a period from about 1 to about 10 hours; at a temperature from about 300° C. to about 400° C. for a period from about 1 to about 8 hours; at a temperature from about 400° C. to about 500° C. for a period from about 0.5 to about 4 hours; and at a temperature from about 500° C. to about 600° C. for a period from about 0.1 to about 2 hours.

5. The process of claim 2, wherein the dried powder is heated sequentially as follows: at a temperature of about 150° C. for a period of about 12 hours; at a temperature of about 250° C. for a period of about 4 hours; at a temperature of about 350° C. for a period of about 3 hours; at a temperature of about 450° C. for a period of about 2 hours; and at a temperature of about 550° C. for a period of about 1 hour.

6. The process of claim 2, further comprising washing the dried powder with an alcohol for a period of time sufficient to remove organic components therefrom.

7. The process of claim 1, wherein the metal precursor is selected from the group consisting of a transition metal precursor, a Lanthanide metal precursor, a post-transition metal precursor, a metalloid precursor, and mixtures thereof.

8. The process of claim 7, wherein the transition metal precursor comprises a Group 3-12 transition metal precursor selected from the group consisting of a Sc, Y, La, Ti, Zr, Hf, V, Nb, Ta, Cr, Mo, W, Mn, Tc, Re, Fe, Ru, Os, Co, Rh, Ir, Ni, Pd, Pt, Cu, Ag, Au, Zn, Cd and Hg precursor.

9. The process of claim 7, wherein the Lanthanide metal precursor is selected from the group consisting of a La, Ce, Pr, Nd, Pm, Sm, Eu, Gd, Tb, Dy, Ho, Er, Tm, Yb and Lu precursor.

10. The process of claim 7, wherein the post-transition metal precursor is selected from the group consisting of an Al, Ga, In, Tl, Sn, Pb and Bi precursor.

11. The process of claim 7, wherein the metalloid precursor is selected from the group consisting of a B, Si, Ge, As, Sb, Te, Po and At precursor.

12. The process of claim 1, wherein the metal precursor is selected from the group consisting of metal nitrates, metal alkoxides, metal halides, metal phosphates, metal acetates, and $M_xO_y$ oxides that are capable of dissolving in $HNO_3$.

13. The process of claim 1, wherein the metal precursor is selected from the group consisting of $M(NO_3)_x \cdot yH_2O$ (M=Mn, Fe, Co, Cu, Zn), tetraethyl orthosilicate (TEOS), tetramethyl orthosilicate (TMOS), titanium butoxide, zirconium n-propoxide, zirconium butoxide, $Ce(NO_3)_3 \cdot 6H_2O$, $Gd(NO_3)_3 \cdot 6H_2O$, and $Sm(NO_3)_3 \cdot 6H_2O$.

14. The process of claim 1, wherein the interface modifier comprises an aliphatic, alicyclic or aromatic hydrocarbon, oxygenated hydrocarbon or terpenoid hydrocarbon, of between about 1 and about 20 carbon atoms, or mixtures thereof, that allows the surfactant to organize itself into inverse micelles.

15. The process of claim 1, wherein the hydrotropic ion precursor comprises $HNO_3$, $NaNO_3$, $KNO_3$, metal halides, metal thiocyanides, or mixtures thereof.

16. The process of claim 1, wherein the surfactant comprises an anionic, cationic, non-ionic, or zwitterionic surfactant, or mixtures thereof.

17. The process of claim 1, wherein the surfactant comprises an EO/PO copolymer surfactant.

18. The process of claim 1, wherein the surfactant comprises Pluronic® P65 (EO20PO30EO20), Pluronic® P85 (EO26PO40EO26), Pluronic® 25R4, Pluronic® F108 (EO129PO56EO129), Pluronic® P123 (EO20PO70EO20) or Pluronic® F127 (EO97PO69EO97).

19. The process of claim 1, wherein the surfactant comprises a Triton® surfactant, a Tween® surfactant, glucose, or an AB or BC polymer surfactant, wherein A is polyisoprene butylene, B is styrene, and C is selected from glucose, amine, carboxyl group-containing compound, and polyethylene glycol (PEG).

20. The process of claim 1, wherein the mesoporous metal oxide has a pore size (diameter) between about 1.5 nanometers and about 50 nanometers.

21. The process of claim 1, which is conducted under process conditions sufficient to control pore size and pore size distribution of the metal oxide and crystal structure of nano-sized metal oxide walls.

22. The process of claim 1, wherein the mesoporous metal oxide is selected from the group consisting of a transition metal oxide, a Lanthanide metal oxide, a post-transition metal oxide, a metalloid oxide, and mixtures thereof.

23. The process of claim 22, wherein the transition metal oxide comprises a Group 3-12 transition metal oxide selected from the group consisting of a Sc, Y, La, Ti, Zr, Hf, V, Nb, Ta, Cr, Mo, W, Mn, Tc, Re, Fe, Ru, Os, Co, Rh, Ir, Ni, Pd, Pt, Cu, Ag, Au, Zn, Cd and Hg oxide.

24. The process of claim 22, wherein the Lanthanide metal oxide is selected from the group consisting of a La, Ce, Pr, Nd, Pm, Sm, Eu, Gd, Tb, Dy, Ho, Er, Tm, Yb and Lu oxide.

25. The process of claim 22, wherein the post-transition metal oxide is selected from the group consisting of an Al, Ga, In, Tl, Sn, Pb and Bi oxide.

26. The process of claim 22, wherein the metalloid oxide is selected from the group consisting of a B, Si, Ge, As, Sb, Te, Po and At oxide.

27. A method of controlling nano-sized wall crystallinity and mesoporosity in mesoporous metal oxides, said method comprising:
   providing an acidic inverse micellar mixture comprising a metal precursor, an interface modifier, a hydrotropic ion precursor, and a surfactant, wherein water is eliminated or minimized to prevent the aggregation of metal oxide clusters; and
   heating the acidic mixture at a temperature and for a period of time sufficient to control nano-sized wall crystallinity and mesoporosity in the mesoporous metal oxides;
   wherein the mesoporous metal oxides have nano-sized wall crystallinity.

28. A method of tuning structural properties of crystalline mesoporous metal oxides, said method comprising:
   providing an acidic sol-gel micellar mixture comprising a metal precursor, an interface modifier, a hydrotropic ion precursor, and a surfactant, wherein water is eliminated-or minimized to prevent the aggregation of metal oxide clusters;
   heating the acidic mixture at a temperature and for a period of time sufficient to form a dried powder; and
   heating the dried powder at a temperature and for a period of time sufficient to tune the structural properties of the mesoporous metal oxides;
   wherein the mesoporous metal oxides have nano-sized wall crystallinity.

* * * * *